(12) United States Patent
Hatae et al.

(10) Patent No.: US 7,590,133 B2
(45) Date of Patent: Sep. 15, 2009

(54) DATA COMMUNICATION SYSTEM, DATA COMMUNICATION METHOD, AND DATA COMMUNICATION APPARATUS

(75) Inventors: Shinichi Hatae, Kawasaki (JP); Takashi Kobayashi, Yokohama (JP); Mitsuo Niida, Yokohama (JP); Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/253,783

(22) Filed: Feb. 22, 1999

(65) Prior Publication Data

US 2003/0172201 A1 Sep. 11, 2003

(30) Foreign Application Priority Data

| Feb. 24, 1998 | (JP) | ................................. 10-042656 |
| Mar. 9, 1998 | (JP) | ................................. 10-057268 |
| Apr. 22, 1998 | (JP) | ................................. 10-111681 |
| Apr. 28, 1998 | (JP) | ................................. 10-119727 |

(51) Int. Cl.
*H04J 12/28* (2006.01)
(52) U.S. Cl. ..................... 370/412; 370/474; 711/171
(58) Field of Classification Search ............. 370/395.1, 370/397, 398, 399, 412, 474; 711/171
See application file for complete search history.

(56) References Cited

U.S. PATENT DOCUMENTS

| 5,282,207 A | * | 1/1994 | Jurkevich et al. ........ 370/110.1 |
| 5,430,719 A | | 7/1995 | Weisser |
| 5,438,568 A | | 8/1995 | Weisser |
| 5,450,406 A | | 9/1995 | Esaki et al. ................. 370/60.1 |
| 5,519,704 A | | 5/1996 | Farinacci et al. ......... 370/85.13 |
| 5,539,736 A | * | 7/1996 | Johnson et al. ............... 370/60 |
| 5,583,862 A | | 12/1996 | Callon ........................ 370/397 |
| 5,689,244 A | | 11/1997 | Iijima et al. |
| 5,701,301 A | | 12/1997 | Weisser |

(Continued)

FOREIGN PATENT DOCUMENTS

EP 0766428 A2 4/1997

(Continued)

OTHER PUBLICATIONS

U.S. Appl. No. 09/288,038, filed Apr. 8, 1999.

(Continued)

*Primary Examiner*—Duc C Ho
(74) *Attorney, Agent, or Firm*—Fitzpatrick, Cella, Harper & Scinto

(57) ABSTRACT

A data communication apparatus (a) determines a segment size and a segment data size in accordance with a size of a receiving buffer of the destination node, the size of the receiving buffer being determined by the destination node in accordance with a maximum payload size that can be received by the destination node, (b) divides object data into segments in accordance with the segment size, and (c) divides each segment into a plurality of segment data in accordance with the segment data size. The data communication apparatus (c) generates packets from the plurality of segment data, and (d) transfers the packets from the data communication apparatus to the destination node via a logical connection set between te data communication apparatus and the destination node, the logical connection being set by a controller.

5 Claims, 38 Drawing Sheets

U.S. PATENT DOCUMENTS

| | | | | |
|---|---|---|---|---|
| 5,825,752 | A | | 10/1998 | Fujimori et al. ............. 370/260 |
| 5,987,030 | A | * | 11/1999 | Brockhage et al. ........... 370/394 |
| 6,081,852 | A | * | 6/2000 | Baker ........................... 710/24 |
| 6,128,316 | A | | 10/2000 | Takeda et al. ................ 370/468 |
| 6,173,330 | B1 | * | 1/2001 | Guo et al. ................... 709/232 |
| 6,185,210 | B1 | * | 2/2001 | Troxel ........................ 370/395 |
| 6,226,769 | B1 | * | 5/2001 | Schuster et al. ............. 714/752 |
| 6,512,540 | B2 | * | 1/2003 | Lathrop ................... 348/222.1 |
| 7,002,964 | B1 | * | 2/2006 | Ohnishi et al. ........... 370/395.2 |

FOREIGN PATENT DOCUMENTS

| | | |
|---|---|---|
| JP | 07-058806 A2 | 3/1995 |
| JP | 07-066811 A1 | 3/1995 |
| JP | 07-107119 A1 | 4/1995 |
| JP | 08-018584 A1 | 1/1996 |
| JP | 09-081334 A1 | 3/1997 |
| JP | 09-091100 A2 | 4/1997 |
| JP | 09-093250 A | 4/1997 |
| JP | 09-168007 A1 | 6/1997 |
| JP | 09-238147 A2 | 9/1997 |
| JP | 10-031484 A1 | 2/1998 |
| JP | 10-501396 A1 | 2/1998 |
| JP | 2000-041070 A | 2/2000 |
| WO | 9535633 A2 | 12/1995 |
| WO | WO 96/34477 A1 | 10/1996 |

OTHER PUBLICATIONS

U.S. Appl. No. 09/252,924, filed Feb. 19, 1999.
U.S. Appl. No. 09/252,926, filed Feb. 19, 1999.
U.S. Appl. No. 09/251,299, filed Feb. 17, 1999.
U.S. Appl. No. 09/252,925, filed Feb. 19, 1999.
U.S. Appl. No. 09/252,922, filed Feb. 19, 1999.
U.S. Appl. No. 09/021,268, filed Feb. 10, 1998.
U.S. Appl. No. 09/314,927, filed May 20, 1999.
U.S. Appl. No. 09/320,566, filed May 27, 1999.
U.S. Appl. No. 09/186,485, filed Nov. 5, 1998.
Malaysian Office Action and Search Report, dated Jul. 20, 2007, regarding Application No. Pl 99000653.
Japanese Office Action mailed May 30, 2006 for Application No. 10-057268.
Japanese Office Action mailed Nov. 21, 2006 for Application No. 10-111681.
Japanese Office Action mailed Jun. 26, 2007 for Application No. 10-111681.
Japanese Office Action mailed Aug. 28, 2007 for Application No. 10-119727.

* cited by examiner

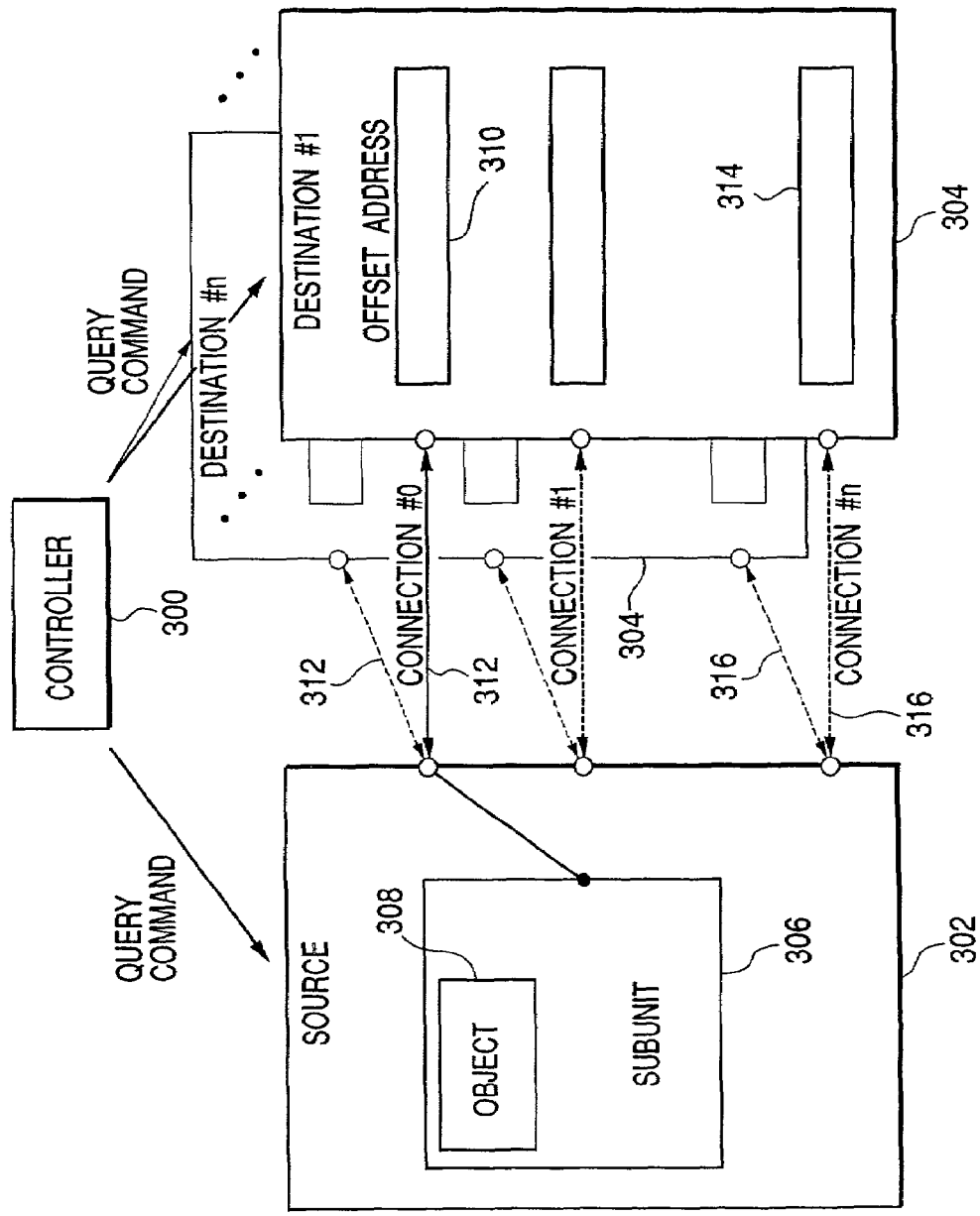

TRANSFER MODEL (1 TO N)

FIG. 19

TRANSMITTED FIRST

| 0000 | response | subunit_type | subunit ID | opcode | operand[0] |
|---|---|---|---|---|---|
| operand[1] | | operand[2] | | operand[3] | operand[4] |
| operand[n] | | zero pad bytes (if necessary) | | | |

TRANSMITTED LAST

FIG. 20

| | msb | lsb |
|---|---|---|
| opcode | SET SOURCE | |
| operand [0] | node_vendor_id | |
| operand [1] | | |
| operand [2] | | |
| operand [3] | chip_id_hi | |
| operand [4] | chip_id_lo | |
| operand [5] | | |
| operand [6] | | |
| operand [7] | | |
| operand [8] | connection_id | |
| operand [9] | reserved | max_rec |
| operand [10] | buffer_size | |
| operand [11] | | |
| operand [12] | | |
| operand [13] | number_of_destinations | |
| operand [14] | status_info | |

FIG. 21

| | msb | | | | | | | lsb |
|---|---|---|---|---|---|---|---|---|
| opcode | \multicolumn{8}{c}{OBJECT SEND} |
| operand [0] | | | | | | | | |
| operand [1] | \multicolumn{8}{c}{node_vendor_id} |
| operand [2] | | | | | | | | |
| operand [3] | \multicolumn{8}{c}{chip_id_hi} |
| operand [4] | | | | | | | | |
| operand [5] | \multicolumn{8}{c}{chip_id_lo} |
| operand [6] | | | | | | | | |
| operand [7] | | | | | | | | |
| operand [8] | \multicolumn{8}{c}{connection_id} |
| operand [9] | \multicolumn{8}{c}{subfunction} |
| operand [10] | \multicolumn{8}{c}{status_info} |

FIG. 22

| connection_id | flag | max_rec | buffer_size |
|---|---|---|---|
| 0 | 0 | 512 | 32KB |
| 0 | 0 | 0 | 0 |
| ⋮ | | | |
| n-1 | 0 | 0 | 0 |
| n | 0 | 0 | 0 |

FIG. 26

| | msb | | | | | | | lsb |
|---|---|---|---|---|---|---|---|---|
| opcode | CLEAR CONNECTION ||||||||
| operand [0] | node_vendor_id ||||||||
| operand [1] | ||||||||
| operand [2] | ||||||||
| operand [3] | chip_id_hi ||||||||
| operand [4] | chip_id_lo ||||||||
| operand [5] | ||||||||
| operand [6] | ||||||||
| operand [7] | ||||||||
| operand [8] | connection_id ||||||||
| operand [9] | status_info ||||||||

FIG. 30

| connection_id | flag | max_rec | buffer_size | number_of_destinations |
|---|---|---|---|---|
| 0 | 1 | 512 | 32KB | 1 |
| 1 | 0 | 0 | 0 | 0 |
| n-1 | 0 | 0 | 0 | 0 |
| n | 0 | 0 | 0 | 0 |

| EUI-64 ||
|---|---|
| Source | xxxxxx xx xxxxxxxx |
| Destination #1 | yyyyyy yy yyyyyyyy |

FIG. 28

| | msb | | | | | | | lsb |
|---|---|---|---|---|---|---|---|---|
| opcode | \multicolumn{8}{c}{SET DESTINATION} |
| operand [0] | \multicolumn{8}{c}{node_vendor_id} |
| operand [1] | | | | | | | | |
| operand [2] | | | | | | | | |
| operand [3] | \multicolumn{8}{c}{chip_id_hi} |
| operand [4] | \multicolumn{8}{c}{chip_id_lo} |
| operand [5] | | | | | | | | |
| operand [6] | | | | | | | | |
| operand [7] | | | | | | | | |
| operand [8] | \multicolumn{8}{c}{connection_id} |
| operand [9] | \multicolumn{8}{c}{destination_node_vendor_id} |
| operand [10] | | | | | | | | |
| operand [11] | | | | | | | | |
| operand [12] | \multicolumn{8}{c}{destination_chip_id_hi} |
| operand [13] | \multicolumn{8}{c}{destination_chip_id_lo} |
| operand [14] | | | | | | | | |
| operand [15] | | | | | | | | |
| operand [16] | | | | | | | | |
| operand [17] | \multicolumn{4}{c}{reserved} | \multicolumn{4}{c}{max_rec} |
| operand [18] | \multicolumn{8}{c}{buffer_size} |
| operand [19] | | | | | | | | |
| operand [20] | | | | | | | | |
| operand [21] | \multicolumn{8}{c}{status_info} |

FIG. 29

| | msb | | | | | | | lsb |
|---|---|---|---|---|---|---|---|---|
| opcode | \multicolumn{8}{c|}{SET_SOURCE} |

| | |
|---|---|
| opcode | SET_SOURCE |
| operand [0] | node_vendor_id |
| operand [1] | |
| operand [2] | |
| operand [3] | chip_id_hi |
| operand [4] | chip_id_lo |
| operand [5] | |
| operand [6] | |
| operand [7] | |
| operand [8] | connection_id |
| operand [9] | source_node_vendor_id |
| operand [10] | |
| operand [11] | |
| operand [12] | source_chip_id_hi |
| operand [13] | source_chip_id_lo |
| operand [14] | |
| operand [15] | |
| operand [16] | |
| operand [17] | reserved \| max_rec |
| operand [18] | buffer_size |
| operand [19] | |
| operand [20] | |
| operand [21] | number_of_destinations |
| operand [22] | status_info |

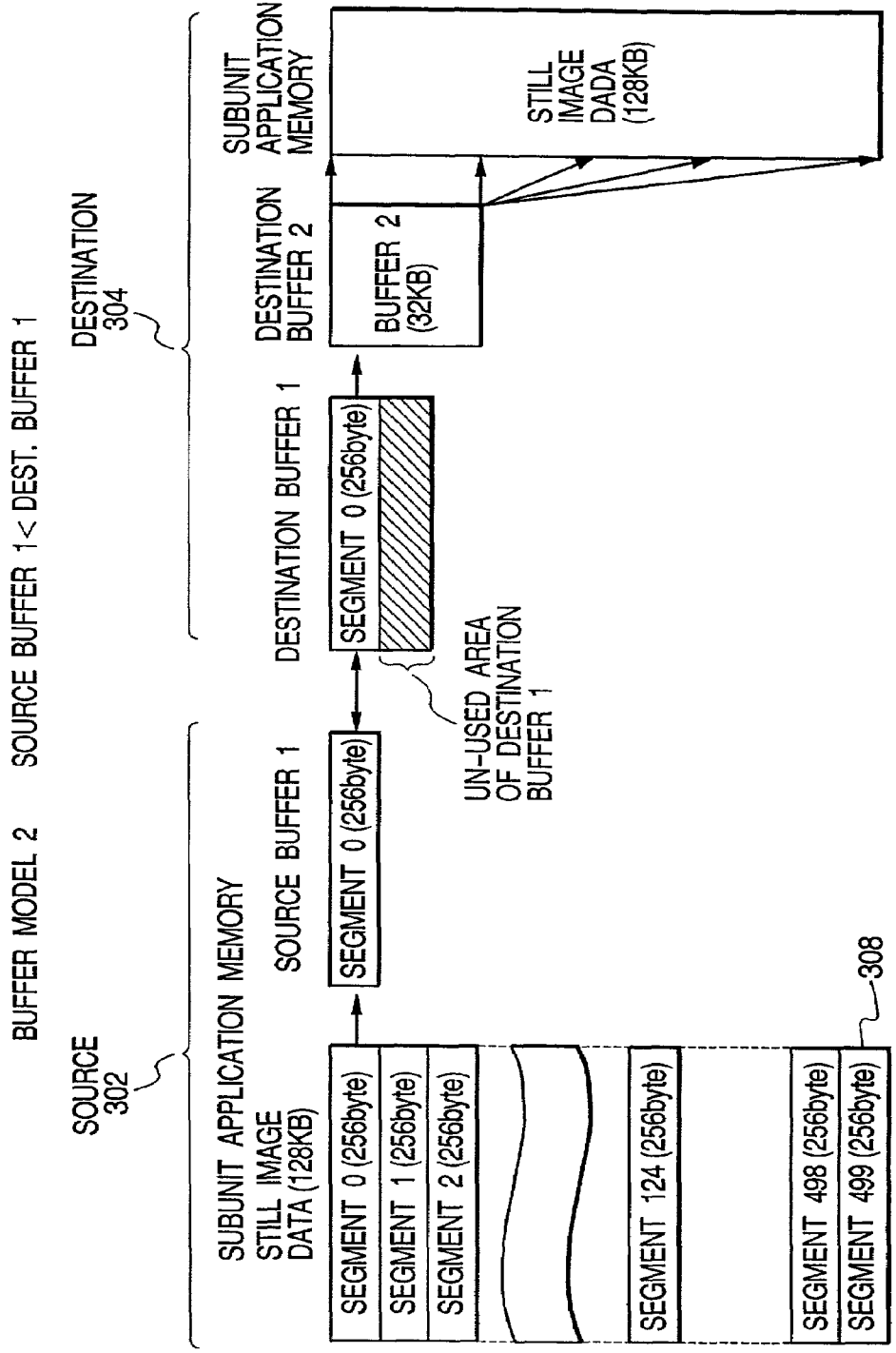

DATA COMMUNICATION SYSTEM, DATA COMMUNICATION METHOD, AND DATA COMMUNICATION APPARATUS

BACKGROUND OF THE INVENTION

1. Field of the Invention

The present invention relates to a data communication system, a data communication method and a data communication apparatus. More particularly, the invention relates to the network capable of communicating at high speeds, while carrying information data (including image data) intermixed with command data. The invention also relates to the communication protocol applicable to such network.

2. Related Background Art

Conventionally, among the peripheral devices of a personal computer (hereinafter referred to as a PC), a hard disc and a printer are those which have been used most frequently. These peripheral devices are connected with a PC through a digital interface, such as the input/output interface dedicated for use of a specific device, the SCSI (small computer system interface), or some other versatile interfaces.

Meanwhile, in recent years, the AV (audio/visual) equipment, such as a digital camera, a digital video camera, has been given more attention as one of the PC peripheral devices. These AV equipment are also connected with a PC through the interface dedicated for its specific use.

FIG. 1 is a view which shows the conventional communication system formed by the PC and AV equipment.

In FIG. 1, a reference numeral 101 designates an AV equipment (here, a digital camera); 102, a PC; and 103, a printer.

For the digital camera 101, a reference numeral 104 designates a memory that records the digital images after compression; 105, a decoding unit that expands and decodes the compressed image data thus recorded on the memory 104; 106, an image processing unit; 107, a D/A converter; 108, a display unit formed by EVF; and 109, the dedicated digital I/O unit that connects the digital camera 101 and the PC 102.

For the PC 102, a reference numeral 110 designates the dedicated digital I/O unit that connects the PC 102 and the digital camera 101; 111, an operation unit formed by a keyboard, a mouse, and the like; 112, a decoding unit that expands and decodes the compressed image data; 113, a display unit; 114, a hard disc; 115, a RAM and other memory; 116, an MPU; 117, a PCI bus; 118, a SCSI interface that connects the PC 102 and a printer 103.

For the printer 103, a reference numeral 119 designates the SCSI that connects the printer 103 and the PC 102; 120, a memory; 121, the printer head; 122, a printer controller that controls the operation of the printer 103; and 123, the printer driver.

For the conventional communication system, there is no compatibility between the digital interface (the digital I/O unit 109) having the digital cameral 101 and the digital interface (SCSI interface 110) having the printer 103, making it impossible to connect them directly. Therefore, if it is desired to communicate a still image from the digital camera 101 to the printer 103, for example, there is a need for the intervention of a PC under any circumstances.

Also, particularly when still images provided by the AV equipment or a large amount of data, such as moving images, should be handled by the dedicated interface or the SCSI interface, there are such problems as given below, among many others.

The data transfer rate is low.

The communication cable is thick due to the parallel communication.

The numbers and kinds of peripheral equipment that can be connected are limited.

The method of connection is restricted.

The data transfer cannot be made on real time.

In order to solve these problems, there is known IEEE (The Institute of Electrical and Electronics Engineers, Inc.) 1394-1995 standards as one of the higher speed and higher performance next-generation digital interfaces.

The digital interface in accordance with the IEEE 1394-1995 standards (hereinafter referred to as the 1394 interface) has the following distinctive features:

(1) The digital transfer speed is high.

(2) Both the real-time data transfer (that is, Isochronous transfer method) and the Asynchronous transfer method are supported.

(3) The connecting structure (topology) is possible with a higher degree of freedom.

(4) The plug and play function and the active-line insertion and deletion function are supported.

However, although the IEEE 1394-1995 standards define the physical and electrical structures, the most fundamental two data transfer methods, and the like, there are no definition as to the transmission and reception with respect to the kinds of data, the data formats, and the communication protocol based upon which the corresponding communication should be made.

Also, for the Isochronous transfer of the IEEE 1394-1995 standards, there is no regulation as to the response to the send-out packet. Therefore, it is not guaranteed whether or not each of the Isochronous packets is received exactly. As a result, if it is desired to transfer a plurality of continuous data exactly or if it is desired to transfer data exactly by dividing one file data into a plurality of data, the Isochronous transfer method cannot be adopted.

Also, the Isochronous transfer method of the IEEE 1394-1995 standards sets a limit of the total communication numbers to 64 even when there is an empty transfer band. As a result, if it is desired to perform a number of communications with a smaller transfer band, the Isochronous transfer method cannot be adopted.

Also, it is required to suspend the data transfer when the node power supply is turned on and off, the bus reset takes place corresponding to the connection/disconnection of the node, or the like. However, in accordance with the IEEE 1394-1995 standards, if the data transfer is suspended due to the bus reset or transfer errors, there is no way to know the contents of the data that are lost. Further, it is necessary to take an extremely complicated procedure in order to restore the transfer that has been once suspended.

Here, the bus reset means the function with which to recognize a new topology and automatically set the address (node ID) allocated to each of the nodes. With this function, it is made possible for the IEEE 1394-1995 standards to provide both the plug and play function and the active-line insertion and deletion function.

Also, for the system which is formed in accordance with the IEEE 1394-1995 standards, the real-time capability is not a requisite, but no specific proposal has been made as to the communication protocol which is needed for the continuous transfer of the comparatively large amount of object data which should be executed reliably, (such as data on still images, graphics data, text data, file data, program data) by dividing them into one or more segmental data for the intended transfer.

Also, for the communication system based on the IEEE 1394-1995 standards, there is no specific proposal as to the communication protocol which is needed for the implementation of data communication between a plurality of equipment using the communication method whereby to broadcast data asynchronously.

SUMMARY OF THE INVENTION

An object of the present invention is to solve the above-described problems.

Another object of the invention is to provide the technologies and techniques which make it possible to continuously and reliably transfer the object data which do not require the real-time capability for the data communication system, the data communication method, and the data compunction apparatus.

Still another object of the invention is to provide the technologies and techniques which make it possible to optimally set a size of the packet transferred by a source node sequentially and a reception buffer size of each destination node even when the reception capability of each of the destination nodes is different for the data communication system, the data communication method, and the data communication apparatus.

As a preferred embodiment for such objects, the data communication system of the present invention discloses a data communication system comprising:

a source node for transferring asynchronously an object data segmented into one or more segments by using the logical connection relationship set between one or more destination nodes and the source node; and a controller for setting the logical connection relationship between the source node and the one or more destination nodes;

wherein the size of the segment is set in accordance with the reception capability of the one or more destination nodes.

Also, as another embodiment, the data communication system of the present invention discloses a data communication system comprising:

a source node for broadcasting an object data segmented into one or more segments by using the logical connection relationship set between one or more destination nodes; and one or more destination nodes for receiving the object data broadcasts from the source node by using the logical connection relationship;

wherein the size of the segment is set in accordance with the reception capability of the one or more destination nodes.

Also, as another embodiment, the data communication method of the invention discloses a data communication method comprising steps of:

setting the logical connection relationship between the source node and one or more destination nodes; and transferring asynchronously the object data segmented into one or more segments by using the logical connection relationship, wherein the size of the segment is set in accordance with the reception capability of the one or more destination nodes.

As another embodiment, the data communication method of the invention discloses a data communication method comprising steps of:

broadcasting the object data segmented into one or more segments from the source node by using the logical connection relationship set with one or more destination nodes; and receiving the object data broadcast from the source node by using the logical connection relationship, wherein the size of the segment is set in accordance with the reception capability of the one or more destination nodes.

Also, as another embodiment, the data communication method of the invention disclosed a data communication method comprising steps of:

setting the logical connection relationship between the source node and one or more destination nodes; and setting a part of initial settings required for asynchronously transferring the object data segmented into one or more segments using the logical connection relationship, wherein the size of the segment is set in accordance with the reception capability of the one or more destination nodes.

Also, as another embodiment, the data communication method of the invention discloses a data communication method comprising steps of:

setting the logical connection relationship between the source node and one or more destination nodes; and setting the part of the initial settings required for broadcasting the object data segmented into one or more segments by using the logical connection relationship, wherein the size of the segment is set in accordance with the reception capability of the one or more destination nodes.

Also, as another embodiment, the data communication apparatus of the invention discloses a data communication apparatus comprising:

unit for setting the logical connection relationship with one or more destination nodes; and unit for transferring asynchronously the object data segmented into one or more segments by using the logical connection relationship, wherein the size of the segment is set in accordance with the reception capability of the one or more destination nodes.

Also, as another embodiment, the data communication apparatus of the invention disclosed a data communication apparatus comprising:

unit for setting the logical connection relationship between the source node and one or more destination nodes; and reception unit for receiving the object data transferred asynchronously by using the logical connection relationship, the object data being segmented into one or more segments, wherein the size of the segment is set in accordance with the reception capability of the one or more destination nodes.

Also, as another embodiment, the data communication apparatus of the invention discloses a data communication apparatus comprising:

unit for setting the logical connection relationship with one or more destination nodes; and unit for broadcasting the object data segmented into one or more segments by using the logical connection relationship, wherein the size of the segment is set in accordance with the reception capability of the one or more destination nodes.

Also, as another embodiment, the data communication apparatus of the invention discloses a data communication apparatus comprising:

unit for setting the logical connection relationship with the source node; and reception unit for receiving the object data broadcast by using the logical connection relationship, the object data being segmented into one or more segments, wherein the size of the segment is set in accordance with the reception capability of the one or more destination nodes.

Also, as another embodiment, the data communication apparatus of the invention discloses a data communication apparatus comprising:

unit for setting the logical connection relationship between the source node and one or more destination nodes; and unit for setting partly the initialization required for asynchronously transferring the object data segmented into one or more segments by using the logical connection relationship, wherein the size of the segment is set in accordance with the reception capability of the one or more destination nodes.

The objects of the present invention other than those described above, and the advantages thereof will be apparent with reference to the description of the embodiments of the invention to follow.

BRIEF DESCRIPTION OF THE DRAWINGS

FIG. 3 is a view which illustrates the conception of the fundamental structure of the communication protocol in accordance with a first embodiment of the present invention.

FIG. 19 is a view which shows the format of response used for the second and third embodiments.

FIG. 20 is a view which illustrates the contents of the SET SOURCE command and response shown in FIG. 16.

FIG. 21 is a view which illustrates the contents of the OBJECT SEND command and response shown in FIG. 16.

FIG. 22 is a view which illustrates the table for use of connection management held by the controller in accordance with the second embodiment.

FIG. 26 is a view which illustrates the contents of the CLEAR CONNECTION command and response sown in FIG. 16.

FIG. 28 is a view which illustrates the contents of the SET DESTINATION command and response shown in FIG. 27.

FIG. 29 is a view which illustrates the contents of the SET SOURCE command and response shown in FIG. 27.

FIG. 30 is a view which illustrate the table of connection management held by the controller in accordance with the third embodiment.

FIG. 43 is a view which illustrates the other example of the transfer model of the object data in accordance with the eighth embodiment.

DETAILED DESCRIPTION OF THE PREFERRED EMBODIMENTS

Hereinafter, with reference to the accompanying drawings, the preferred embodiments of the present invention will be described in detail.

Figure 1:
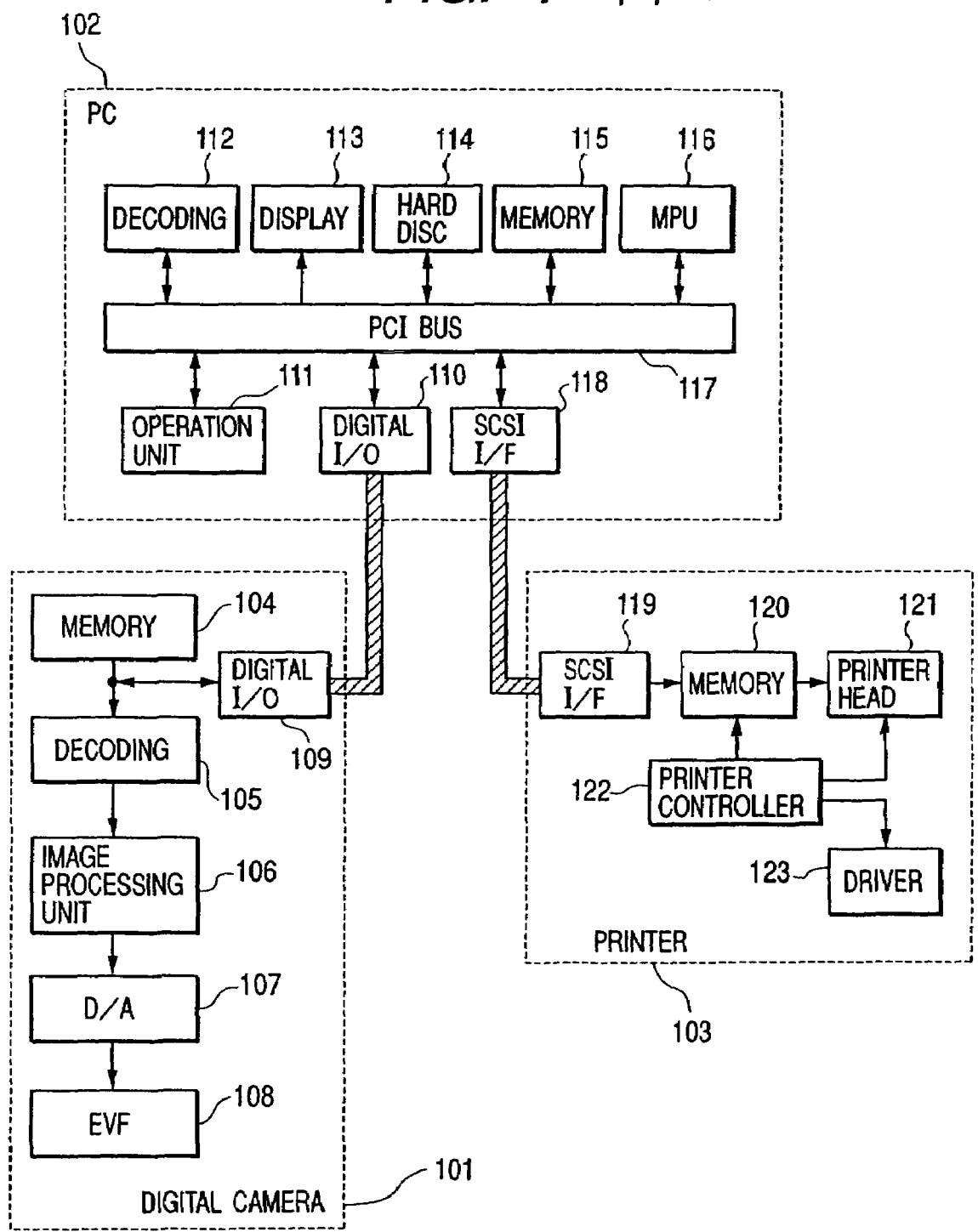
FIG. 1 is a view which illustrates the conventional system.
Figure 2:
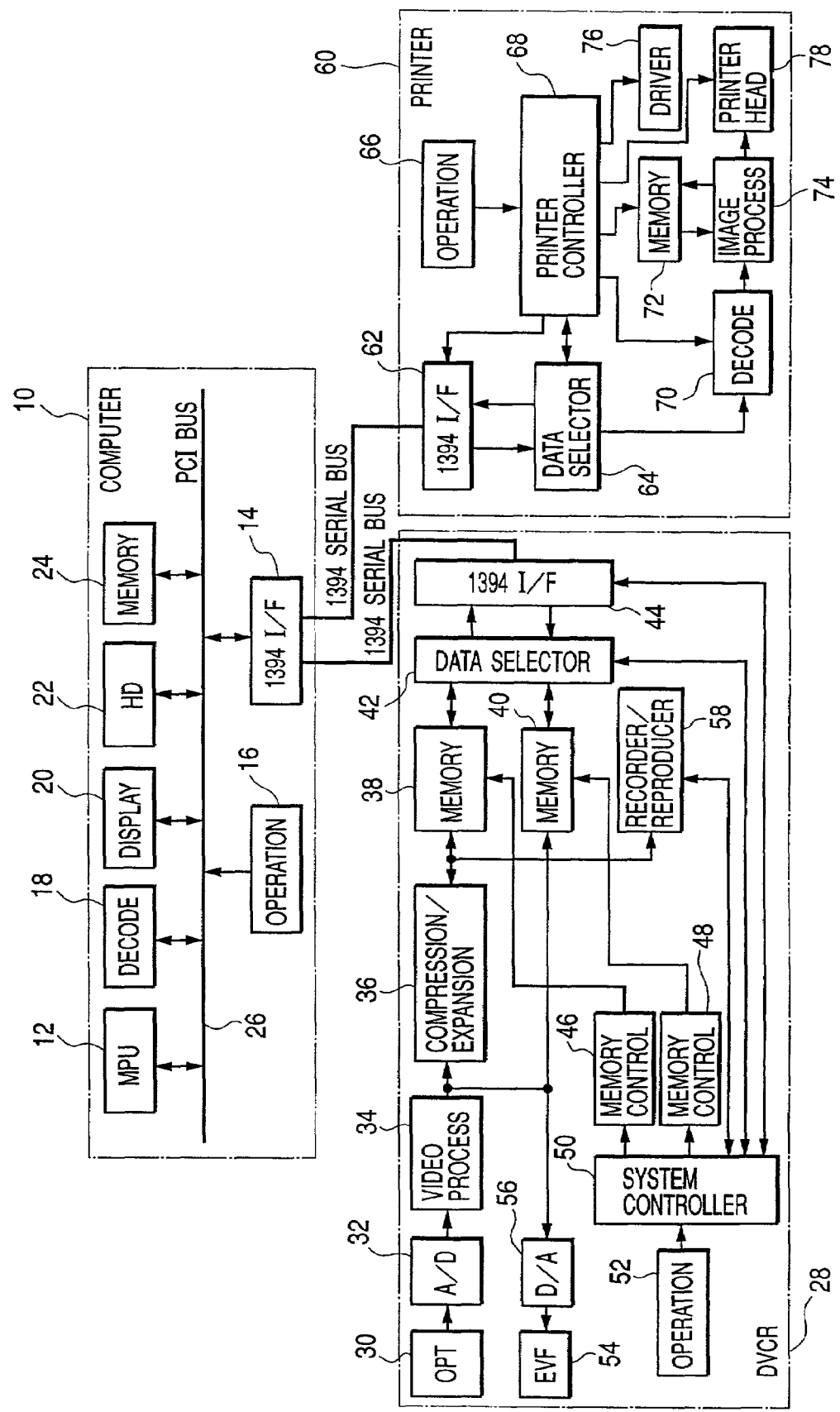
FIG. 2 is a block diagram which shows the structural example of the communication system in accordance with the present embodiment.

FIG. 2 is a view which shows one structural example of the data communication system in accordance with the present embodiment. As shown in FIG. 2, this data communication system comprises a computer 10; a digital videocoder 28 integrally formed with a camera; and a printer 60.

At first, the description will be made of the structure of the computer 10. A reference numeral 12 designates the arithmetic processing unit (MPU) that controls the operation of the computer 10; 14, the 1394 interface having the function based upon the IEEE 1394-1995 standards and the function related to the communication protocol regulated by the present embodiment; 16, the operation unit formed by the keyboard, mouse, and others; 18, the decoder that decodes the compression coded digital data (moving image data, still image data, audio data, and the like); 20, the display unit formed by a CRT display, a LCD panel and the like; 22, a hard disc that records various digital data (such as moving image data, still image data, audio data, graphics data, text data, program data); 24, the inner memory; 26, the inner bus that connects each of the processing units in the interior of the computer 10, such as PCI bus.

Now, the description will be made of the digital videocoder formed integrally with the camera (hereinafter referred to as a DVCR) 28. Here, a reference numeral 30 designates a photographing (image pickup) unit (opt) where the optical image of an object is converted into electric signals, and the electric signals are converted the digital image; 32, an analogue-digital (A/D) converter; 34, the image processing image where the digital moving image and the still image are converted into the digital image data in a specific format; 36, the compression/expansion processing unit which is provided with the function to decode the compression coded digital data (moving image data, still image data, audio data, and the like), and the function to code digital image data highly efficiently (for example, to quantize them after the orthogonal conversion per unit of a specific image like MPEG method or DV method so as to make them codes having variable length; 38, a memory that provisionally stores the digital image data thus coded highly efficiently; 40, a memory that provisionally stores the digital image data which are not coded highly efficiently; 42, a data selector; 44, the 1394 interface provided with the function based on the IEEE 1394-1995 standards and with the function related to the communication protocol regulated by the present embodiment; 46 and 48, the memory controller that controls writing to and reading from the memories 38 and 40; 50, the control unit (system controller) that controls the operation of the DVCR 28, and this unit is provided with a microcomputer; 52, an operating unit formed by a remote control, an operation panel, and the like; 54, an electronic view finder (EVF); 56, a D/A converter; 58, a record and reproducing unit formed by a recording medium, such as a magnetic tape, a magnetic disc, a magneto-optic disc, and this unit records and reproduces various digital data (data on moving images, data on still images, vice data, and the like).

Now, the description will be made of the structure of the printer 60. A reference numeral 62 designates the 1394 interface having the function based on the IEEE 1394-1995 standards and the function related to the communication protocol regulated by the present embodiment; 64, a data selector; 66, an operation unit formed by the operation buttons, a touch panel, and the like; 68, the printer controller that controls the operation of the printer 60; 70, a decoder; 72, an inner memory; 74, the image processing unit that processes the data on the still image, the text data, the graphics data, and the like which are received through the 1394 interface; 76, a driver; and 78, a printer head.

As shown in FIG. 2, each of the communication apparatuses (hereinafter referred to as the node), such as the computer 10, the DVCR 28, and the printer 60, is connected with each other through the 1394 interfaces 14, 44, and 62 (hereinafter, the network formed by the 1394 interfaces is referred to as the 1394 serial bus). It is made possible for each of the nodes to transfer various object data (data on the moving image, data on the still image, the audio data, the graphics data, the text data, the program data, and the like, for example) by defining the specific communication protocol, and also, it is made possible to perform the remote control in accordance with the command data. For the present embodiment, the communication protocol is defined with the adoption of the Asynchronous transfer method.

Now, in conjunction with FIG. 2, the description will be made of the operation of each of the nodes that form the communication system of the present embodiment.

At first, the function and operation will be described for each of the processing units that form the computer 10.

In accordance with the present embodiment, the computer 10 operates as the controller that controls the transmission and reception of image data between the DVCR 28 and the printer 60, for example, or as the controller that performs the remote control of the DVCR 28 and the printer 60.

The MPU 12 executes the software recorded on the hard disc 22. At the same time, it transfers various data to the inner memory 24. Also, the MPU 12 operates intervention dually between each of the processing units connected with the inner bus 26.

The 1394 interface 14 receives the image data transferred to the 1394 serial bus. At the same time, it can transmit the image data recorded on the hard disc 22 or the inner memory 24 to the 1394 serial bus. Also, the 1394 interface 14 is able to transmit the command data on the 1394 serial bus in order to perform the remote control of some other node. Further, the 1394 interface 14 is provided with a function to transfer to some other node the signals which have been transferred through the 1394 serial bus.

The user selects the desired software through the operation unit 16 to let the MPU 12 to execute the software recorded on the hard disc 22. Here, the information of this software is provided for the use by means of the display unit 20. With this software, the decoder 18 decodes the image data received from the 1394 serial bus. The image data thus decoded is provided for the user by means of the display unit 20.

Now, the description will be made of the function and operation of each of the processing units that form the DVCR 28.

In accordance with the present embodiment, the DVCR 28 operates as the image transfer apparatus (source node) that transfers the image data asynchronously on the basis of the communication protocol of the present embodiment.

The photographing unit 30 converts the objective optical image into the electric signal containing the luminance signal (Y) and the chromatic differential signal (C). Then, this unit supplies such electric signal to the A/D converter 32. The A/D converter 32 digitizes such electric signal.

The image processing unit 34 executes the specific processes of the digitized luminance and chromatic differential signals. At the same time, it makes them multiple. The compression/expansion processing unit 36 may be able to compress data using an independent compression circuit in parallel with the process of the digitized luminance and chromatic differential signals or these processes may be executed in time series by use of the shareable compression process circuit.

Also, the compression/expansion processing unit 36 gives shuffling treatment to the compressed image data in order to withstand transfer path errors. In this way, it becomes possible to change the continuous errors in codes (that is, a burst error) into the scattered errors (that is, a random error) which can be remedied or interpolated more easily. Here, if it is desired to average the biased amounts of information due to the roughness or fineness on the surface of an image, this processing step should be executed before a compression process. Then, a good result is obtainable when a variable length coding, such as run length, is adopted.

The compression/expansion processing unit 36 adds the data identification information (ID) to the compressed image data in order to restore its shuffling. The compression/expansion processing unit 36 adds the error correction code (ECC) to the compressed image data in order to reduce the errors that may take place when the data are reproduced.

The image data compress in the compression/expansion processing unit 36 are supplied to the memory 38 and the recording and reproducing unit 58. The recording and reproducing unit 58 records the compressed image data with the added ID and ECC on the magnetic tape or some other recording medium. Here, the compressed image data are recorded on the independent area which is different from the one where the audio data are recorded.

On the other hand, the image data supplied from the image processing unit 34 to the D/A converter 56 are D/A converted. The EVF 54 displays the analogue image signals supplied from the D/A converter 56. Also, the image data processed in the image processing unit 34 are supplied to the memory 40. Here, the image data which are not compressed are stored on the memory 40.

The data selector 42 selects the memory 38 or the memory 40 in accordance with the instruction from the user to supply the compressed image data or non-compressed image data to the 1394 interface 44. Also, the data selector 42 supplies the image data supplied from the 1394 interface 44 to the memory 38 or the memory 40.

The 1394 interface 44 transfers the compressed image data or non-compressed image data asynchronously in accordance with the communication protocol of the present invention, which will be described later. Also, the 1394 interface 44 receives the control command through the 1394 serial bus in order to control the DVCR 28. The control command thus received is supplied to the control unit 50 through the data selector 42. The 1394 interface 44 returns the response to the aforesaid control command.

Now, the description will be made of the function and operation of each of the processing units that form the printer 60.

In accordance with the present embodiment, the printer 60 operates as the image reception apparatus (a destination node) that prints by receiving the image data transferred asynchronously in accordance with the communication protocol of the present embodiment, for example.

The 1394 interface 62 receives the image data and control command transferred asynchronously through the 1394 serial bus. Also, the 1394 interface 62 transmits the response to the control command.

The image data thus received are supplied to the decoder 70 through the data selector 64. The decoder 70 decodes the image data, and outputs its result to the image processing unit 74. The image processing unit 74 stores the decoded image data on the memory 72 provisionally.

Also, the image processing unit 74 converts the image data provisionally stored on the memory 72 into the printing data and supplies them to the printer head 78. The printer head 78 executes printing in accordance with the control of the printer controller 68.

On the other hand, the control command thus received are inputted into the printer controller 68 through the data selector 64. The printer controller 68 performs various controls of printing in accordance with the control data. For example, it controls the sheet feed, the position of the printer head 78, and the like by means of the driver 76.

Now, in conjunction with FIG. 8, the detailed description will be made of the structures of the 1394 interfaces 14, 44, and 62 in accordance with the present embodiment.

The 1394 interface is formed by the plural layers (hierarchical arrangement) functionally. In FIG. 8, the 1394 interface is connected with the 1394 interface of the other node through the communication cable 801 based on the IEEE 1394-1995 standards. Also, the 1394 interface is provided with one or more communication ports 802, and each of the communication ports 802 is connected with the physical layer 803 contained in the hardware unit.

Figure 8:
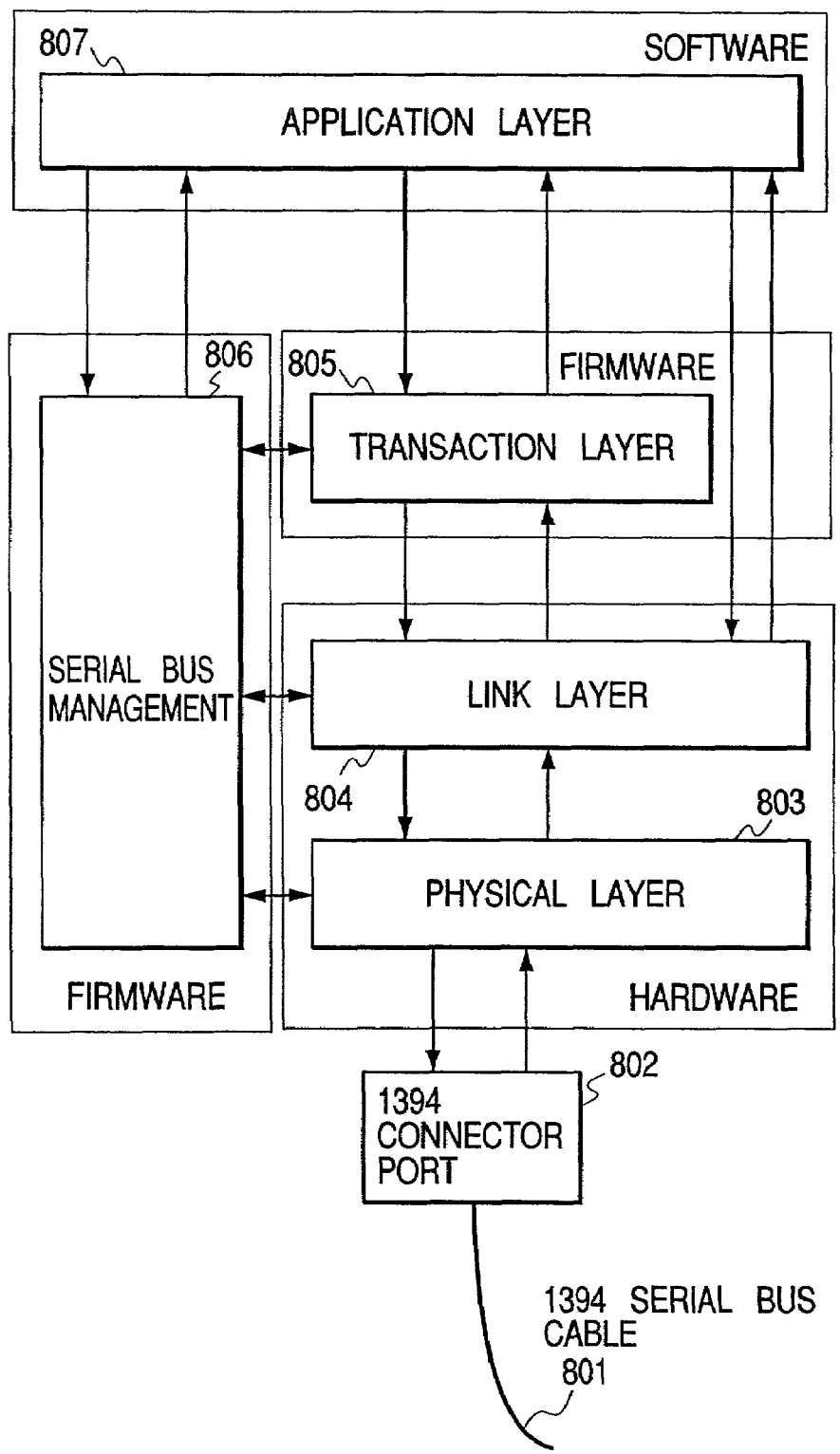
FIG. 8 is a view which illustrates the structure of the 1394 interface in accordance with the present embodiment.

In FIG. 8, the hardware unit comprises the physical layer 803 and the ling layer 804. The physical layer 803 performs the detection of the physical and electrical interface and the bus reset of the other node and the processes related thereto; the coding and decoding of the input and output signals; and the intervention of the bus availability, among some others. Also, the link layer 804 performs the generation of communication packets; the transmission and reception of various communication packets; and the control of cycle timer, among some others. Also, the link layer 804 provides the generation of the Asynchronous broadcast packet which will be described later and the function of the transmission and reception thereof.

Also, in FIG. 8, the firmware unit contains the transaction layer 805 and the serial bus management 806. The transaction layer 805 manages the asynchronous transfer method, and provides various transactions (reading, writing, and locking). also, the transaction layer 805 provides the function of the Asynchronous broadcast transaction. The serial bust management 806 provides the function to control the self node, to manage the connection status of the self node; to manage the ID information of self node, and to manage the serial bus network resources in accordance with the IEEE 1212 CSR regulations which will be described later.

The hardware unit and the firmware unit shown in FIG. 8 are those which form the 1394 interface essentially. The fundamental structure thereof are regulated by the IEEE 1394-1995 standards.

Also, the application layer 807 contained in the software unit is different depending on the application software to be used, and it controls the transfer of an object data currently applicable.

The communication protocol of the present embodiment, which will be described later, expands the functions of the hardware unit and firmware unit that form the 1394 interface, and provides the newly regulated transfer procedure to the software unit.

First Embodiment

Now, in conjunction with FIG. 3, the description will be made of the fundamental structure of the communication protocol regulated by the present embodiment.

In FIG. 3, a reference numeral 300 designates a controller; 302, the source node; 304, the n numbers destination nodes, where (n≧1); 306, the subunit of the source node; 308, the object data, such as data on the still image, graphics data, text data, file data, program data.

A reference numeral 310 designates the first memory space in the interior of the destination node 304, which is designated by a specific destination offset #0; and 312, the first connection which represents the logical connection relationship between the source node 302 and the destination node 304. Here, the destination offset means the addresses that designate shareably (in common) the memory space held by the n numbers of destination nodes 304.

A reference numeral 314 designates the nth memory space in the interior of the destination node 304, which is designated by a specific destination offset #n; and 316, the nth connection which represents the logical connection relationship between the source node 302 and the destination node 304.

In accordance with the present embodiment, each of the nodes manages the first memory space 310 to the nth memory space 314 by use of the 64 bit-address space based on the IEEE 1212 CSR (Control and Status Register Architecture) regulations (or, ISO/IEC 13213:1994 regulations). The IEEE 1212 CSR regulations are those which regulate the control, management, and address allocation for use of the serial bus.

Figures 6A, 6B:
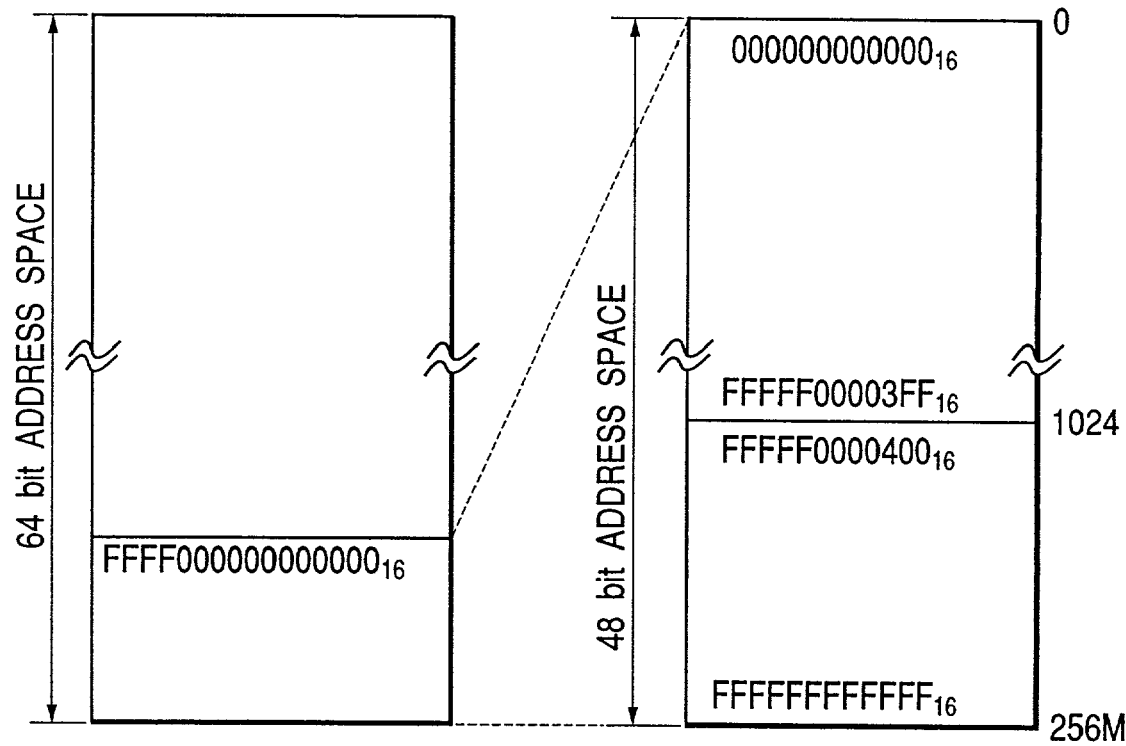
FIGS. 6A and 6B are views which illustrate the address space of each of the nodes.

FIGS. 6A and 6B are views which illustrate the address space held by each of the nodes. FIG. 6A the logical memory space provided by 64-bit address. FIG. 6B shows a part of the memory space shown in FIG. 6A, which is, for example, a space where the higher order 16 bits become $FFFF_{16}$. The first memory space 310 to the nth memory space 314 shown in FIG. 3 use a part of memory space shown in FIG. 6B. Each of the memory spaces 310 to 314 is designated by the destination offset which represents the lower order 48 bits of the corresponding address.

In FIG. 6B, the addresses $000000000000_{16}$ to $0000000003FF_{16}$ are the reserved area. The area where the object data 308 are written actually is those having the addresses whose lower order 48 bits become $FFFFF0000400_{16}$ and on.

In FIG. 3, the source node 302 means the node which has the function to transfer the object data 308 in accordance with the communication protocol which will be described later. The destination node 304 means the node which has the function to receive the object data 308 thus transferred from the source node 302. Also, the controller 300 means the node which has the function to set the logical connection relationship (that is, the interconnection) between the source node 302 and one or more destination nodes 304 and manage it in accordance with the communication protocol which will be described later.

Here, the controller 300, the source node 302, and the destination node 304 may be able to function as each of the independent nodes. Also, the controller 300 and the source node 302 may be able to function as one same node. Also, the controller 300 and the destination node 304 may be able to function as one same node. In this case, there is no need for the transaction between the controller 300 and the source node 302 or between the controller 300 and the destination node 304. Then, the resultant communication procedures become simpler to that extent.

For the present embodiment, the description will be made of the case where the controller 300, the source node 302, and the destination node 304 are arranged to function as individual nodes, respectively. For example, the computer 10 which is provided with the 1394 interface 14 functions as the controller 300. Also, the DVCR 28 which is provided with the 1394 interface 44 functions as the source node 302. Then, the printer 60 which is provided with the 1394 interface 62 functions as the destination node 304.

For the present embodiment, it is possible to set one or more connections between the source node 302 and one or more destination nodes 304 as shown in FIG. 3. These connections are set by one or more controllers 300 in accordance with the communication protocol which will be described alter when a certain data transfer is requested.

In accordance with the present embodiment, it is possible to set one or more destination offsets which can be used for one connection. The value of this destination offset may be the one predetermined or the one that may be set variably by the controller 300 or the source node 302. In this respect, the relationship between the connection and the destination offset is defined in accordance with the communication protocol which will be described later.

When a plurality of destination offsets are set for one connection, it is possible to implement the data communication in plural modes by use of one connection. For example, if a different destination offset is allocated to each mode of the data communications, it is possible to realize the data communication one to one, the data communications one to N, or N to N simultaneously by use of one connection.

Here, in accordance with the present embodiment, the computer 10, which serves as the controller 300, may be able to function as the destination node 304. In this case, connection is set between one source node 302 and two destination nodes 304 so as to transfer the object data 308 accordingly.

Also, for the present embodiment, the description is made of the case where the computer 10 operates as the controller 300, but it is unnecessary that the computer 10 should become the controller 300. The DVCR 28 or the printer 60 may be able to operate as the controller 300.

Now, the description will be made of the fundamental transfer procedure of the communication protocol regulated in accordance with the present embodiment.

Figure 4A:
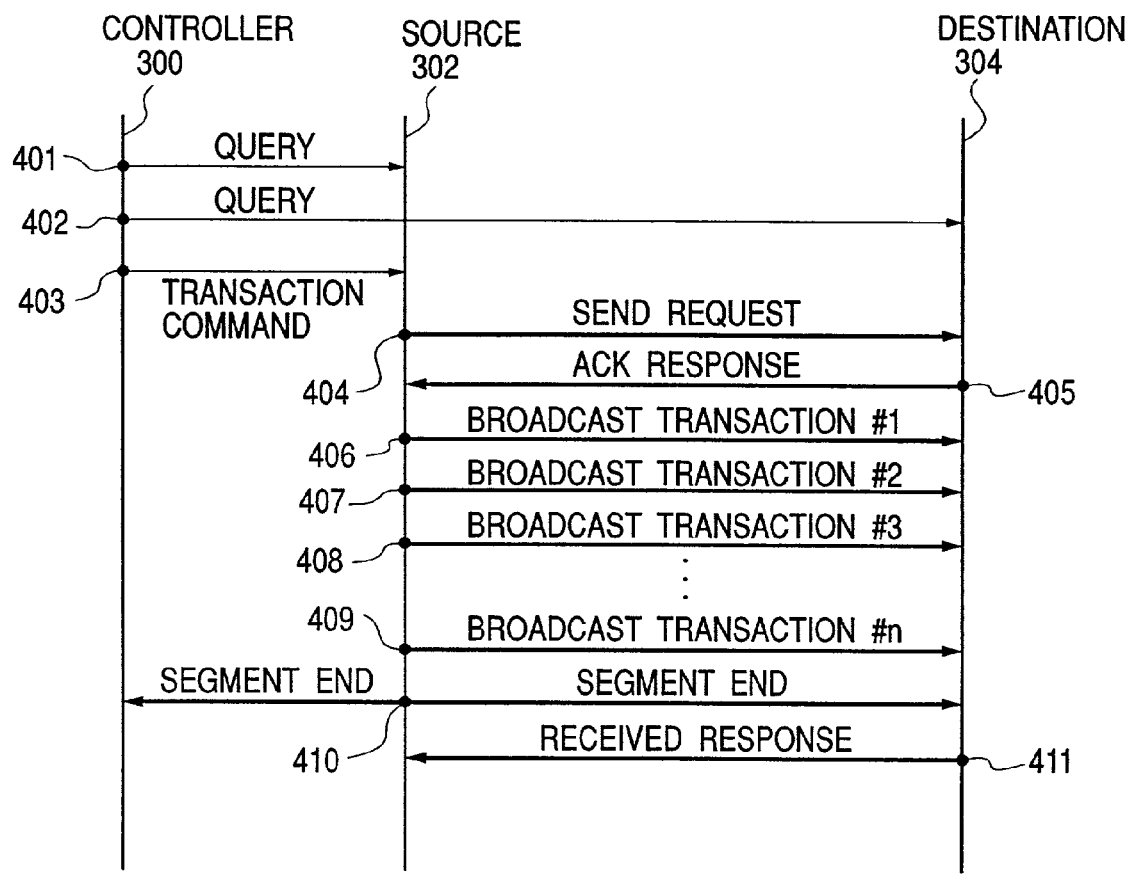
FIGS. 4A and 4B are the sequence charts which illustrate the fundamental communication procedures of the communication protocol in accordance with the first embodiment.
Figure 4B:
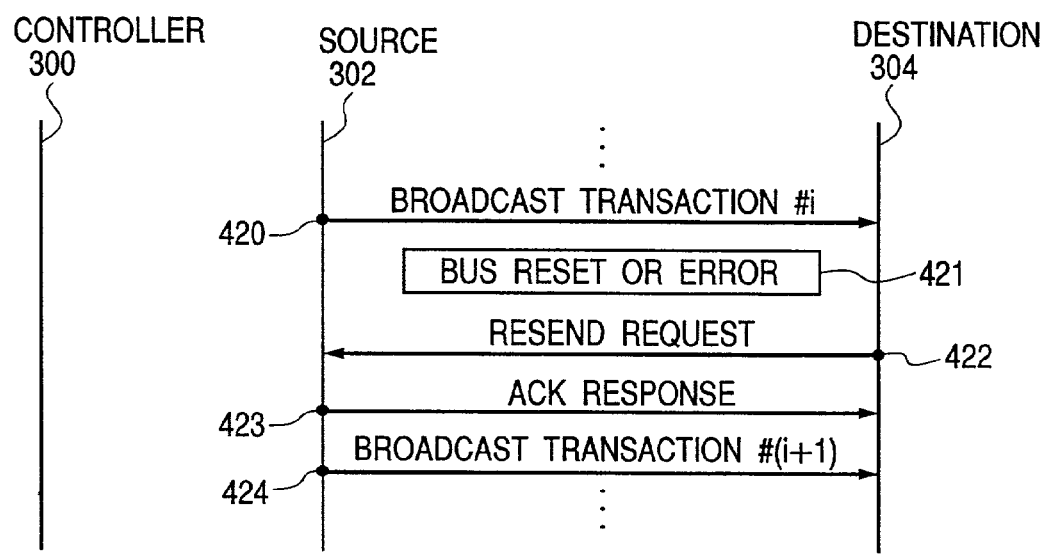

FIG. 4A is a sequence chart which illustrates the procedure in which one object data is transferred using a connection set by the controller 300. FIG. 4B is a sequence chart which illustrate the procedure where a bus reset or transfer errors take place during the transfer of one object data.

In accordance with the communication protocol of the present embodiment, one object data is transferred by means of the one or more "Asynchronous broadcast transactions" after a certain controller 300 has set the connection. The detailed communication procedure of the Asynchronous broadcast transaction will be described in conjunction with FIGS. 4A and 4B. Also, the packet (hereinafter referred to as Asynchronous broadcast packet) used for the Asynchronous broadcast transaction will be described in conjunction with FIG. 5.

In this respect, the Asynchronous broadcast transaction and the Asynchronous broadcast packet are a completely new communication procedure and a packet format regulated by the communication protocol of the present embodiment.

Now, hereunder, in conjunction with FIG. 4A, the description will be made of the fundamental transfer procedure in accordance with the communication protocol of the present embodiment.

The controller 300 sets the connection ID in order to identify the logical connection relationship (that is, the interconnection) between the source node 302 and one or more destinations 304. Then, the controller 300 notifies each of the nodes of the connection ID and the world wide unique ID of its own, hence establishing one connection (at 401 and 402 in FIG. 4A).

After the notification of the connection ID, the controller 300 instructs the source node 302 to begin transferring the object data 308 (at 403 in FIG. 4A).

After the reception of the instruction to begin the transfer, the source node 302 executes the negotiation with one or more destination nodes 304 to make the initial setting of the Asynchronous broadcast transaction (at 404 and 405 in FIG. 4A).

After the completion of the initial setting, the source node 302 executes the Asynchronous broadcast transaction to sequentially broadcast the object data 308 formed by one or more segmental data at 406 to 409 in FIG. 4A).

Figure 7:
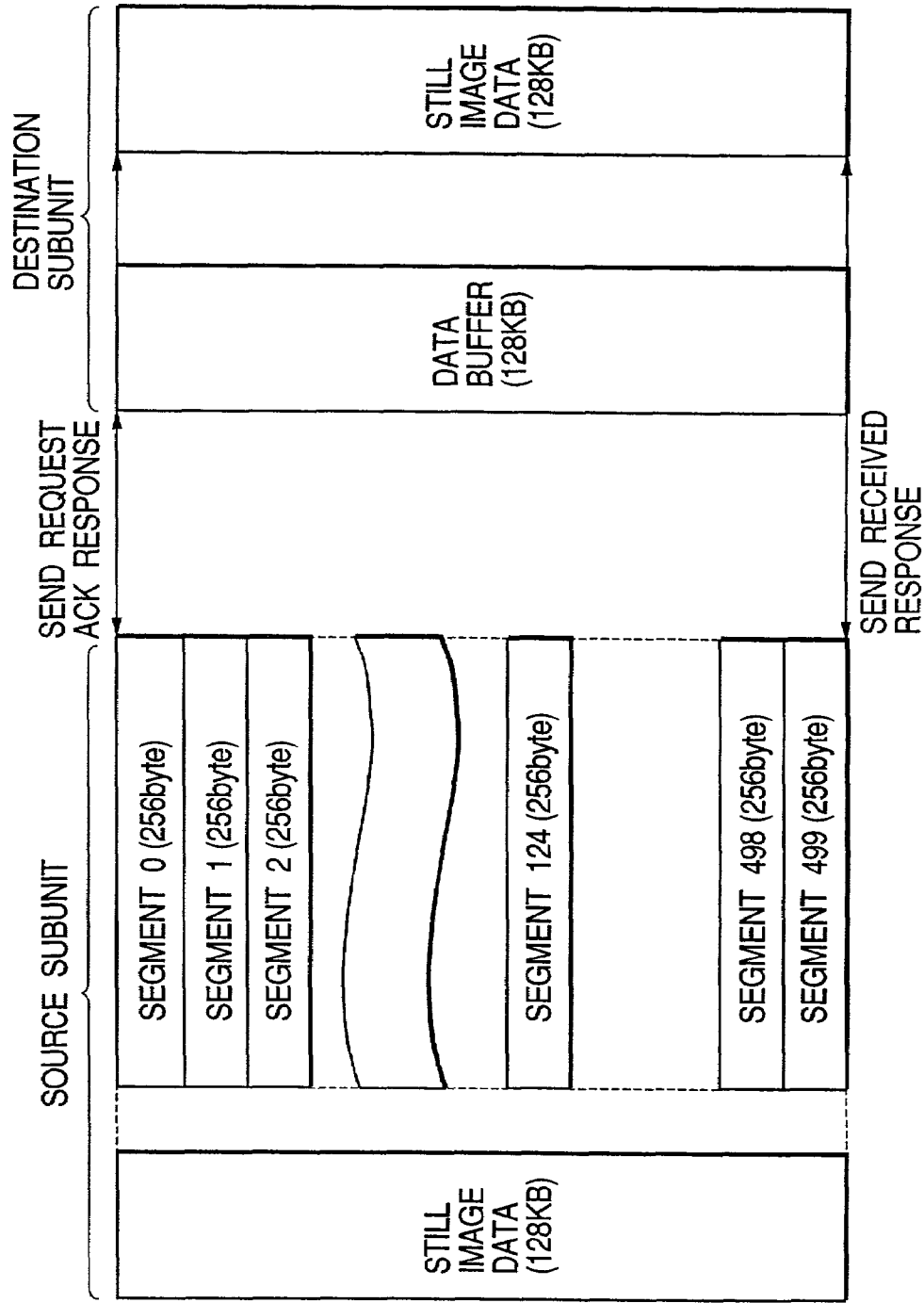
FIG. 7 is a view which illustrates one example of transfer model of the object data in accordance with the first embodiment.

Here, in conjunction with FIG. 7, the description will be made of the transfer model of the object data in accordance with the present embodiment. In FIG. 7, the object data is the data on a still image having a data size of 128 Kbytes, for example.

The source node 302 segments the object data 308 into 500 segmental data (256 bytes per segment), for example, depending on the reception capability of each of the destination nodes 304. Here, the data size of one segmental data is defined by the source node 302 to be variable in accordance with the size of inner buffer of each of the destination nodes 304. FIG. 7 shows a case where the inner buffer is secured in the same size as the data size of the object data 308.

Also, the source node 302 transfers one or more segmental data by use of at least one Asynchronous broadcast transaction. In FIG. 7 one segmental data is transferred by use of one Asynchronous broadcast transaction.

After the completion of the transfer of all the segmental data, the source node 302 terminates the data communication with one or more destinations 304 (at 410 and 411 in FIG. 4A).

Now, in conjunction with FIG. 4A, the operation of the controller 300 will be described.

The controller 300 transfers the packet (hereinafter referred to as the connection setting packet) to the source node 302 and one or more destination nodes 304 selected by the user asynchronously in order to set the connection (at 401 and 402 in FIG. 4A). In the pay load of this packet, the connection ID and the world wide unique ID of the controller 300 are stored.

Then, the controller 300 transfers the transmission packet (the transaction command packet) to the source node 302 asynchronously (at 403 in FIG. 4A).

The source node 302 that has received the transmission command packet initiates the setting using the connection ID and the world wide unique ID notified by the controller 300, and executes the Asynchronous broadcast transaction (at 404 to 409 in FIG. 4A). By means of this Asynchronous broadcast transaction, it is made possible for the source node 302 to sequentially transfer the object data 308 which are formed by one or more segmental data.

Here, in accordance with the communication protocol of the present embodiment, the controller 300 provides the function to manage making the connection and releasing it. Therefore, the transfer of the object data 308 is executed by the negotiation between the source node 302 and the destination node 304 once the connection has been established.

After the completion of a series of the Asynchronous broadcast transaction, the source node 302 broadcasts the Asynchronous broadcast packet that indicates the segment end (hereinafter referred to as the segment end packet) (at 410 in FIG. 4A).

After having received the segment end packet from the source node 302, the controller 300 releases the connection and terminates the data transfer (at 411 in FIG. 4A).

Here, the contents of the segment end packet can be detected by the destination node 304, because this packet is broadcast. Therefore, the structure may be arranged so that the connection with the source node 302 is released by the destination node 304 itself, not by the controller 300.

Now, in conjunction with FIG. 4A, the operation of the source node will be described in detail.

With the reception of the connection setting packet and the transmission command packet form the controller 300, the source node 302 sends out the Asynchronous broadcast packet whereby to request data transfer (hereinafter referred to as the send request packet) to each of the destination nodes 304 (at 404 FIG. 4A).

Here, the send request packet is a request packet in order to obtain initial information necessary for the initial setting in the Asynchronous broadcast transaction of the object data 308 before its execution. In this packet, there are written the connection ID designated by the controller 300 and the world wide unique ID of the controller 300.

The destination node 304 broadcasts the Asynchronous broadcast packet which indicates the response to the send request packet (hereinafter referred to as the ack response packet) (at 405 in FIG. 4A). Here, in the ack response packet, are stored the same connection ID and the world wide unique ID as those of the send request packet. Therefore, it is possible for the source node 302 to identify the connection, through which the ack response packet has been transferred, with the confirmation of the connection ID and the world wide unique ID of the reception packet.

Here, in the ack response packet, the size of the inner buffer that may be acquired by each of the destination nodes 304, and the offset addresses that designate a specific memory space. After the reception of the ack response packet, the source node 302 sets the destination offset that shareably designates the memory space of each destination node 304, and initiates the Asynchronous broadcast transaction. Here, the destination offset is set using the offset address contained in the ack response packet.

In this respect, the destination offset used for the Asynchronous broadcast transaction is set using the offset address contained in the ack response packet in accordance with the present embodiment. However, the present invention is not necessarily limited thereto. For example, it may be possible to assign the controller 300 the function to manage the destination offset used for each connection. Then, the structure is arranged so that at the same time that the connection ID is set, the destination offset is set. In this case, the controller 300 notifies the source node of the destination offset that corresponds to each connection.

Then, the source node 302 writes the first Asynchronous broadcast packet on the memory space indicated by the aforesaid destination offset (at 406 in FIG. 4A). In this packet, the connection ID, the world wide unique ID, and the sequential number of the segmental data are stored.

After the transmission of the first synchronous broadcast packet, the source node 302 waits for the response packet from the destination node 304. From the destination node 304, the response packet having the connection ID, the world wide unique ID, and the sequence number stored therein is sent out in the form of the Asynchronous broadcast packet. After the reception of this response packet, the source node 302 increments the sequence number, and transfers the Asynchronous broadcast packet that contains the next segmental data (at 407 in FIG. 4A).

The source node 302 repeats this procedure to execute the Asynchronous broadcast transaction sequentially (at 408 to 409 in FIG. 4A). The maximum waiting time for the response from the destination node 304 is predetermined. If there is no response beyond such time, the same data are transferred again using the same sequence number.

Also, if the response packet that requests the send out again should be transferred from the destination node 304, the source node 302 may broadcast the data of the designated sequence number again.

After the completion of the Asynchronous broadcast transaction of all the object data, the source node 302 broadcasts the segment end packet to terminate the data transfer (at 410 and 411 in FIG. 4A).

Here, as described above, the source node 302 segments the object data 308 into one or more segmental data as required. The aforesaid response packet is created when the Asynchronous broadcast transaction is made for each of the segmental data. The transfer of one segmental data is executed per Asynchronous broadcast transaction. The destination mode 304 is provided with the buffer having the capacity indicated by the aforesaid buffer size.

Here, in accordance with the embodiment described above, the regulation is made so that the response packet should be sent out per Asynchronous broadcast transaction of one segmental data. However, the present invention is not necessarily limited thereto. It may be possible to arrange the structure so that the destination node 304 transmits the response packet after the data buffer provided for the destination node 304 has been filled with a plurality of continuous segmental data.

Now, in conjunction with FIG. 4A, the operation of the destination node 304 will be described in detail.

Having received the connection setting packet from the controller 300, the destination node 304 waits for the send request packet from the source node 302 (at 404 FIG. 4A).

With the reception of the send request packet, the destination node 304 confirms the connection ID and the world wide unique ID written on the packet in order to identify whether or not this packet is the one from the source node 302.

After the reception of the send request packet from the source node 302, each of the destination nodes 304 broadcasts the ack response packet having the connection ID world wide unique ID, the size of the inner buffer that can be secured, and the offset address that designates a specific memory space thereon (at 405 in FIG. 4A).

After having written the Asynchronous broadcast packet transferred from the source node 302 on the memory space, the destination node 304 confirms the connection ID and the world wide unique ID of the packet. If the connection ID and the world wide unique ID thereof agree with the values set by the controller 300, the response packet (containing the connection ID, world wide unique ID, the sequence number contained in the reception packet) is broadcast (at 406 to 409 in FIG. 4A). In this case, the segmental data contained in the reception packet are stored on the inner buffer. Here, if the connection ID and the world wide unique ID contained in the reception packet are not identical to the connection ID and the world wide unique ID set for its own are different, the destination node 304 discards the reception packet.

Also, when the destination node 304 detects the disagreement of the sequence number of the reception packet, it may be able to send out the response packet that requests the transfer of the packet again. In this case, the destination node 304 notifies the source node 302 of the sequence number with which the requested transfer should be made.

After the completion of all the Asynchronous broadcast transaction, the sour node 302 broadcasts the segment end packet. When this packet is received, the destination node 304 terminates the data transfer process (at 410 in FIG. 4A).

After the reception of the segment end packet, the destination node 304 broadcasts the response packet that indicates the normal reception of the segment end packet (at 411 FIG. 4A).

As described above, the communication system of the present embodiment makes it possible to solve the inconveniences which are encountered in the conventional communication system. Also, in the case of the data transfer that does not require a real-time capability, the data can be transferred easily at higher speeds.

Also, in accordance with the present embodiment, the transfer process of the object data is executed between the source node 300 and each of the destination nodes 304 without any control from the controller 300 once the controller 300 has established the connection. In this way, the load on the controller 300 is reduced. Then, it is made possible to provide a simpler communication protocol without going through a complicated communication procedure.

Also, in accordance with the present embodiment, it is structured that the destination node 304 returns its response to each Asynchronous broadcast transaction under any circumstances. In this way, it becomes possible to provide the communication protocol that reliably performs the transfer of the data which does not required a real-time capability.

In order to implement the data transfer more reliably, it is necessary to resume the data transfer promptly without loosing the data at all even when the data transfer is suspended due to the bus resetting or any other transfer errors that may take place. Now, in conjunction with FIG. 4B, the description will be made of the resumption procedure regulated by the communication protocol of the present embodiment.

If, for example, the bus reset takes place after an Asynchronous broadcast packet of sequence number i has been received, each of the nodes suspends the transfer process, and executes the bus initiation, the recognition of the connection structure, the node ID, and some others in accordance with the procedure regulated by the IEEE 1394-1995 standards (at 420 and 421 in FIG. 4B).

After the completion of the bus restructure, each of the destination nodes 304 broadcasts the resumption request packet (resend request packet) having the connection ID, the world wide unique ID, and the sequence number i stored therein (at 422 in FIG. 4B).

If it is possible to resume the Asynchronous broadcast transaction, the source node 302 confirms the connection ID, the world wide unique ID of the resend request packet thus received, and then, broadcasts the ack response packet having them stored therein (at 423 in FIG. 4B).

After that, the source node 302 sequentially broadcasts the segmental data following the sequence number requested by the resend request packet and on, that is, the segmental data beginning with the sequence number (i+1) (at 424 in FIG. 4B).

In accordance with the procedure described earlier, the controller 300, the source node 302, and the destination node 304 can resume the data transfer easily and reliably without examining each of the node Ids even after the data transfer is suspended on its way.

Also, as described earlier, the present embodiment is effective in making the control procedure of the controller 300 simpler even when the data transfer is suspended.

Now, in conjunction with FIG. 5, the description will be made of the structure of the Asynchronous broadcast packet regulated by the present embodiment. The Asynchronous broadcast packet is a data packet having 1 Quadlet ( 4 bytes=32 bits) as its unit, for example.

At first, the structure of the packet header 521 will be described.

Figure 5:
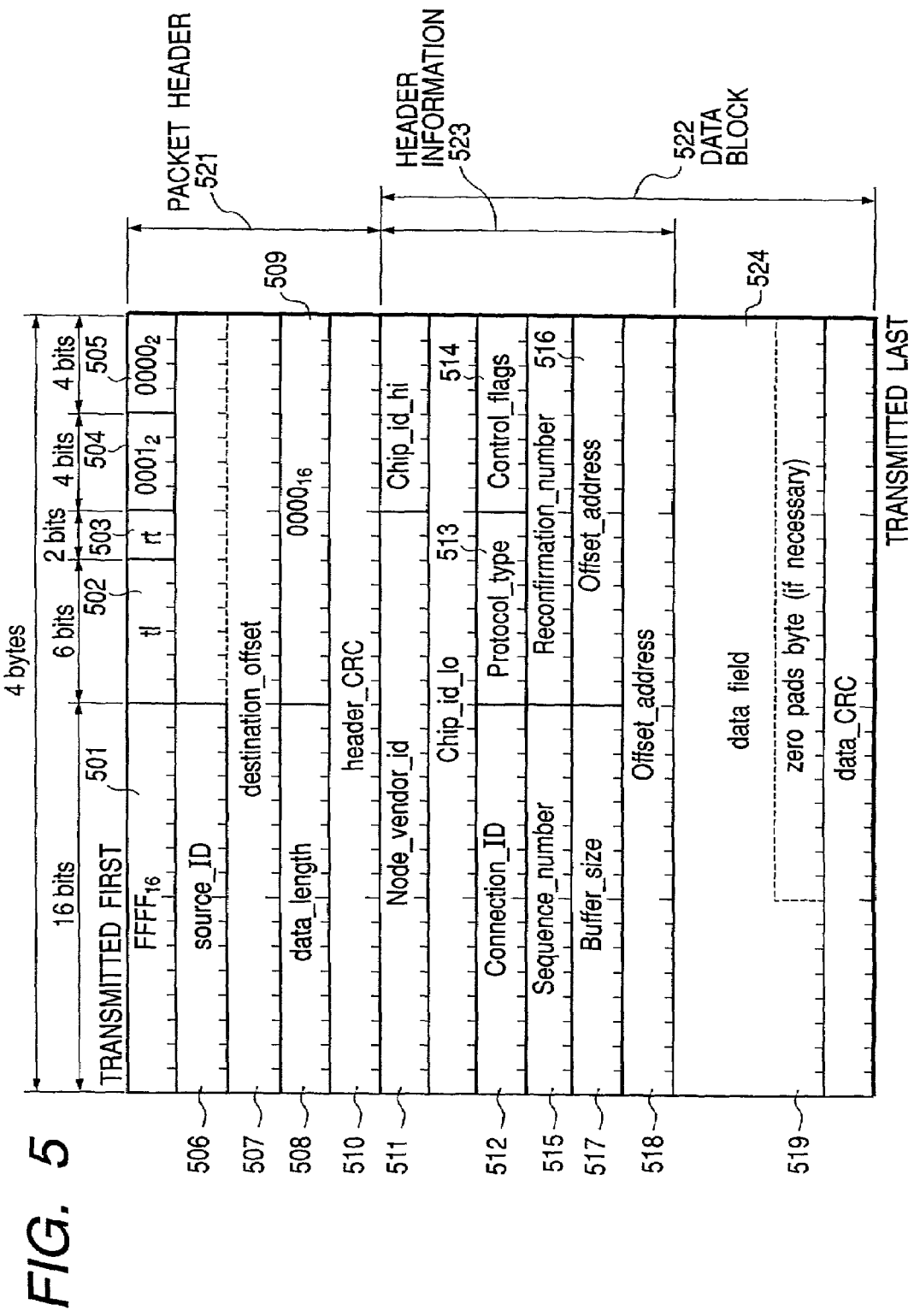
FIG. 5 is a view which shows the structure of the Asynchronous broadcast packet in accordance with the first embodiment

In FIG. 5, the field 501 (16 bits) indicates the destination_ID to represent the node ID of the receiving party (that is, the destination node 304).

Here, in accordance with the IEEE 1394-1995 standards, the higher order 10 bits indicate the destination bus ID (that is, the number that identifies the bus within one network), and the lower order 6 bits indicate the destination physical ID (that is, the number that identifies the node within one bus). Here, if the higher order 10 bits are "3FFh", it indicates the transfer to the local bus as its receiving party. If these are "0h" to "3FFh", it indicates the transfer to a specific bus as its receiving party.

Also, if the lower order 6 bits are "3Fh", it indicates the broadcast packet transfer. If these are "0h" to "3Eh", it indicates the transfer to a specific buss as its receiving party. In accordance with the communication protocol of the present embodiment, it is defined that the value of this field is made the ID for broadcasting use (that is, "$FFFF_{16}$" in order to implement the Asynchronous broadcast transaction of the object data 308.

The field 502 (6 bits) represents the transaction label (tl) field, and serves as the inherent tag for each of the transactions.

The field 503 (2 bits) represents the retry (rt) code, and designates whether or not the packet makes retrial.

The field 504 (4 bits) represents the transaction code (tcode). The tcode designates the format of the packet and the type of the transaction that should be executed. In accordance with the present embodiment, the value of this field is defined as "$0001_2$", for example, and requests the process to write the data block 522 of this packet on the memory space indicated by the destination_offset field 507 (that is, requests the write transaction).

The field 505 (4 bits) represents the priority (pri), and designates the priority order. In accordance with the present embodiment, the value of this field is "$0000_2$".

The field 506 (16 bits) represents the source_ID, and indicates the node ID on the transmission side (that is, source node 302).

The field 507 (48 bits) represents the destination_offset, and shareably designates the lower order 48 bits of the address space provided for each of the destination nodes 304. Here, for the destination_offset, it may be possible to designate either the same value for all the connections or a different value per connection. However, it is more effective if the different value is designated, because then a plurality of connections can process the Asynchronous broadcast packet in parallel.

The field 508 (16 bits) represents the data_length, and indicates the length of the data field per byte unit as describe later.

The field 509 (16 bits) represents the extended_tcode. In accordance with the present embodiment, the value of this field is defined as "$0000_2$".

The field 510 (32 bits) represents the header_CRC, and stores the error detection codes for the aforesaid fields 501 to 509.

Now, the structure of the data block 522 will be described. In accordance with the present embodiment, the data block 522 comprises the header information 523 and the data field 524.

The header information 523 contains the connection ID to identify the logical connection relationship (that is, the interconnection) between each of the nodes. Here, the structure of the header information 523 is different depending on the purpose of use.

Also, the data field 524 is the one having the variable length and stores the aforesaid segmental data. Here, if the segmental data stored on the data field 524 is not a multiple of the quadlet, "0" is packed in the portion which does not fill in the quadlet.

The field 511 (2 quadlets, 64 bits) represents the world wide unique ID assigned to the controller 300. With this world wide unique ID, the 1394 interface of the present embodiment identifies the controller 300 that has the connection between the source node 302 and the destination node 304. In this respect, the world wide unique ID is based on the IEEE 1394-1995 standards, and this ID is inherent to each of the nodes.

Also, in accordance with the present embodiment, the world wide unique ID is used as the information with which to identify the controller that sets each of the connections. The present invention, however, is not necessarily limited thereto. Some other information may be adoptable if only such information can identify each of the nodes specifically without being changed even by the aforesaid bus rest or the like.

The field 512 (16 bits) represents the connection_ID, and stores the connection ID of the present embodiment. The 1394 interface of the present embodiment identifies the connection set between the source node 302 and one or more destination nodes 304 in accordance with the ID stored on this field. For the present embodiment, it is possible for one controller to establish a connection of $2^{16}$×(numbers of nodes). In this way, it becomes possible to set a plurality of connections until the sum of the communication bands used by each of the connections arrives at the maximum capacity of the transfer path.

Also, in accordance with the present embodiment, the 1394 interface identifies the absolute connection set between a certain source node 302 and one or more destination nodes 304 by use of the aforesaid world wide unique ID and the connection ID. Therefore, it becomes possible for a plurality of controllers 300 to set the same connection ID for two different logical connection relationships. In other words, each of the controllers can set its own connection and manage it without any particular attention given to the connection ID set by another controller.

The field 513 (8 bits) represents the protocol_type, and indicates the communication procedure (that is, the kind of the communication protocol) in accordance with the header information 523. When indicating the communication protocol of the present embodiment, the value of this field becomes "$01_{16}$", for example.

The field 514 (8 bits) represents the control_flags, and sets a specific control data that controls the communication procedure of the communication protocol of the present embodiment. In accordance with the present embodiment, the most significant bit of this field is assigned to be the resend_request flag, for example. Therefore, if the most significant bit of this field becomes the value "1", it is indicated that the resumption request (resending request) is made on the basis of the communication protocol of the present embodiment.

The field 515 (16 bits) represents the sequence_number, and sets the continuous values (that is, sequence numbers) for the packet that should be transferred in accordance with a specific connection ID (the connection ID designated by the filed 512). With these sequence numbers, the destination node 304 is able to monitor the continuity of the sequential segmental data handled by the Asynchronous broadcast transaction. If any disagreement takes place, the destination node 304 may be able to request resending in accordance with these sequence numbers.

The field 516 represents the reconfirmation_number. In this embodiment, this field takes on the meaning ony when the resend_request flag bocomes the value "1". For example, when the value of the resend_request flag is the value "1", the sequence number of the packet for requiring the resending is set to this field.

The field 517 (16 bits) represents the buffer_size. On this field, the buffer size of the destination node 304 is set.

The field 518 (48 bits) represents the offset_address. On this field, the lower order 48 bits of the address space provided for the destination node 304 are stored. In this way, as shown in FIG. 3, either one of the first memory space 310 to the nth memory space 314 is designated.

The field 519 (32 bits) represents the data_CRC. On this field, the error detection codes are stored for use of the header information 523 (fields 511 to 518) and the data filed 524 as in the aforesaid header_CRC.

Figure 9:
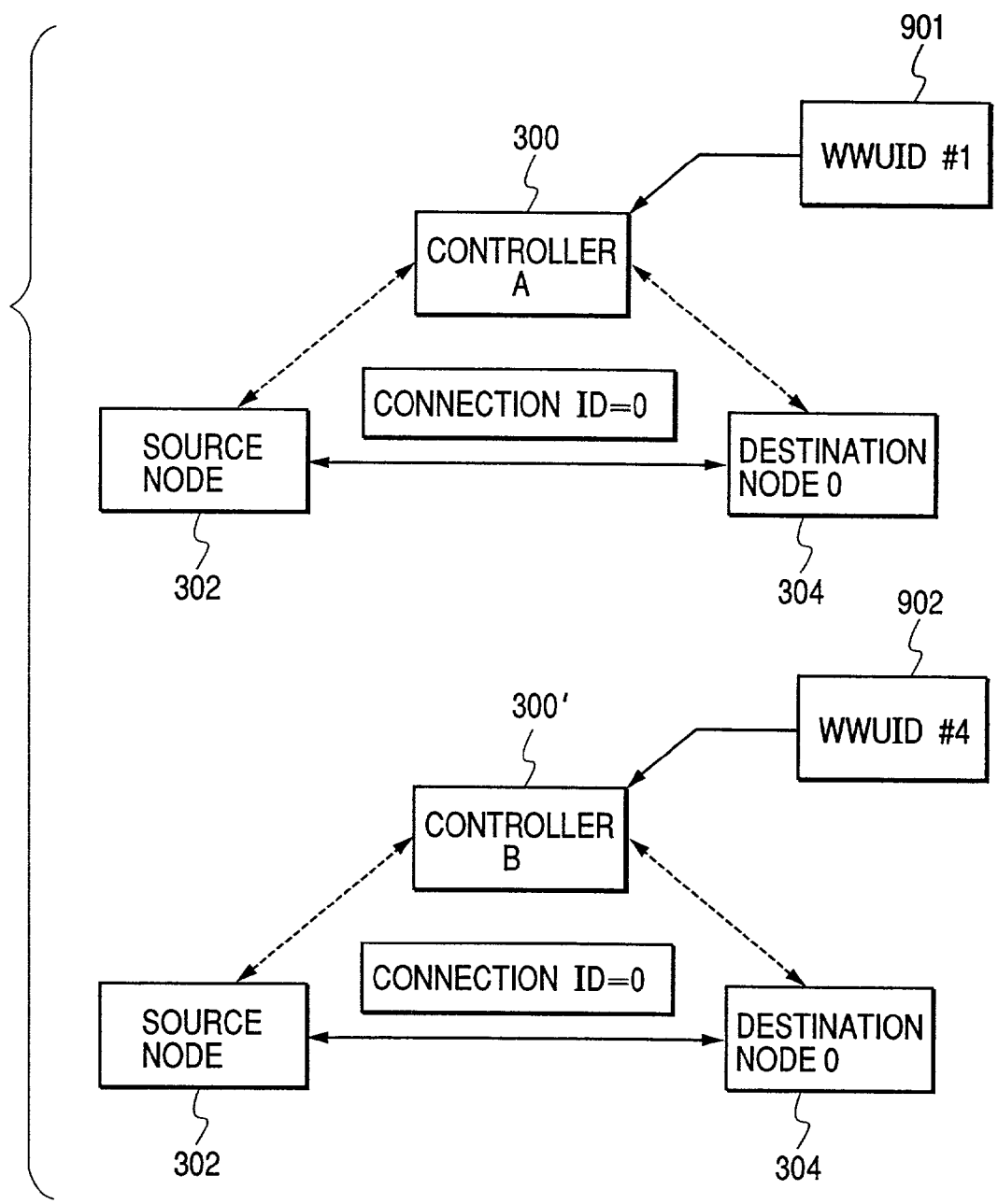
FIG. 9 is a view which illustrates the arrangement with which a plurality of controllers set the same connection ID.

Now, in conjunction with FIG. 9, the detailed description will be made of the setup formed by the two controllers which set one and the same connection ID on the network, respectively. In FIG. 9, the controller A300 is provided with the node unique ID 901 which does not change even when the bus reset or the like takes place. Here, the ID 901 is the world wide unique ID regulated by the IEEE 1394-1995 standards. The value thereof is "1", for example.

Likewise, in FIG. 9, the controller B300' is provided with the node unique ID 902 which does not change even the bus rest or the like takes place as in the case of the controller node A300. Here, this ID 902 is assumed to be the world wide unique ID regulated by the IEEE 1394-1995 standards, but the value thereof is set at "4", for example.

With the world wide unique ID thus set, each of the controllers A and B can establish the same connection between the same or different source node 302 and the destination node 304. In FIG. 9, each of the connection IDs is set at "0", for example.

In this respect, when the controllers A and B set the same connection ID, there is not necessary to execute the negotiation between the controllers A and B so that the connection ID is not overlapped.

For the establishment of the connection, each of the controllers A and B notifies the source node 302 and the destination node 304 of the connection ID and the unique IDs 901 thereof. Then, the source node 302 and the destination node 304 are able to identify the connection and the controllers which have established it, respectively.

Now, in conjunction with FIG. 10, the procedures of setting and releasing the connection set by the controller 300 will be described in detail, thus supplementing the description made in conjunction with FIGS. 4A and 4B.

(1) At first, the controller 300 quires each of the N (N≧1) numbers of destination nodes 304 about the maximum pay load size, that is, the max_rec size that each of the destination nodes 304 may be able to allow per Asynchronous broadcast transaction, and at the same time, notifies each of them of the unique connection ID set by the controller 300. Each of the destination nodes 304 notifies each of the max_rec sizes per command from the controller 300, and returns the response that the connection ID has been set (at 1001 in FIG. 10).

Figure 10:
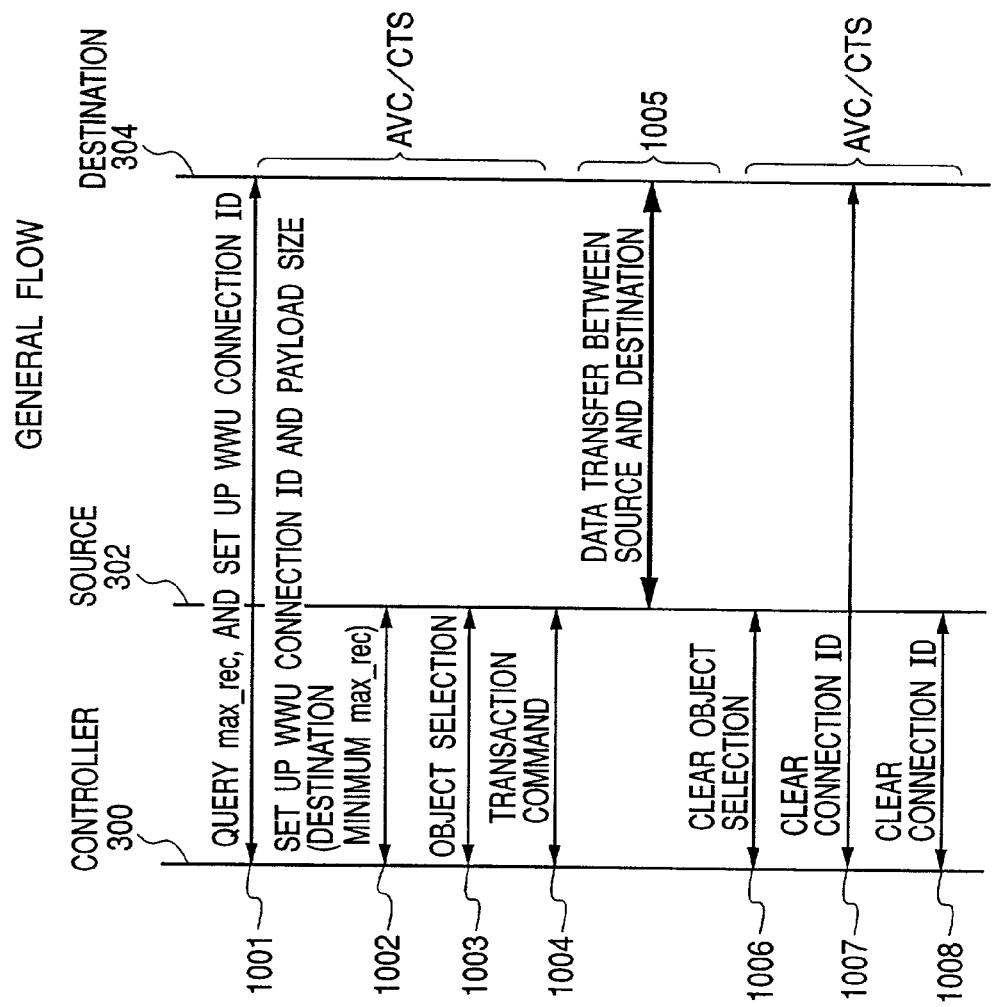
FIG. 10 is a view which illustrates the procedures of the connection setting and releasing.

(2) Then, the controller 300 notifies the source node 302 of the connection ID with which to identify the connection that the controller has set; the world wide unique ID of the controller 300; the sum N of the destination nodes 304 connected logically by this connection; the size of pay load of the Asynchronous broadcast packet which the source node 302 transfers (at 1002 in FIG. 10). Here, the size of the pay load notified from the controller 300 to the source node 302 is the smallest max_rec among the max_rec sizes of each of the destination nodes 304.

From the pay load size from the controller 300, the source node 302 subtracts the size of the header information 523 shown in FIG. 5 (the header of the fixed data size set in the pay load). Then, the result of this subtraction is made to be the data size of one segment whereby to segment the object data 308 as described above.

Also, in this respect, the description has been made of the case where the source node 302 calculates the size of one segmental data, but the controller 300 may calculate it and notify the result thereof to the source node 302. After that, the source node 302 returns the response to indicate each setting per command from the controller 300.

(3) The controller 300 selects one object data 308 for the intended transmission among the object data held by the source node 302 (at 1003 in FIG. 10). The source node 302 returns the response to the controller 300 to indicate the selection of the desired object 308. Here, the selected object 308 may be a still image or a moving image. Also, it may be a text data or a binary data.

(4) Having recognized that the source node 302 is ready to transmit the object data 308 in accordance with the response received from the source node 302, the controller 300 transmits the command to instruct the initiation of the transfer of object data 308 (that is, transaction) to the source node 302 (at 1004 in FIG. 10).

(5) When the source node 302 receives the transaction command from the controller 300, it begins transmitting the selected object data 308 (at 1005 in FIG. 10). Here, the object data 308 is transferred to the N numbers of destination nodes 304 by one or more Asynchronous broadcast transactions as described earlier.

(6) After the completion of the object data 308 transmission, the controller 300 releases the source object 308 (at 1006 in FIG. 10).

(7) At this juncture, the controller 300 further queries the source node 302 about whether or not there is any request of the transmission of some other object. If affirmative, the aforesaid steps (3) to (6) will be repeated.

(8) When the transmission of all the objects is completed, the controller 300 releases the unique connection which has been set previously (at 1007 and 1008 in FIG. 10).

Figure 11:
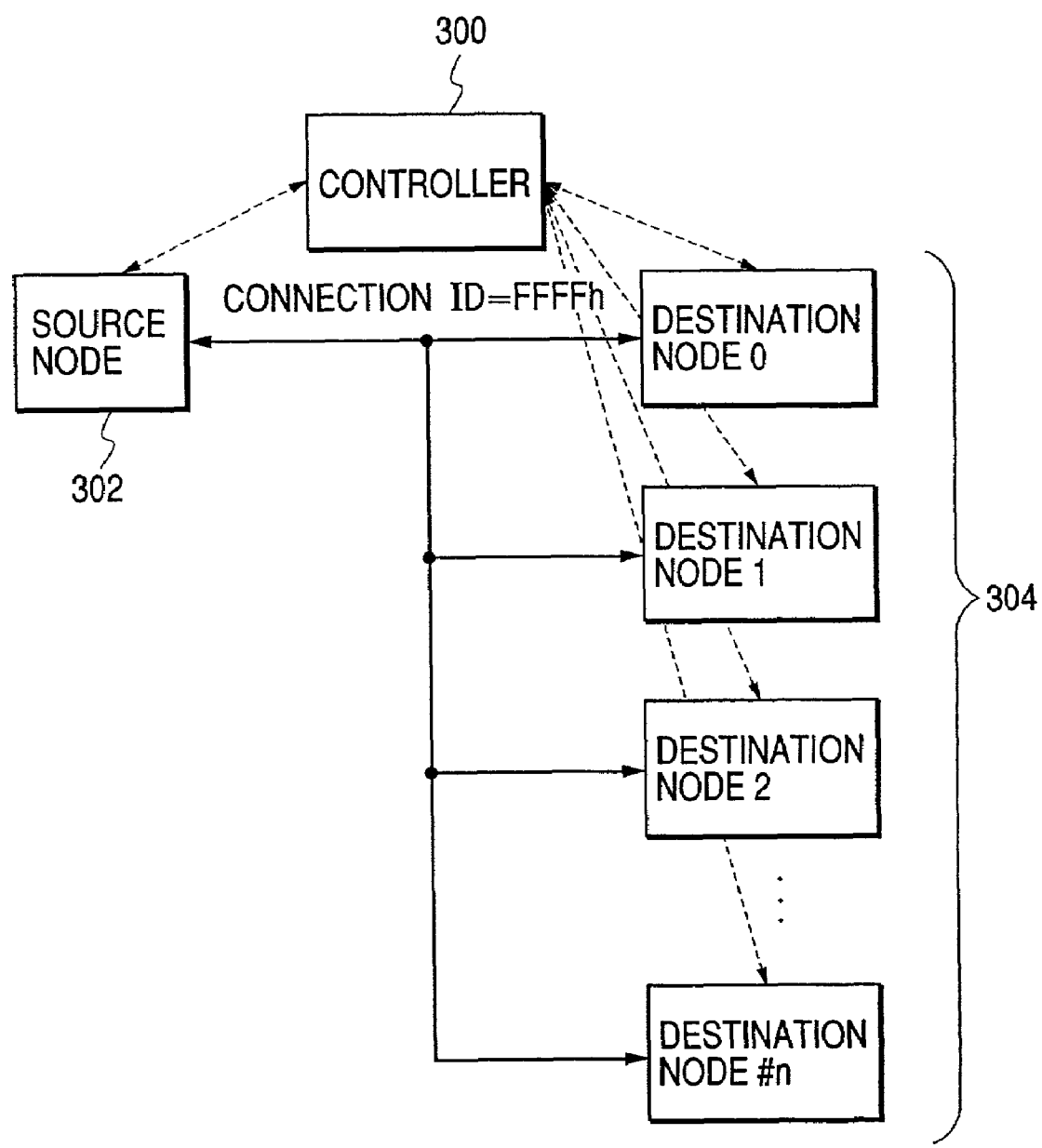
FIG. 11 is a view which shows the example where one connection ID is set between one source node and N numbers of destination nodes.

Now, in conjunction with FIG. 11, the description will be made of the structure where one controller 300 sets one connection ID between one source node 302 and the N numbers of destination nodes 304 on the network. Here, it is assumed that the unique connection ID to identify the connections between each of the nodes is FFFFh. In this respect, this value may be some other one.

In this case, the controller 300 takes the step (1) shown in FIG. 10 with respect to each of the destination nodes 304, and repeats it N times eventually.

Figure 12:
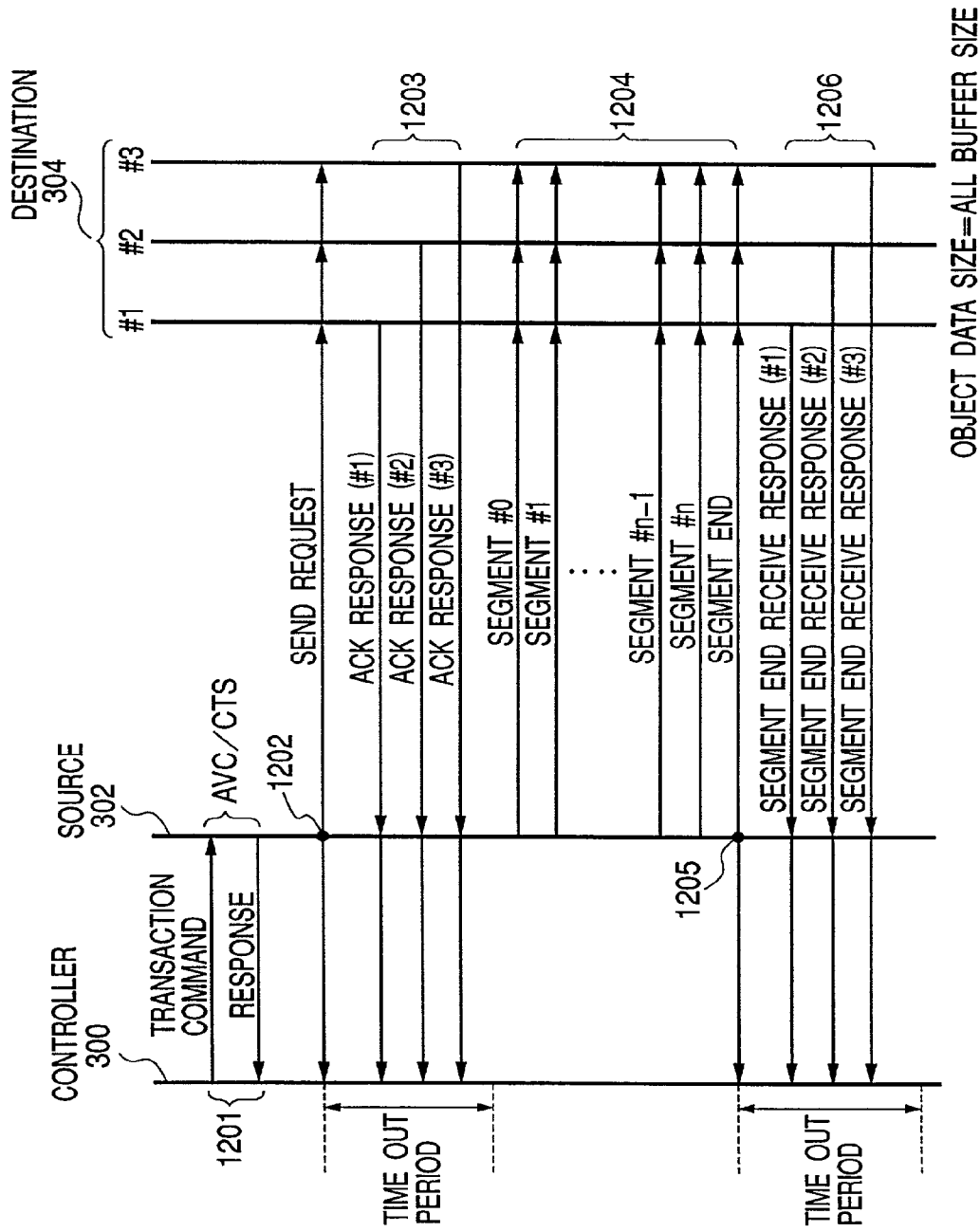
FIG. 12 is a view which illustrates the transfer procedure when the reception buffer sizes of N numbers of destination nodes are the same.

Now, in conjunction with FIG. 12, the description will be made of the communication procedure with the network structure shown in FIG. 11 where each of the destination nodes 304 is provided with the reception buffer of the same size, and the data size of the object 308 is the same as that of the aforesaid buffer. Here, in order to simplify the description, the numbers of the destination nodes 304 is assumed to be N=3. In FIG. 12, the source node 302 recognizes in accordance with the procedure shown in FIG. 10 that there are three destination nodes which are connected with the same connection ID (at 1201 in FIG. 12).

(1) When the transaction command is transmitted from the controller 300 to the source node 302, the source node 302 broadcasts the connection request packet in accordance with the procedure described in conjunction with FIG. 4A (at 1202 in FIG. 12).

(2) When each of the three destination nodes 304 completes the respective preparation of the reception, returns the ack response packet after adding its own reception buffer size and other information (at 1203 in FIG. 12).

(3) After having confirmed the return of the three ack response packets, the source node 302 segments the object data 308 into each of the specific pay load sizes on the basis of the reception buffer size of the ack response packet, and broadcasts sequentially up to the buffer size of each of the destination nodes 304 (at 1204 in FIG. 12).

(4) On the last segmental data with which the transmission of all the object data 308 is completed, the source node 302 sets the segment end flag that indicates the end of the segments and transmits it (at 1205 in FIG. 12).

(5) When each of the destination nodes 304 has received the segment end packet, it returns the segment end receive response to indicate that the reception of all the object data 308 is completed (at 1206 in FIG. 12).

(6) After having confirmed that the segment end receive response is returned from all of the destination nodes 304, the controller 300 and the source node 302 recognize the completion of the object data 308 transfer.

Here, the transfer model of the object data described in conjunction with FIG. 12 may be represented in the same manner as shown in FIG. 7.

Now, in conjunction with FIG. 13, the detailed description will be made of the communication procedure of the network having three destination nodes 304 each provided with reception buffer of different size, respectively. In this respect, in order to simplify the description, the number of the destination nodes 304 is assumed to be N=3. In FIG. 14, the source node 302 has been already notified by the controller 300 that there are three destinations which are connected with the same connection ID.

Figure 13:
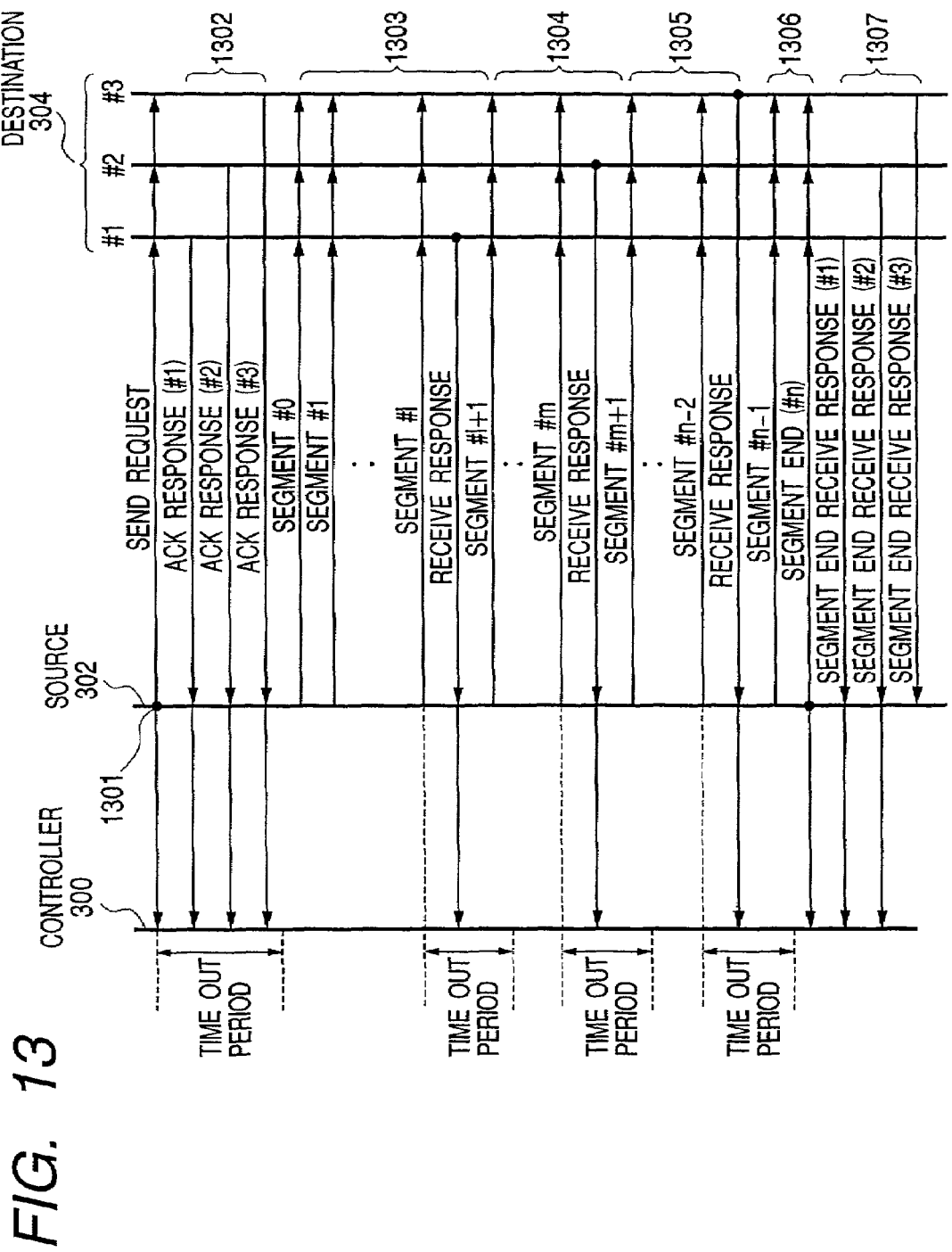
FIG. 13 is a view which illustrates the transfer procedure when the reception buffer sizes of N numbers of destination nodes are different.
Figure 14:
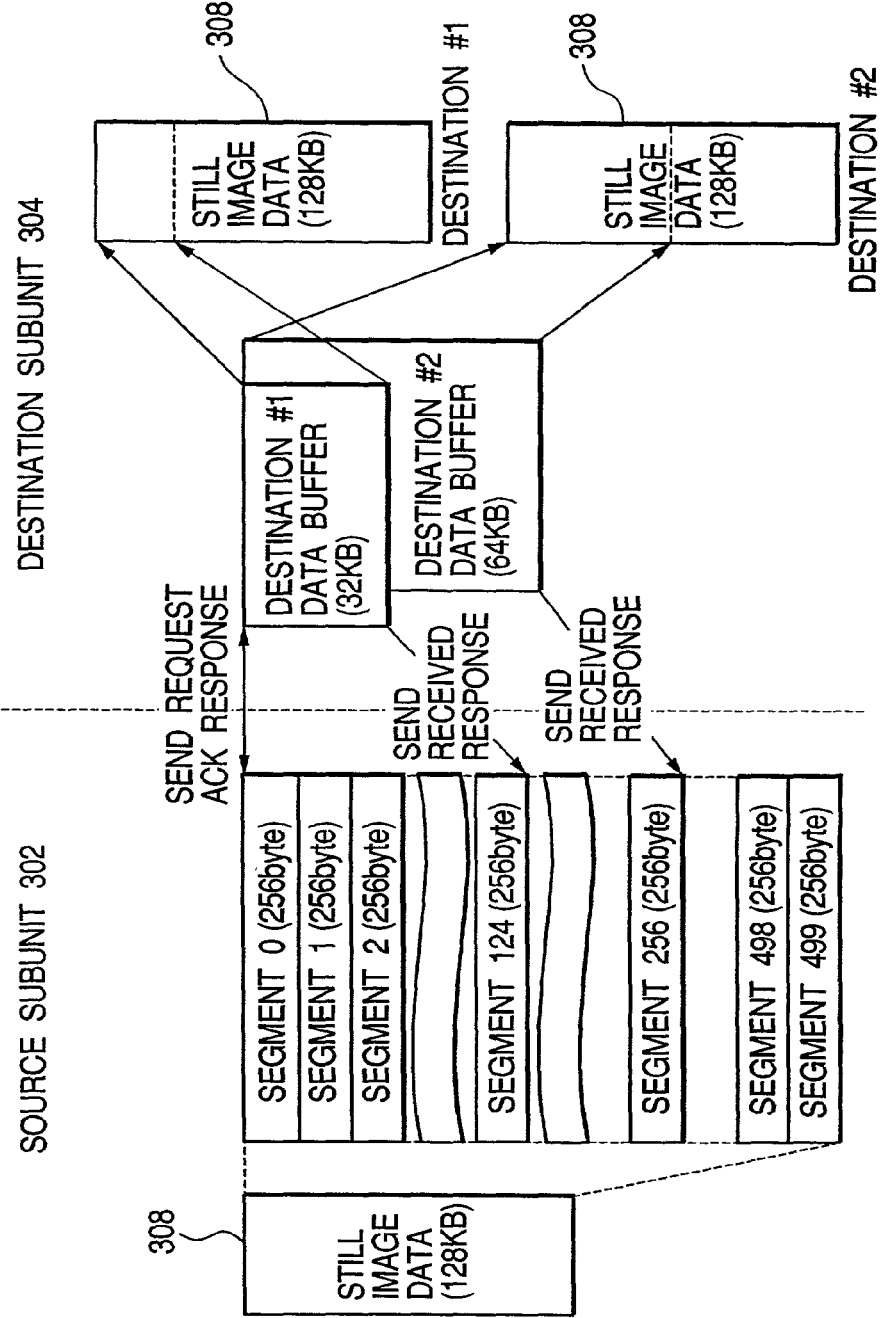
FIG. 14 is a view which illustrates the other example of transfer model of the object data in accordance with the first embodiment.

(1) When the transaction command is transmitted from the controller 300 to the source, the source node 302 broadcasts the connection request packet in accordance with the procedure described in conjunction with FIG. 4A (at 1301 in FIG. 13).

(2) When each of the three destination nodes 304 completes the respective preparation of the reception, returns the ack response packet after adding its own reception buffer size and other information (at 1302 in FIG. 13).

(3) After having confirmed the return of the three ack response packets, the source node 302 segments the object data 308 into each of the specific pay load sizes on the basis of the reception buffer size of the ack response packet, and broadcasts sequentially up to the minimum reception buffer of the three destination nodes 304. Then, the source node waits for the receive response packet form the destination node 304 which has the minimum buffer (at 1303 in FIG. 13).

(4) After having received the receive response packet from the destination node 304 having the minimum reception buffer (Destination #1 in FIG. 13), the source node 302 continuously broadcasts up to the next larger reception buffer size sequentially, and waits for the receive response packet from the next destination node 304 (at 1304 in FIG. 13).

(5) After having received the receive response packet from the second destination node 304, the source node 302 continuously broadcasts up to the next larger reception buffer size sequentially, and waits for the receive response packet from the next destination node 304 (at 1305 in FIG. 13).

(6) With the repetition of the above procedure, the source node 302 broadcasts the last segmental data having the segment end flag set therefor, and waits for the reception of the segment end response from each of the destination nodes 304 (at 1306 in FIG. 13).

(7) After having confirmed that the segment end receive response is returned from all of the destination nodes 304, the controller 300 and the source node 302 recognize the completion of the object data 308 transfer (at 1307 in FIG. 13).

Now, in conjunction with FIG. 14, the description will be made of the transfer model of the object data shown in FIG. 13. In this respect, in order to simplify the description, the number of the destination nodes 304 is assumed to be N=2. Also, in FIG. 15, the description is made on the assumption that the object data 308 of the source node 302 is a still image, and the size thereof is 128 Kbytes. However, the present invention is not necessarily limited thereto. The data size may be variable. Also, the object data 308 is not necessarily limited to the still image, but it may be a moving image, text, binary data, or the like.

The source node 302 defines the pay load size of one Asynchronous broadcast packet as 256 bytes, and segments the aforesaid object data 308 into 500. Then, it broadcasts each of the segmental data sequentially up to the buffer size of the destination #1. The destination #1 returns the receive response packet after the reception buffer is fully filled. The source node 302 continuously broadcasts up to the reception buffer of the destination #2 is fully filled sequentially.

Here, the buffer size of the destination #2 is two times that of the destination #1. However, the present invention is not necessarily limited thereto. As described above, the destination #1 returns the three send receive responses in total in FIG. 15. Then, the destination #2 returns the two send receive responses eventually.

Second Embodiment

As in the first embodiment, the description will be made of a second embodiment as to the communication protocol to implement the data transfer between the source node 302 and the destination node 304 by use of the data that identifies the connection between the source node 302 and the destination node 304 set by the controller 300.

Also, for the second embodiment, the description will be made of the communication protocol to implement the data transfer reliably and efficiently irrespective of the reception buffer size of each of the destination nodes 304 even when a plurality of destination nodes 304 are provided each with the reception buffer of different size, respectively.

Hereinafter, in conjunction with the accompanying drawings, the communication protocol will be described in accordance with the second embodiment of the present invention. In this respect, it is assumed that the fundamental structure of the communication protocol of the second embodiment is the same as that of the first embodiment. Therefore, the description thereof will be omitted.

Now, the communication packet used for the second embodiment will be described using FIGS. 15A and 15B. The communication packet used here is a packet having 4 bytes (32 bits. Hereinafter referred to as a quadlet) as the unit thereof, for example. This communication packet has two kinds of formats, that is, the packet of the type that designates the node ID at the destination party (namely, Asynchronous packet), and the packet of the type that is broadcasts with the designation of the channel number (which is called Asynchronous stream). In accordance with the present embodiment, it is possible to select either one of the formats as the packet with which to transfer the object data 308.

Figure 15A:
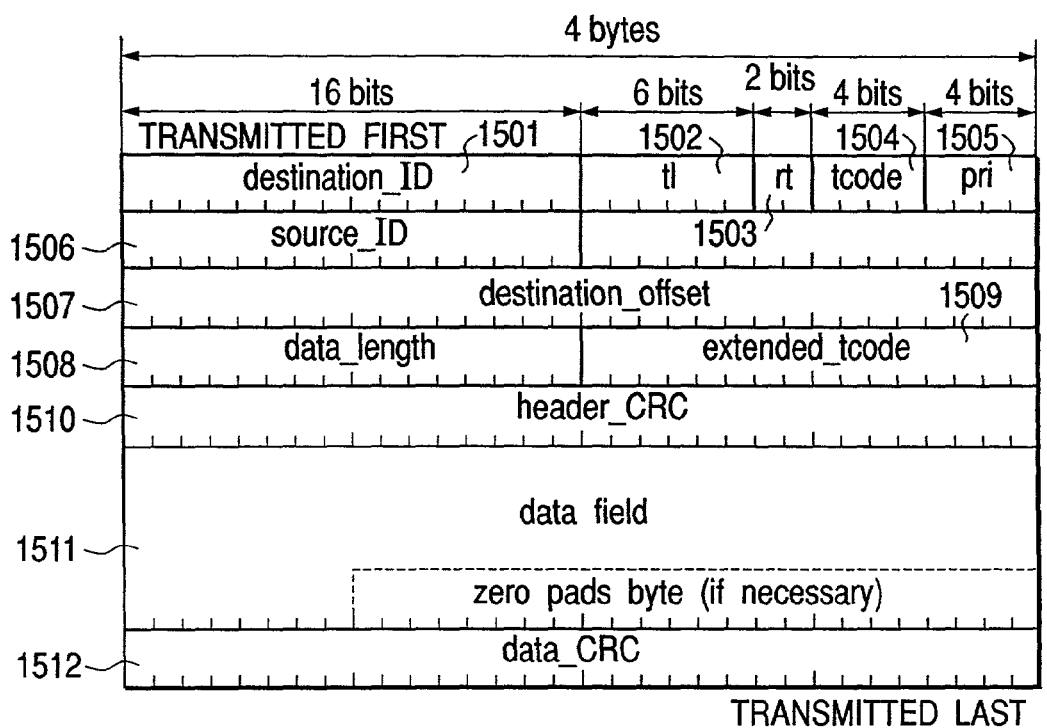
FIGS. 15A and 15B are views which illustrate the structure of the communication packet used for a second embodiment in accordance with the present invention.

The packet format shown in FIG. 15A is the type that designates the node ID.

The first field 1501 which is (16 bits) is the destination_ID field, and indicates the node ID on the reception side.

The next field 1502 (6 bits) is the transaction label (tl) field, which is the tag given to each of the transaction inherently.

The next field 1503 (2 bits) is the retrial code (rt), and the packet designates the request of retrial or not.

The next field 1504 (4 bits) is the transaction code (tcode). The tcode designates the format of the packet and the type of the transaction that should be executed.

For the present embodiment, it is assumed that the value of this field is defined as $0001_2$, for example. Then, it is required for the transaction to write the data block accordingly.

The next field 1505 (4 bits) is the priority (pri) field, which designates the priority order. For the present embodiment, it is assumed that the value of this field is defined as $0000_2$.

The next field 1506 (16 bits) is the source_ID, which indicates the node ID on the transmission side. The next field 1507 (48 bits) are the destination_offset field, which designates the lower order 48 bits in the address space of the 64 bits held by the destination node 304.

The next field 1508 (16 bits) are the data_length xfield, which indicates the length of the data field, which will be described later, by the unit of byte.

The next field 1509 (16 bits) are the extended_tcode field. The value of this filed is $0000_{16}$ when the transaction is requested to write the data block used for the present embodiment.

The next field 1510 (32 bits) is the header_CRC field, which is used for the error detection of the packet header. Here, the packet head is formed by the fields 1501 to 1509.

The next field 1511 is the variable length data field. This field is called the pay load. In accordance with the present embodiment, if this field is not the multiple of the quadlet, the bits which are not filled with the quadlet are packed with 0.

The next field 1512 (32 bits) are the data_CRC field. As in the above header_CRC field, this field is used for the error detection thereof.

Figure 15B:
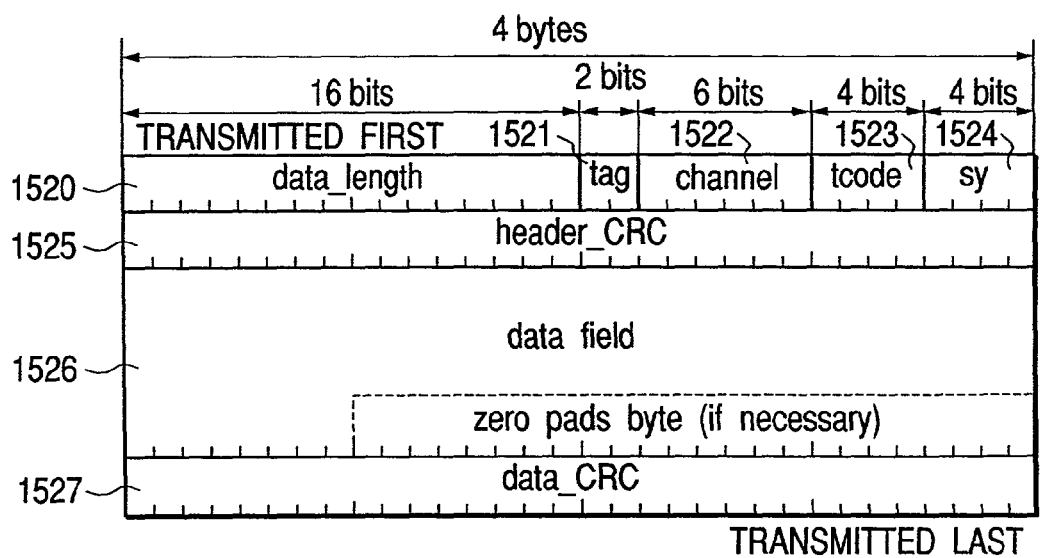

The packet format shown in FIG. 15B in the packet type that designates the channel numbers (that is, the Asynchronous stream packet).

The first field 1520 (16 bits) is the data_length filed, which indicates the length of the data file, which will be describe later, by the unit of byte.

The next filed 1521 (2 bits) is the tag field. The value thereof is $00_2$.

The next field 1522 (6 bits) is the channel filed to indicate the channel number of this packet. The reception node identifies the packet by use of this channel number.

The next field 1523 (4 bits) is the transaction code (tcode). This is $A_{16}$ for the Asynchronous stream.

The next field 1524 (4 bits) is the synchronization code (sy). The value thereof is determined by the application that uses this packet.

The next field 1525 (32 bits) is the header_CRC field. Those from the above data_length field to the sy field are called the packet header. This field is used for the error detection of the header packet.

The next field 1526 is the variable length data field. This data field is called the pay load. In accordance with the present embodiment, if this data filed is not the multiple of the quadlet, the bits which are not filled with the quadlet are packed with 0.

The next field 1527 (32 bits) is the data_CRC field. As in the above header_CRC field, this is used for the error detection of the data field.

Now, in conjunction with FIG. 16, the description will be made of the Asynchronous transaction between the aforesaid controller 300, the source node 302, and the destination node 304. For the present embodiment, the case where the connection is set between one source node and one destination node will be described.

Figure 16:
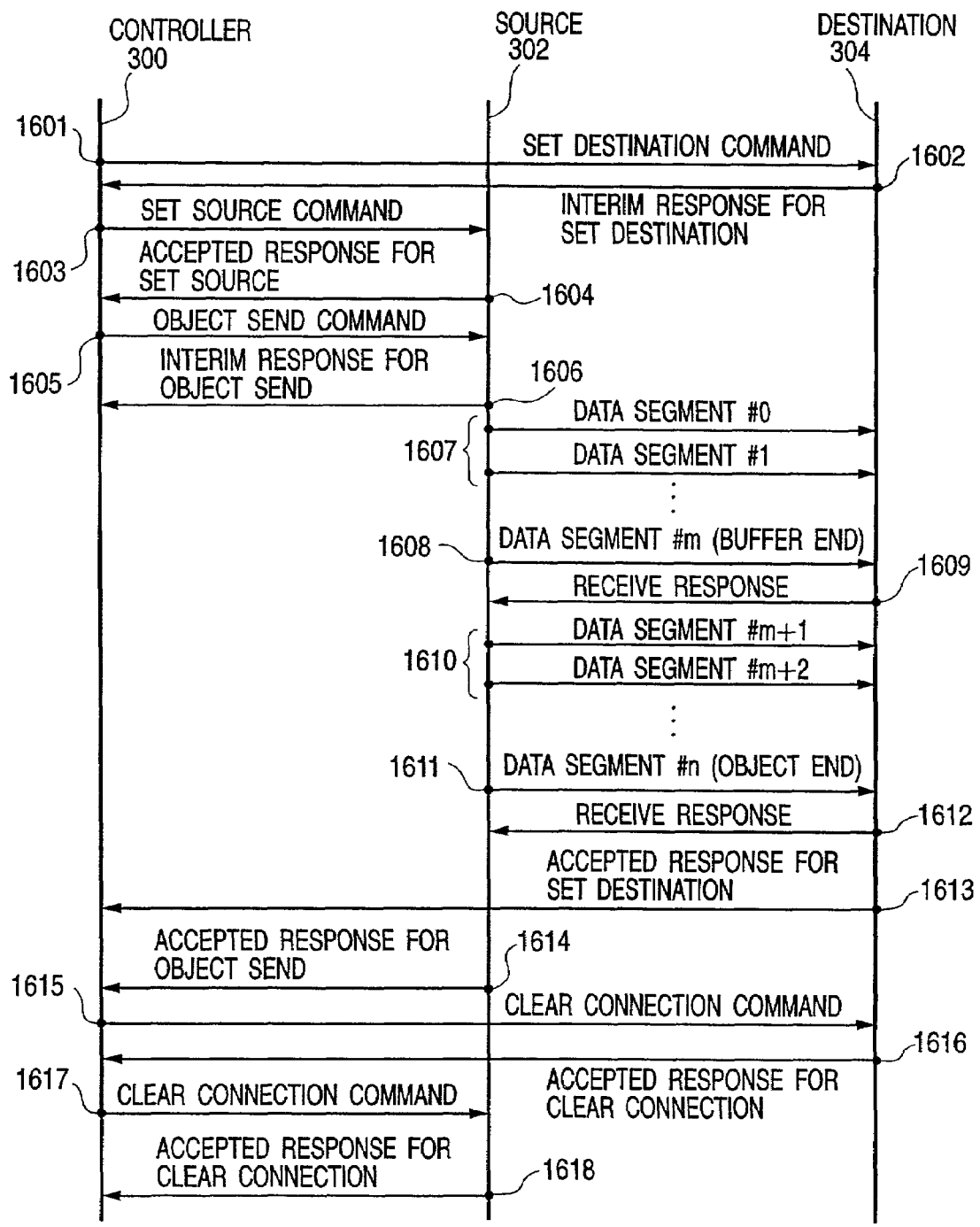
FIG. 16 is a sequence chart which illustrate the communication protocol in accordance with the second embodiment.

The controller 300 transmits to the destination node 304 selected by the user the SET DESTINATION command packet to set the connection (at 1601 in FIG. 16). In this packet, there are written the data of the node_vendor_id, chip_id_hi, chip_id_lo written on the ROM of the controller 300 and the connection_ID allocated to this connection.

The 64-bit data having combined the node_vender_id, chip_id_hi, chip_id_lo held by each of the nods is called the world wide unique ID or EUI-64 (Extended Unique Identifier, 64 bits), which is inherent to such node. Therefore, there is no other node having the same EUI-64 in one communication system. In accordance with the present embodiment, each of the connections is identified by the combination of the EUI-64 and the connection_ID. Hereinafter, the data used for identifying the connection is called the connection identifier data.

Even when a plurality of controller 300 are present on the bus, the connections are identified by use of the combination of the EUI-64 and the connection_ID for each controller. Thus, each of the controllers 300 can manage on the bus the uniquely set connection by the management of the connection_ID allocated to its own.

Now, in conjunction with FIG. 17, the description will be made of the example of the command packet format used for the second embodiment of the present invention. The command of the format shown here is set in the data field 1511 in FIG. 15A and transmitted to the designated node.

Figure 17:
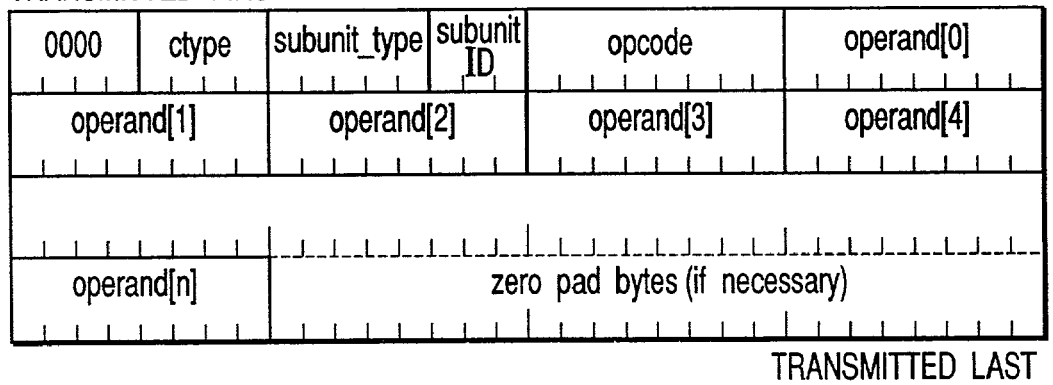
FIG. 17 is a sequence chart which shows the format of the commands used for the second embodiment.

In FIG. 17, the ctype field is the one that indicates the kind of the command, and designates the command types shown in the Table 1. In the case of the above-mentioned SET DESTINATION command, the Control is designated. The subunit_type, subunit_ID field is the one which indicates the command with respect to the particular subunit in the designated node. The opcode, operand field is the one which designates the contents of the actual command.

TABLE 1

| Value | Command Type | Meaning |
|---|---|---|
| 0 | Control | Control command |
| 1 | Status | Inquiry about the status of the equipment |
| 2 | Inquiry | Inquiry about the status of support to the command |
| 3 | Notify | Confirmation of status change of the equipment |

Figure 18:
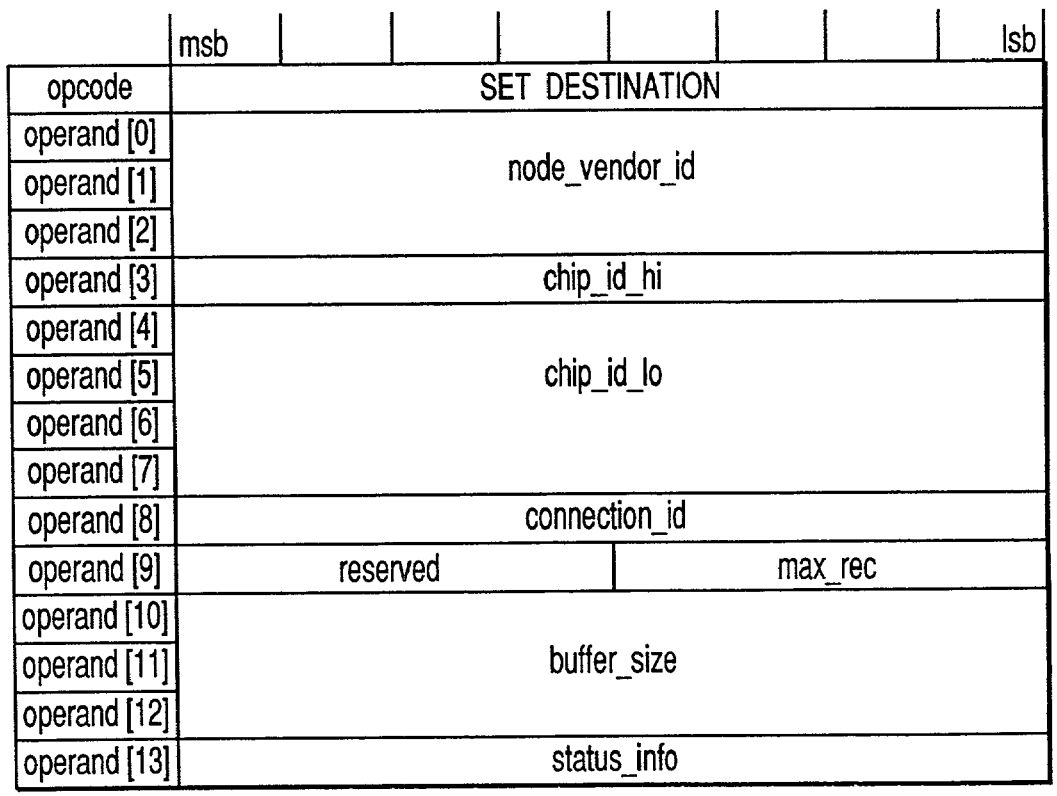
FIG. 18 is a view which illustrates the contents of the SET SOURCE command and response.

FIG. 18 shows the example of the opcode and operand sued for the above SET DESTINATION command packet. For the opcode field, the code is provided for the indication that this packet is for setting the connection with the destination node 304.

For the field of the operand [0] to operand [2], operand [3], operand [4] to operand [7], the data of node_vendor_id, chip_id_hi, chip_id_lo written on the ROM of the controller 300 are set, respectively. For the operand [8], the value of the connection_ID managed by the controller 300 is set. When this packet is transmitted from the controller 300 to the destination node 304, the dummy data are set for the remaining operand fields.

The destination node which has received the above SET DESTINATION command packet transmits the SET DESTINATION response packet to the controller 300 (at 1602 in FIG. 16).

FIG. 19 shows the example of this response packet format. The response in the format shown here is set in the data field 1511 represented in FIG. 15A, and transmitted to the designated node.

In FIG. 19, the response field is the one that indicates the kind of the response, and designates the response type shown in the Table 2. The subunit_type, subunit_ID field is the one which indicates the command with respect to the particular subunit in the designated node. The opcode, operand field is the one which designates the contents of the actual command.

TABLE 2

| Value | Response Type | Meaning |
| --- | --- | --- |
| 8 | Not Implemented | The command is not supported |
| 9 | Accepted | Command is accepted |
| $A_{16}$ | Rejected | Command is rejected |
| $F_{16}$ | Interim | Response is returned later |

For the second embodiment, if it is possible for the destination node 304 to set the connection for the Asynchronous broadcast transaction, the Interim is set in the response field (in this way, it is assumed that the destination node 304 transmits again to the controller 300 the response that indicates "Accepted" when the Asynchronous broadcast transaction with the source node 302 is completed). If this is impossible, the "Rejected" is set. The opcode and operand field are in the format shown in FIG. 18, and the code that indicates the SET DESTINATION response packet is set in the opcode. For the node_vender_id, chip_id_hi, chip_id_lo and connection_id filed, the value which is designated by the controller 300 is set.

Here, if the connection can be set, the destination node 304 sets in the max_rec field the max_rec value of the destination node (that is the value which indicates the size of the receivable data per Asynchronous broadcast transaction), and sets in the buffer_size field the size of the reception buffer usable for the reception of the object data 308.

Also, if the connection cannot be set, the same data as the dummy data set for the control command packet from the controller 300 is set in the max_rec and the buffer_size fields. In the status_info field, the execution status of the command is set. The Table 3 shows the example of the values of the status_info field of the SET DESTINATION response packet. If the connection can be set, the "Success" is indicated. If it is impossible, the "Busy" is indicated.

TABLE 3

| Value | Meaning |
| --- | --- |
| $00_{16}$ | Success |
| $01_{16}$ | Aborted |
| $11_{16}$ | Busy |
| $12_{16}$ | Serial Bus Error |
| $13_{16}$ | Hardware trouble |

Then, in FIG. 16, the controller 300, which has received the Interim SET DESTINATION response packet from the destination node 304, transmits the SET SOURCE command packet in order to set the connection for the source node 302 selected by the user (at 1603 in FIG. 16).

In this packet, the node_vendor_id, chip_id_hi, chip_id_lo, and connection_id set for the above destination node 304 are written. The format of this command packet is also structured as shown in FIG. 17, and the Control is set in the ctype field. Also, the command of the above format is set in the data field 1511 shown in FIG. 15A, and transmitted to the designated node.

FIG. 20 shows one example of the data stored in the above SET SOURCE command packet. In the opcode field, there is set the code that indicates the packet for setting the connection for the source node 302.

In the field of the operand [0] to operand [2], operand [3], operand [4] to operand [7], and operand [8], there is set the data of the node_vender_id, chip_id_hi, chip_id_lo, and connection_id set for the destination node 304.

In the max_rec of the operand [9] and the buffer_size of the operand [10] to operand [12], there is set the data of the max_rec and buffer_side set for the SET DESTINATION response packet from the destination node 304. In the number_of_destinations field of the operand [13], the number of destinations is set.

Now, for example, in the flow shown in FIG. 16, the transaction is one to one, and in this case, 1 is set. The dummy data is set for the status_info of the operand [14].

The source nod 302, which has received such SET Source command packet as this, transmits the SET SOURCE response packet to the controller 300 (at 1604 in FIG. 16). FIG. 19 shows the format of the SET SOURCE response packet. The packet of the above format is set in the data field 1511 in FIG. 15A, and transmitted to the designated node.

In accordance with the second embodiment, if it is possible for the source node 302 to set the connection for the Asynchronous broadcast transaction, the "Accepted" is set in the response field. If not, the "Rejected" is set. In the opcode and operand field, the data shown in FIG. 20 is stored. In the opcode, the code that indicates the SET SOURCE response packet is set, and in the node_vender_id, chip_id_hi, chip_id_lo, and connection$_{13}$ id field, the data designated by the controller 300 is set.

When the connection can be set for the Synchronous broadcast transaction, the source node 302 fetches the connection identifier data from the SET SOURCE packet to store it on the inner buffer. Also, in the max_rec and buffer_size field, there is set the data which has been set in the SET SOURCE command packet.

Although it is possible for the source node 302 of the present embodiment to set connections with a plurality of destination nodes 304, the number of the destination nodes that can be connected is confined due to the size of the buffer provided for each of the destination nodes 304 for use of the Asynchronous reception or the like. Therefore, the source node 302 examines the value of the number_of_destinations field of the SET SOURCE command packet, and sets such value in the number_of_destinations field of the SET SOURCE response packet if it is less than the value at which the connections are possible. If the examined value exceeds this value, only the number of nodes that can be connected is set as an executable value.

In the status_info field, the actual status of the command execution is set. The Table 4 shows the example of the values of the status_info field of the SET SOURCE response packet. If the connection can be set, the "Success" is indicated if the number of destinations is smaller than the number of nodes that can be connected. If it exceeds the number of the nodes that can be connected, the "Too many destinations" is set. If the connection cannot be set, the "Busy" is set.

TABLE 4

| Value | Meaning |
| --- | --- |
| $00_{16}$ | Success |
| $02_{16}$ | Too many destinations |
| $11_{16}$ | Busy |
| $12_{16}$ | Serial Bus Error |
| $13_{16}$ | Hardware trouble |

In FIG. 16, after having received the Accepted SET SOURCE response packet from the source node 302, the controller 300 examines the status_info field of the SET SOURCE response packet, and transmits the OBJECT SEND command packet to the source node 302 if it confirms the "Success" (at 1605 in FIG. 16).

In this respect, it is assumed that the object data 308 that the source node 302 should transmit has been already selected by some means (not shown in the present embodiment) or may be selected by the OBJECT SEND command packet, for example. In this packet, there are written the node_vender_id, chip_id_hi, chip_id_lo, and connection_id set for the aforesaid source node 302.

The format of this command packet is also formed as in FIG. 17, and the Control is set in the ctype field. Also, the data of the above format is set in the data field 1511 in FIG. 15A, and transmitted to the designated node.

FIG. 21 shows one example of the data stored in the aforesaid OBJECT SEND command packet. In the opcode field, the code is set to instruct the initiation of the transmission of the object data selected for the source node 302.

In the field of the operand [0] to operand [2], operand [3], operand [4] to operand [7], operand [8], the data of the node_vender_id, chip_id_hi, chip_id_lo, and connection_id set for the source node 302, that is, the EUI-64 of the controller 300 is set. In the subfunction field of the operand [9], the code that indicates the actual operation instructed by this command packet is set. One example of this code is shown in the Table 5. When the initiation of the transfer of the object data 308 should be designated, the send is set. Also, the dummy data is set in the status_info of the operand [10].

TABLE 5

| Subfunction | Value | Action |
| --- | --- | --- |
| send | $00_{16}$ | Perform a normal operation |
| abort | $02_{16}$ | Perform a "abort command" operation |

Having received the OBJECT SEND command packet, the source node 302 transmits the OBJECT SEND response packet to the controller 300 (at 1606 in FIG. 16). The format of the OBJECT SEND response packet is formed as in FIG. 19. Also, the response packet of the above format is set in the data field 1511 in FIG. 15A, and transmitted to the designated controller 300.

The source node 302 examines the connection set for the OBJECT SEND command packet. If the connection is in agreement with the connection set for its own and the initiation of the transmission of the object data 308 is possible, the interim is set in the response field (in this way, it is assumed that the source node 302 transmits again to the controller 300 the response that indicates "Accepted" when the Asynchronous broadcast transaction is completed with the destination node 304). Otherwise, the "Rejected" is set.

In the opcode and operand field, the data shown in FIG. 21 is stored. In the opcode, the code that indicates the OBJECT SEND response packet is set. In the field of the node_vender_id, chip_id_hi, chip_id_lo, connection_id, and subjection, the data, which have been set by the controller 300 in the OBJECT SEND command packet, are set.

In the status_info field, the execution status of the command is set. The Table 6 shows the example of the value of the status_info field of the OBJECT SEND response packet. If the transfer of the object data 308 is possible, the "Success" is set. Otherwise, the data is set corresponding to the reasons that make it impossible to initiate the transmission.

TABLE 6

| Value | Meaning |
| --- | --- |
| $00_{16}$ | Success |
| $01_{16}$ | Aborted |
| $11_{16}$ | Busy |
| $12_{16}$ | Serial Bus Error |
| $13_{16}$ | Hardware trouble |
| $14_{16}$ | Unknown connection id |

As described above, with the execution of the procedure 1601 to 1606 shown in FIG. 16, it is possible to set the logical connection relationship, that is, the interconnection, between the controller 300, the destination node 304, and the source node 302. After that, using this connection the Asynchronous broadcast transaction begins for the object data 308.

Each of the SET DESTINATION, SET SOURCE, and OBJECT SEND packets uses the packet in which the node ID is designated in the destination_ID field in FIG. 15A for use of the reception node, respectively. Then, the transmission is made from each of the nodes.

The controller 300 is provided with the tables for the connection_id management to manage the connection_id which is used for the connection set for its own. For example, as shown in FIG. 22, it is provided with the buffer that stores the flag register corresponding to the connection_id, the max_rec and buffer_size, and the bits currently in use are set on the connection_id flag in use. Thus, the values of the max_rec and buffer_size are held. The controller 300 examines this flag register, and then, allocates the connection_is which is not in use in order to set a plurality of connections at a time.

Now, the description will be made of the transaction of the object data 308 which is executed between the source node 302 and the destination node 304.

Figure 23:
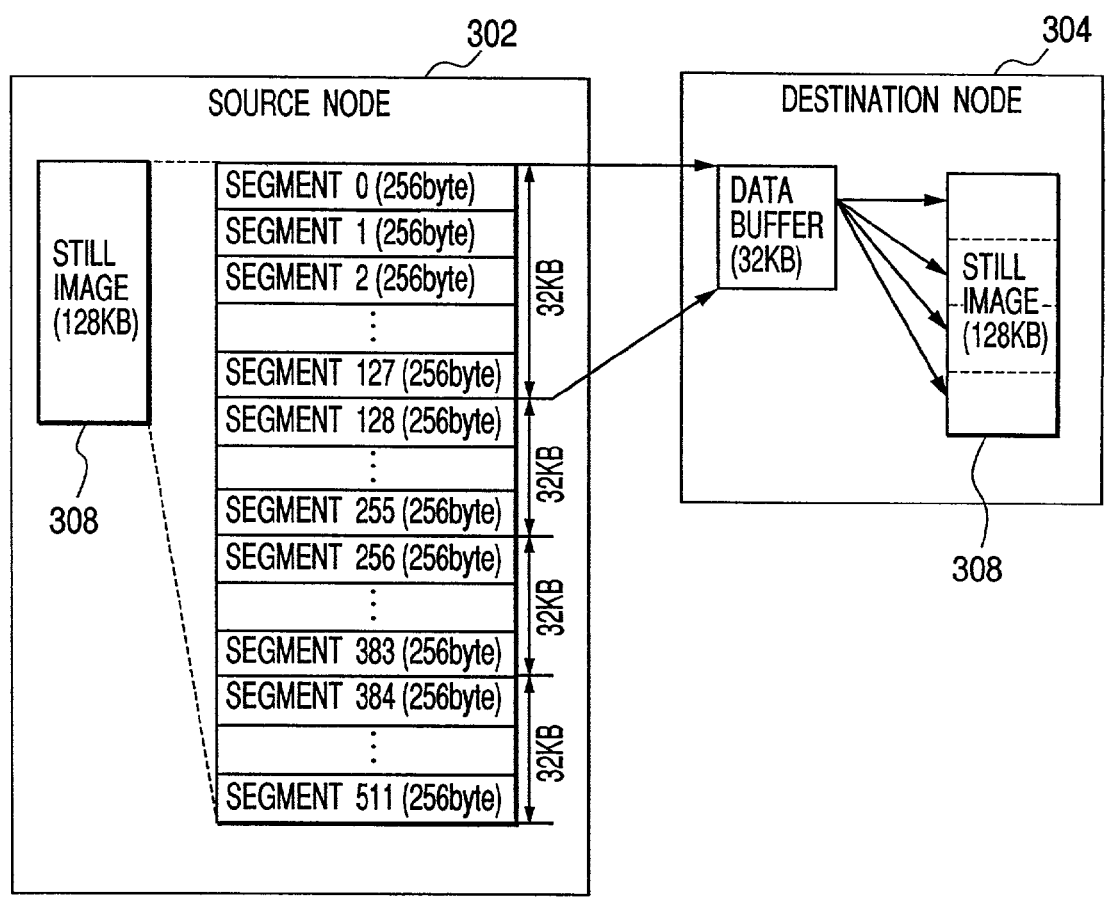
FIG. 23 is a view which illustrate one example of the transfer model of the object data in accordance with the second embodiment.

As shown in FIG. 23, it is assumed that the source node 302 selects a still image of 128 Kbytes as the object data to be transferred, for example, and that each of the destination nodes 304 is provided with the buffer for use of the reception of data of 32 Kbytes. Also, each of the destination nodes 304 is assumed to be able to receive the Asynchronous packet of 512 bytes per transaction, that is, the max_rec=512 bytes.

In this case, the destination node 304 transmits the response to the controller 300 by setting 512 bytes in the max_rec, and the data of 32 Kbytes in the buffer_size field in the SET DESTINATION described above. The controller 300 notifies the source node 302 of such data by use of the SET SOURCE command.

The source node 302 segments the selected object data 308 into the segmental data whose numbers do not exceed the value of the max_rec (in accordance with the present embodiment, it is assumed that one segmental data has 256 bytes). Then, each segment is transferred to the destination node 308 sequentially. In FIG. 23, the object data 308 is segmented in the same size, respectively.

As shown in the flow represented in FIG. 16, the source node 302 transfers the object data 308 per segmental unit sequentially. Here, the Asynchronous broadcast transaction uses the packets in the format shown in FIGS. 15A and 15B, respectively. When the Asynchronous broadcast packet shown in FIG. 15A is used, the ID for use of broadcast or multicast is set in the destination_id field 1501, not the node ID that indicates a specific destination node.

In accordance with the present embodiment, while making the broadcast ID "$FFFF_{16}$" and the multicast ID "$FFDF_{16}$", the packet which sets either one of them in the destination_id field 1501 is used for the transfer of the object data 308.

Also, when the Asynchronous stream packet of the format shown in FIG. 15B is used, the channel number managed by a specific node is set in the channel filed 1522, not the node ID that indicates a specific destination node 304. In this case, before the object data 308 is transferred, the controller 300 notifies the source node 302 and the destination node 304 of the aforesaid channel number. The source node 302 and the destination node 304 use the packet having this channel number set therein for the transfer of the object data 308.

Hereinafter, the description will be made of the example that uses the packet format shown in FIG. 15A.

Figure 24:
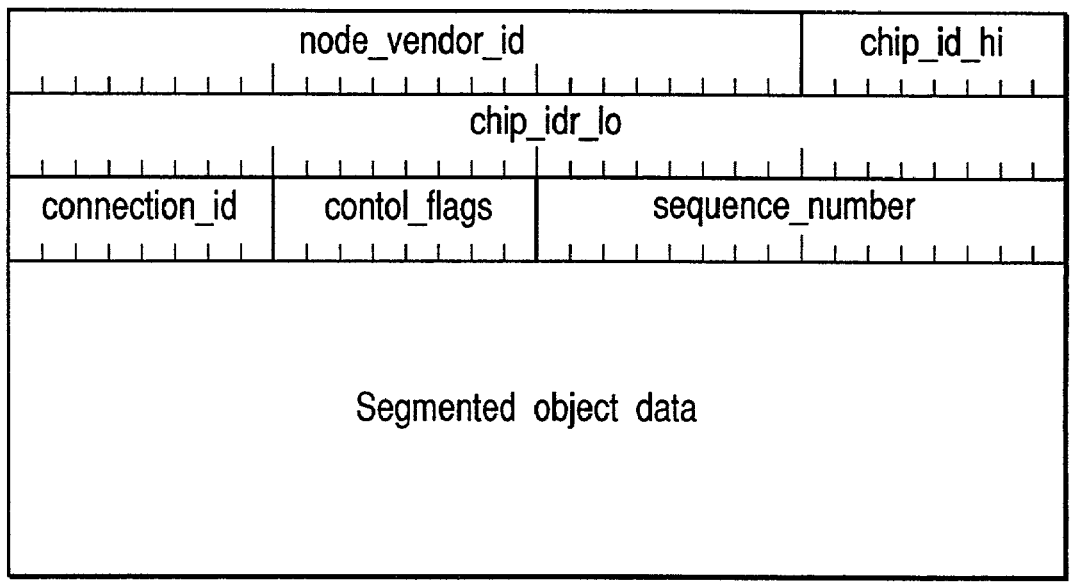
FIG. 24 is a view which illustrates the structure of the Asynchronous broadcast packet in accordance with the second embodiment.

FIG. 24 shows the example of the transmission packet format of the segmented object data 308. The data of this format is set in the data field 1511 in FIG. 15A and transmitted from the source node 302.

In FIG. 24, the data to identify the connection set by the controller 300 is set in the field of the node_vender_id, chip_id_hi, chip_id_lo, and connection_id. In the control_flags field, the information that shows the type of this data packet is set. The Table 7 shows the example of the value of the control_flags field set in the source node 302.

TABLE 7

| Value | Meaning |
| --- | --- |
| $00_{16}$ | Normal data |
| $01_{16}$ | Buffer end |
| $02_{16}$ | Object end |

In the sequence_number field, the running numbers of the segmental data transmitted by this packet are set. In the portion of the segmented object data, one segmental data of the segmented object data is set. Also, when the packet shown in FIG. 15B is used, the data of the format shown in FIG. 24 is set likewise in the data field 1526.

At first, the operation of the source node 302 will be described.

The source node 302 counts the total size of the segmental data that have been transmitted, and transfers the segmental data sequentially up to the buffer size of the destination node 304 which has been notified by the controller 300 using the SET SOURCE command (at 1607 in FIG. 16).

In this case, the Normal data is set in the control_flags field. When the total size of the transmitting data arrives at the appropriate size which does not exceed the buffer side of the destination node 304, the data is transmitted after having set the budder end in the control_flags field of the packet (at 1608 in FIG. 16).

For the example shown in FIG. 23, the control_flags is set in the buffer_end when transmitting the segment (the sequence number 127) whose total size becomes the same as the buffer size of the destination node 304. After that, the source node 302 waits for the receive response packet which will be transmitted from the destination node 304 (at 1609 in FIG. 16).

Figure 25:
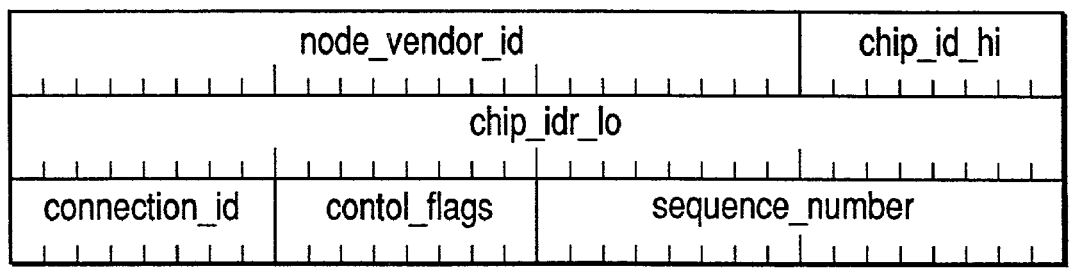
FIG. 25 is a view which illustrates the structure of the receive response packet shown in FIG. 16.

FIG. 25 shows the example of the format of the receive response packet. The data of this format is set in the data field 1511 shown in FIG. 15A, and transmitted from the destination node 304.

In FIG. 25, the data to identify the connection set by the controller 300 is set in the field of the node_vender_id, chip_id_hi, chip_id_lo, and connection_id. In the control_flags field, the information is set to indicate the type of this data packet. The Table 8 shows the values of the control_flags field set in the destination node 304.

TABLE 8

| Value | Meaning |
| --- | --- |
| $10_{16}$ | Receive success |
| $11_{16}$ | Resend request |

When the value of the control_flags is the "Receive success", the sequence number of the data that has been received correctly is set. If the "Resend request" appears, the sequence number of the data desired for resending is set.

The source node 302 receives the Asynchronous packet having the multicast ID set in the destination_id therein, and examines the connection identifier data in the pay load. If it is in agreement with the data set for the own node, the value of the control_flags is examined. If this value is the "Receive success, the total count of the transmitted segmental data is cleared. Then, the data transmission is initiated for the segment to follow (at 1610 in FIG. 16).

For the example shown in FIG. 23, when the segmental data whose sequence number is 255,383 is transmitted, the control_flags is set in the buffer_end. Likewise, the data transmission is resumed after receiving the response from the destination node 304.

When the last data of the object 308 is transmitted, the source node 302 set the control_flags at the object end and transmits the data (at 1611 in FIG. 16). As in the buffer end, the source node 302 waits likewise for the receive response. If the control_flags of the receive response from the destination node 304 is the "Receive success", the OBJECT SEND response is transmitted to the controller 300 (at 1614 in FIG. 16).

This Asynchronous packet is transmitted with the node ID set by the controller 300 in the destination_id. In the response filed shown in FIG. 19, the "Accepted" is set, and in the in the opcode and operand [0] to operand [9] shown in FIG. 19, the same data is set as in the Interim OBJECT SEND response transmitted to the controller 300 immediately after the reception of the OBJECT SEND command.

In the status_info field of the operand [10], the code that indicates the end state of the data transmission is set. If it is normally ended, the "Success" is set. Now, the operation of each of the destination nodes 304 will be described.

When the destination node 308 receives the Asynchronous packet having the multicast ID is set in the destination_id field therein, it examines the data to identify the connection in the data field, and if such data is in agreement with the data of its own, it begins writing the segmental data sequentially beginning with the header address of the reception buffer. Also, at this junction, it may be possible to detect the missing data by examining the sequence number field.

With the examination of the control_flags of the data packet, the transmission of the next data packet is awaited if this value indicates the Normal data. If the value of the control_flags indicates the buffer end, the data that have been written on the reception buffer are copied to the other buffer (hard disc or the like), and then, the buffer is cleared. After that, the response packet of the format shown in FIG. 25 is transmitted with the use of the multicast ID (at 1609 in FIG. 16).

At this juncture, the "Receive success" is set in the control_flags, and the sequence number of the data packet having the buffer end set therein is set in the sequence number. For the example shown in FIG. 23, 127 is set.

After the transmission of the receive response, the destination node 304 waits for the resumption of the data transmission from the source node 302, and writes the segmental data sequentially again beginning with the header of the reception buffer (at 1610 in FIG. 16). For the example shown in FIG. 23, when the segmental data whose sequence number is 255,383 is received, the receive response is likewise transmitted.

When the segmental data whose value of the control_flags is the object end is received, the destination node 304 transmits likewise the receive response (at 1612 in FIG. 16). After having transmitted the receive response for the object end using the multicast ID, the designation node 304 transmits the SET DESTINATION response packet to the controller 300 (at 1613 in FIG. 16).

The transmission is made with the setting of the node ID of the controller 300 in the destination_id field 1501 of this SET DESTINATION response packet. In the response field of this packet, the "Accepted" is set, and in the opcode and operand [0] to operand [12], the same data as in the Interim SET DESTINATION response transmitted to the controller 300 immediately after the reception of the SET DESTINATION command.

In the status_info of the operand [13], the code that indicates the end state of the data transmission is set. In the case of the normal end, the "Success" is set. With the procedure described above, the transfer of the object 308 is completed between the source node 302 and the destination node 304.

In FIG. 16, after having received the response packets of the OBJECT SEND and SET DESTINATION from the source node 302 and the destination node 304, respectively, the controller 300 transmits the CLEAR CONNECTION command packet to the source node 302 and the destination node 304 to release the connections (at 1615 and 1617 in FIG. 16).

This command packet is formed as in FIG. 17, and the control is set in the ctype field. Also, this command is set in the data field 1511 shown in FIG. 15A and transmitted to the source node 302 and the destination node 304.

FIG. 26 shows one example of the data stored in the opcode and operand field of the CLEAR CONNECTION command packet. In the opcode field, the code is set to indicate that the packet is for the connection release. In the field of the operand [0] to operand [2], operand [3], operand [4] to operand [7], and operand [8], the data of the node_vender_id, chip_id_hi, chip_id_lo, and connection_id are set to identify the connections which should be released.

The status_info in the operand [9], the code is set to show the reasons of the connection release. The Table 9 shows the example of the values of the status_info filed when the CLEAR CONNECTION command is transmitted to the destination node 304.

TABLE 9

| Value | Meaning |
|---|---|
| $00_{16}$ | Transfer is over |
| $01_{16}$ | Transfer is aborted |
| $12_{16}$ | Serial Bus Error |
| $20_{16}$ | Source busy |
| $21_{16}$ | Too many Destinations |
| $22_{16}$ | Source Error |
| $FF_{16}$ | No information |

Also, the Table 10 shows the example of the values of status_info field when the CLEAR CONNECTION is transmitted to the source node.

TABLE 10

| Value | Meaning |
|---|---|
| $00_{16}$ | Transfer is over |
| $01_{16}$ | Transfer is aborted |
| $12_{16}$ | Serial Bus Error |
| $20_{16}$ | Destination busy |
| $22_{16}$ | Destination error |
| $FF_{16}$ | No information |

When the data transfer is terminated, the "Transfer is over" is set in the status_info field both for the source node 302 and the destination node 304.

When the source node 302 and the destination node 304 that have received the CLEAR CONNECTION command clear the data to identify the connection stored in the inner buffer of each of the nodes if such data is in agreement with the data set respectively for its own, and transmit the CLEAR CONNECTION response packets to the controller 300, respectively (at 1616 and 1618 in FIG. 16).

The response packet is formed as in FIG. 19, and when the connection release is made normally, the "Accepted" is set in the response field. Also, this response is set in the data field 1511 in FIG. 15A, and transmitted to the controller 300.

FIG. 26 shows one example of the data stored in the opcode and operand field of the CLEAR CONNECTION response packet. In the opcode field, the code is set to indicate that the packet is for the connection response. In the field of the node_vender_id, chip_id_hi, chip_id_lo, and connection_id, those node_vender_id, chip_id_hi, chip_id_lo, and connection_id used to identify the connections which are released are set.

In the status_info filed, the execution state of the command is set. The Table 11 shows the example of the status values of the CLEAR CONNECTION response packet. When the connection is released normally, the "Success" is set.

TABLE 11

| Return Value | Meaning |
|---|---|
| $00_{16}$ | Success |
| $11_{16}$ | Busy |
| $12_{16}$ | Serial Bus Error |
| $14_{16}$ | Unknown connection id |

The controller 300 which received Accepted CLEAR CONNECTION response packet from the source node 302 and destination node 304 clears the bit which is being used in the connection_id flag register of the released connection. According to the above procedure, the logical connection relationship set between the source node 302 and the destination node 304 is released and all transaction for transferring the object data 308 is completed.

As above described, it is possible to set the logical connection relationship (that is, connection) between the source node 302 and the destination node 304 by setting data for discriminating the same connection to the source node 302 and the destination node 304 by the controller 300. Further, it is possible to execute the object data transferring process in the transaction between the source node 302 and the destination node 304 without using the controller 300.

Third Embodiment

Now, in conjunction with FIG. 27, the description will be made of a third embodiment in accordance with the present invention. As in the first and second embodiments, the description will be made of the procedure of the transfer of the object data 308 by the connection set between the controller 300, the source node 302, and the destination node 304 shown in FIG. 3.

Figure 27:
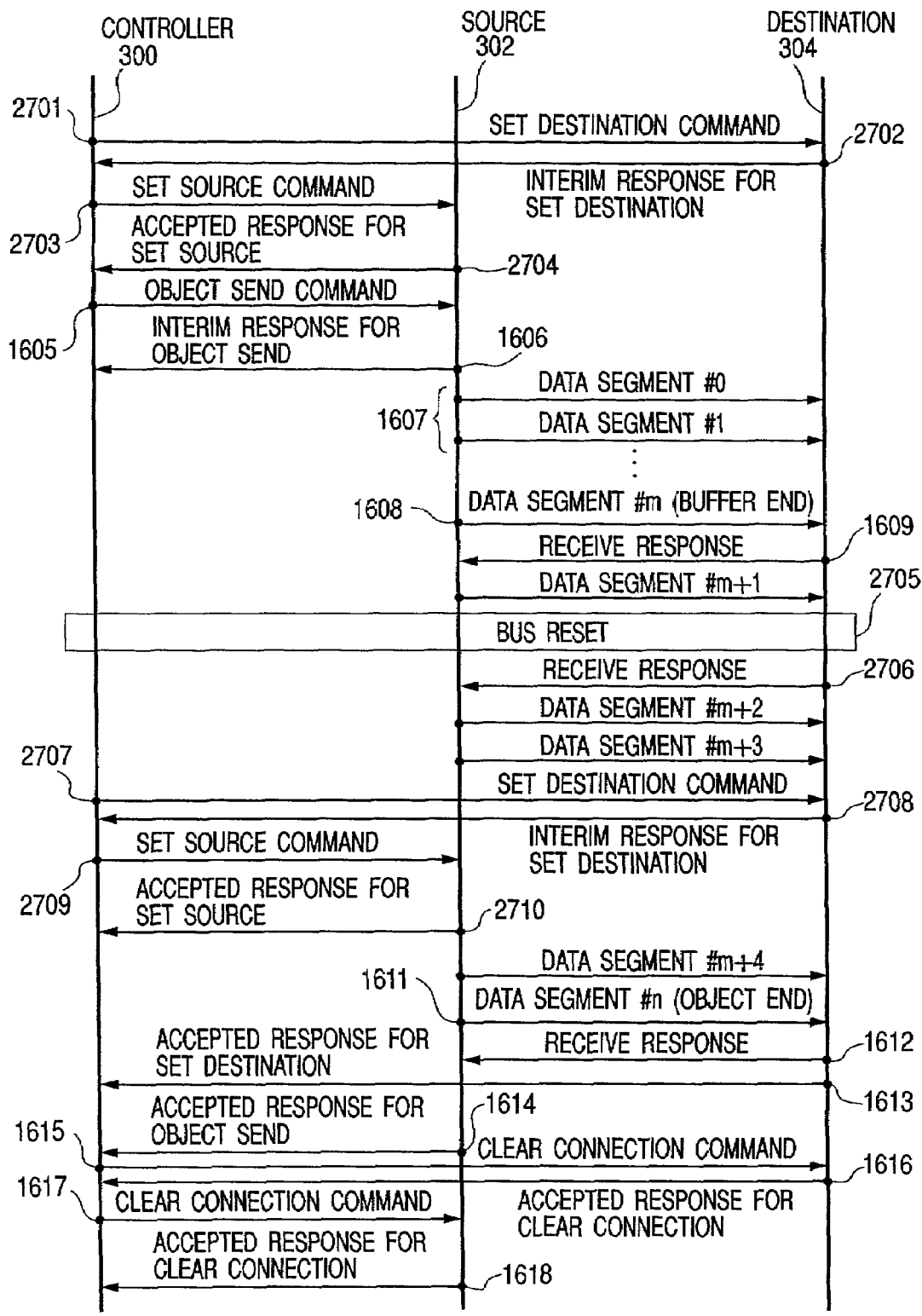
FIG. 27 is a sequence chart which illustrate the communication protocol in accordance with the third embodiment.

The controller 300 transmits the SET DESTINATION command packet to the destination node 304 selected by the user in order to set the connection (at 2701 in FIG. 27). In this packet, the data of the node_vender_id, chip_id_hi, and chip_id_lo stored on the ROM of the controller 300 and the connection_id allocated to this connection are written.

The command stored in the SET DESTINATION command packet is formed as in the FIG. 17, and in the ctype filed, the control is set. Also, this command is set in the data field 1511 shown in FIG. 15A, and transmitted to the destination node 304.

FIG. 28 shows the example of the opcode and operand used for the SET DESTINATION command packet. In the opcode field, there is set the code to indicate that the data to identify the connection is set for each of the destination nodes 304.

In the field of the operand [0] to operand [2], operand [3], and operand [4] to operand [7], the data of the node_vender_id, chip id_hi, and chip_id_lo stored on the ROM of the controller 300 are set.

In the operand [8], the value of the connection_id managed by the controller 300 is set. When the controller 300 transmits this packet to the destination 302, dummy data are set in the remaining operand.

Having received the SET DESIGNATION command packet, the destination node 304 transmits the SET DESTINATION response packet to the controller 300 (at 2702 in FIG. 27). The response stored in the SET DESTINATION is formed as in FIG. 19. which is set in the data field 1511 in FIG. 15A, and transmitted to the controller 300.

Here, when the destination node 304 is able to set the connection for the Asynchronous broadcast transaction, the interim is set in the response field (in this way, the destination node 304 transmits again the response that indicates the "Accepted" to the controller 300 when the Asynchronous broadcast transaction with the source node 302 is completed). If it is impossible, the "Rejected" is set.

Also, of the opcode and operand fields, as shown in FIG. 28, the code that indicates the SET DESTINATION response packet is set in the opcode field, and in the field of the node_vender_id, chip_id_hi, chip_id_lo, and connection_id, the data designated by the controller 300 are set. Also, in the field of the destination_node_vender_id, destination chip_id_hi, and destination_chip_id_lo, there are set the node_vender_id, chip_id_hi, and chip_id_lo written on the ROM of the destination node 304.

Here, it is possible to set the connection, each of the destination nodes 304 sets the value of max_rec of the destination node (the value which indicates the data size receivable per Asynchronous broadcast transaction) is set in the max_rec field, and the reception buffer size usable for the reception of the object data 308 is set in the buffer_size field. Here, the size of the reception buffer should be the integral times or the second power of the max_rec value.

Also, if it is impossible to set the connection, the same data as the dummy data set in the control command packet from the controller 300 are set in the max_rec and buffer_size fields. In the status_info field, the execution state of the command is set. Here, the value of the status_info of the SET DESTINATION response packet is the same as the one exemplified in the Table 3. When the connection can be set, the "Success" is set. If not, the "Busy" is set.

In FIG. 27, after the reception of the Interim SET DESTINATION response packet from the destination node 308, the controller 300 transmits the SET SOURCE command packet for the connection setting to the source node 302 selected by the user (at 2703 in FIG. 27). In this packet, there are written the node_vender_id, chip_id_hi, chip_id_lo, and connection_id set in the aforesaid destination node 304.

The command contained in this command packet is formed as in FIG. 17, and the control is set in the ctype field. Also, the command is set in the data field 1511 in FIG. 15A, and transmitted to the source node 302.

FIG. 29 shows one example of the SET SOURCE command packet. In the opcode field, the code is set to indicate that the data to identify the connection is set for the source node 302.

In the field of the node_vender_id, chip_id_hi, chip_id_lo, and connection_id, there are set the data of the node_vender_id, chip_id_hi, chip_id_lo, and connection_id set in each of the destination nodes 304. In the max_rec and buffer_size fields, there are set the data of the max_rec and buffer_size set in the SET DESTINATION response packet from each of the destination nodes 304. In the number_of_destinations filed, the numbers of destinations are set.

In the flow shown in FIG. 27, the transactions are one to one, for example. In this case, therefore, 1 is set. The dummy data are set in the node_vender_id, chip_id_hi, chip_id_lo, and status_info.

In FIG. 27, with the reception of the SET SOURCE command packet, the source node 302 transmits the SET SOURCE response packet to the controller 300 (at 2704 in FIG. 27). The response contained in the SET SOURCE response packet is formed as in FIG. 19. Also, this response is set in the data field 1511 in FIG. 15A, and transmitted to the controller 300.

When the source node 302 is able to set the connection for the Asynchronous broadcast transaction, the "Accepted" is set in the response field. If it is impossible, the "Rejected" is set. Also, of the opcode and operand fields, as shown in FIG. 29, the code that indicates the SET SOURCE response packet is set in the opcode field, and in the field of the node_vender_id, chip_id_hi, chip_id_lo, and connection_id, the data designated by the controller 300 are set.

When the connection can be set for the Asynchronous broadcast transaction, the source node 302 fetches the connection identifier data from the SET SOURCE command packet and stores it on the inner buffer. In the field of the source_node_vender_id, source_chip_id_hi, and source_chip_id_lo, there are set the node_vender_id, chip_id_hi, and chip_id_lo written on the ROM of the source node 302.

In the max_rec and buffer_size fields, the data set in the SET SOURCE command packet are set. In accordance with the present embodiment, the source node 302 can set connections with a plurality of destination nodes. However, due to the capacity of buffer for the reception of Asynchronous broadcast or the like provided for each of the destination nodes 304, there is a limit to the number of destination nodes.

Therefore, the source node 302 examines the value of the number_of_destinations of the SET SOURCE command packet, and sets the value in the SET SOURCE response packet if it is smaller than the number in which connections are possible. If the value exceeds such connection allowable number, only the value at which the nodes can be connected is set. In the status_info field, the execution state of the command is set.

The value of the status_info of the SET SOURCE response packet is the same as the one exemplified in the Table 4. If the connection is possible, the "Success" is set, provided that the number of destination nodes is smaller than the node numbers that enable the connections to be set. Otherwise, the "Too many destinations" is set. If the set of connection is impossible, the "Busy" is set.

In FIG. 27, with the reception of the Accepted SET SOURCE response packet from the source node 302, the controller 300 examines the status_info field of the SET SOURCE response packet, and transmits the OBJECT SEND command packet to the source node 302 if the "Success" is confirmed (at 1605 in FIG. 27). In this respect, the operation of the OBJECT SEND command is the same as the second embodiment. The description thereof will be omitted.

With the execution of the procedure shown in FIG. 27, the logical connection relationship (that is, the interconnection) is set between the controller 300, the destination 304, and the source 302. Then, using this connection the Asynchronous broadcast transaction of the object data 308 is initiated.

In this respect, the SET DESTINATION, SET SOURCE, OBJECT SEND packets use the respective packets that designate the node IDs of the reception nodes in the destination_ID field 1501 in FIG. 15A. Then, the transmission is made from each of the nodes.

The controller 300 has the management table of the connection_id to manage the connection_id used for the connection set by the controller itself. For example, as shown in FIG. 30, the controller 300 has the data buffer to store thereon the flag resister for each of the connection_ids, max_rec, buffer_size, the number of destination nods, and the EUI-64 values of the destination node 304 and the source node 302. The bit that indicates "in use" is set in the flag register for the connection_id currently in use, and each of the data corresponding to this connection_id is held. The controller 300 examines the flag registers, and then, allocates the connection_id which is not in use, thus setting a plurality of connections and manage them at a time.

In FIG. 27, after the transmission of the OBJECT SEND response packet, the source node 302 initiates the transfer of the object data 308 in the same manner as the second embodiment. Here, as shown in FIG. 27, if the bus reset takes place after the destination node 304 has received the data segment #m+1, each of the nods on the bus performs the restructure of the bus in accordance with the procedure regulated by the IEEE 1394-1995 standards (at 2705 in FIG. 27). In this way, the node IDs of the source node 302 and the destination node 304 are reset.

When the bus reset is completed, the destination node 304 uses the Asynchronous packet (shown in FIG. 15A) having the multicast ID set in the destination_id field 1501 to transmit the receive response packet in the format shown in FIG. 25 (at 2706 in FIG. 27). Also, if the Asynchronous broadcast transaction of the object data 308 is executed in the packet format shown in FIG. 15B, the destination node 304 transmits the receive response packet using the packet stored in the channel filed of a specific channel number.

Here, in the field of the node_vender_id, chip_id_hi, chip_id_lo, and connection_id of the receive response packet, there are set the values of the node_vender_id, chip_id_hi, chip_id_lo, and connection_id set by the controller 300 before the respective bus resets. Also, in the control_flags field, the resend request is set, and in the sequence number field, the value (here, it is m+2) is set, which is the one obtained by adding 1 to the sequence number of the segmental data received normally before the bus reset has been made.

After the bus reset, the source node 302 waits for the receive response packet from the destination node 304, which has been set by the "Resend request". After the reception thereof, the source node 302 examines the node_vender_id, chip_id_hi, chip_id_lo, and connection_id of the receive response packet, and resumes the Asynchronous broadcast transaction beginning with the segmental data of the requested sequence_number if these ids are in agreement with the data used before reset.

Also, after the bus reset, the controller 300 uses the connection_id management table shown in FIG. 30 for the management of the source node 302 and destination node 304 IDs, and reads out the EUI-64 values of the destination node 304 and source node 302 having the connections set corresponding to the destination_ids, and detects the node IDs of the destination node 304 and source node 302 which have changes due to the bus reset.

This node ID detection is executable by reading out the EUI-64 value written on the ROM of the node by use of the Asynchronous Read transaction with respect to all the nodes on the bus, for example.

When the detection of each of the node IDs is completed, the controller 300 transmits the SET DESTINATION command packet to the destination 304 and the SET SOURCE command packet to the source node 302 in order to resume the connections (at 2707 and 2709 in FIG. 27). Then, the destination node 304 and the source node 302 transmit the respective response packets to the controller 300 accordingly (at 2708 and 2710 in FIG. 27). At this juncture, the interim is set in the response field of each of the response packets.

With the above described procedure, it is possible to certainly execute the data transfer and resetting of the connection when bus resetting occurs. Further, the same procedure of the first embodiment can be adapted to the data transfer and the connection release after bus resetting.

As described above, in accordance with the third embodiment, the controller 300 can set the logical connection relationship between the source node and the destination node without any changes even when the bus reset takes place, hence making it possible to resume the data transfer promptly in such case.

Fourth Embodiment

For a fourth description, the description will be made of the case where the Asynchronous broadcast transaction of the object data 308 is made by use of connections between the source node 302 and a plurality of destinations 304.

Figure 31:
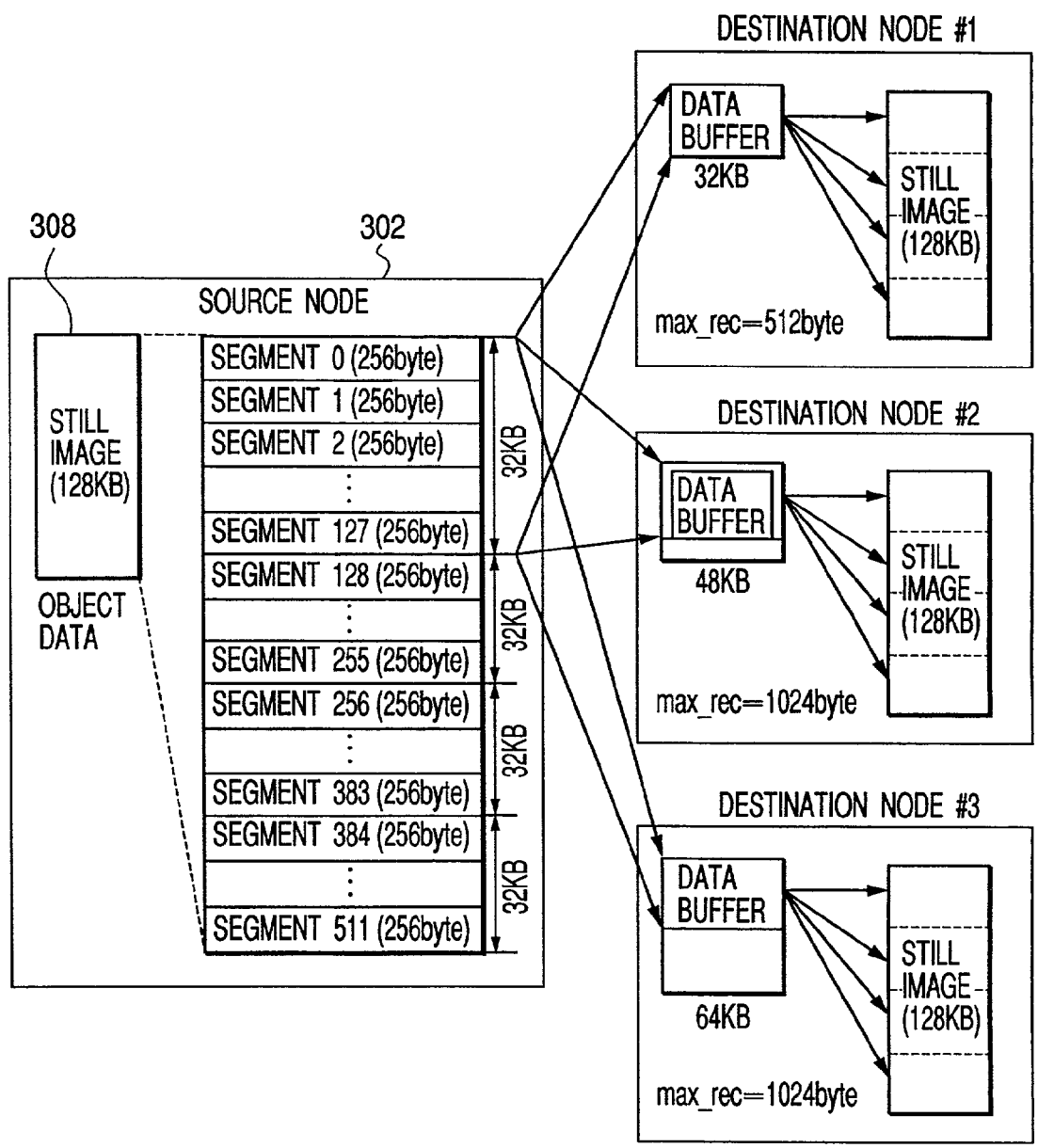
FIG. 31 is a view which illustrates one example of the transfer model of the object data in accordance with a fourth embodiment of the present invention.

In FIG. 31, each of the destinations 304 has the reception buffer of different size, respectively. The destination #1 has 32 Kbytes of the reception buffer. The destination #2 has 48 Kbytes, and The destination #3, 64 Kbytes. Also, in FIG. 31, the max_rec values are: 512 bytes for the destination #1; 1,024 bytes for the destination #2; and 1,024 bytes for the destination #3.

Now, in conjunction with FIG. 32, the transfer procedure will be described in accordance with a fourth embodiment of the present invention.

The controller 300 transmits the SET DESTINATION command packet for setting the connection to each of the destination nodes 304 sequentially. Here, the format of the command packet is the same as the one shown in the second embodiment. Also, the same value is set for the field of the node_vender_id, chip_id_hi, chip_id_lo, and connection_id of the SET DESTINATION command packet transmitted to each of the destination nodes 304.

Each of the destination nodes 304 that has received the SET DESTINATION command packet sets from the packet the connection identifier data in the inner buffer, and transmits the SET DESTINATION response packet to the controller 300 as in the second embodiment.

At this juncture, the destination #1 sets the data that indicates the 512 bytes in the max_rec field shown in FIG. 18, and the data that indicates 32 Kbytes in the buffer_size field as well, and transmits the response packet that indicates the interim. Here, the size of the reception buffer is the integral times or the second power of the value of the max_rec.

Likewise, the destination #2 sets in the max_rec field the data that indicates 1,024 bytes, and the data that indicates 48 Kbytes in the buffer_size field; the destination #3 sets in the max_rec field the data that indicates 1,024 bytes, and the data that indicates 64 Kbytes in the buffer_size field, and then, transmits the response packet that indicates the interim.

After the reception of the interim SET DESTINATION response packet from each of the destination nodes 304, the controller 300 transmits the SET SOURCE command packet to the source node 302 selected by the user in order to set the connection.

Here, the SET SOURCE command packet has the same format as the second embodiment. In this packet, there are written the node_vender_id, chip_id_hi, chip_id_lo, and connection_id set for each of the destination nodes 304. Also, in the max_rec field, the minimum value of the max_rec values received from the each of the destinations 304 is set.

For the present embodiment, the max_rec values received from the three destination nodes 304 are 512 bytes, 1,024 bytes, and 1,024 bytes, respectively, for example. Therefore, the controller 300 sets the data that indicates 512 bytes in the max_rec field. Also, in the buffer_size field, there is set the minimum value of the buffer_size values received from each of the destination nodes 304. In accordance with the present embodiment, the buffer_sizes received from the three destination nodes 304 are 32 Kbytes, 48 Kbytes, and 64 Kbytes, respectively. Therefore, the controller 300 sets the data that indicates 32 Kbytes. Also, in the number_of_destinations field, a numeral 3 is set to indicated the number of the destinations.

The source node 302, having received the SET SOURCE command packet, transmits the SET SOURCE response packet to the controller 300. Here, the format of the SET SOURCE response packet is the same as the one shown in the second embodiment. Also, the same data as the second embodiment are set in each of the fields.

After the reception of the Accepted SET SOURCE response packet from the source node 302, the controller 300 examines the status_info field of the SET SOURCE response packet from the source node 302, and if the "Success" is confirmed, it transmits the OBJECT SEND command packet to the source node 302. In the respect, the function and operation of the OBJECT SEND command are the same as those of the second embodiment. The description thereof will be omitted.

Figure 32:
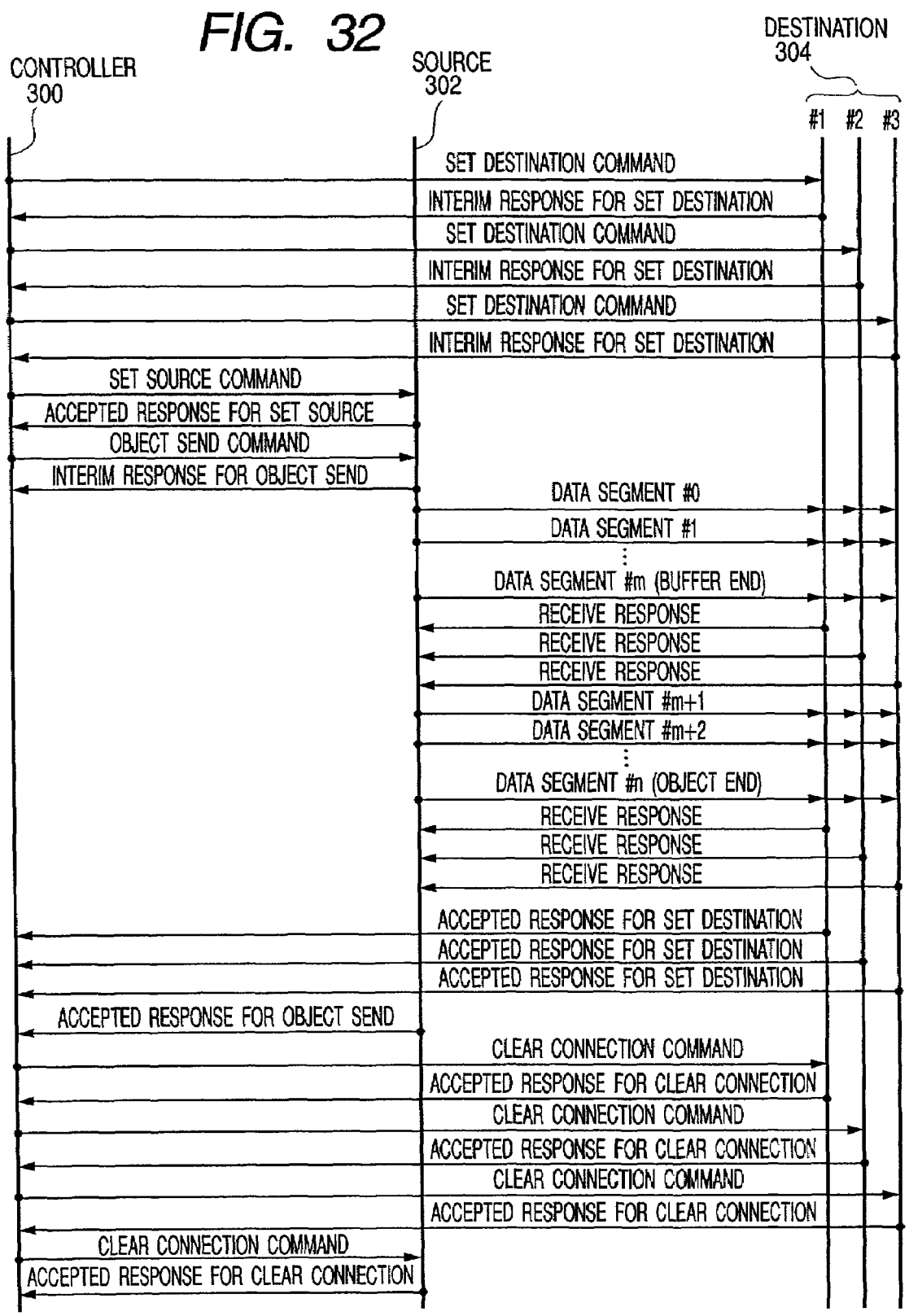
FIG. 32 is a sequence chart which illustrates the communication protocol in accordance with the fourth embodiment.

As described above, with the execution of the procedure shown in FIG. 32 between the controller 300, each of the destination nodes 304, and the source node 302, the logical connection relationship (that is, the interconnection) is set between the source node 302 and the plural destination nodes. Then, using the connection thus set the Asynchronous broadcast transaction of the object data 308 is initiated.

In this respect, the SET DESTINATION, SET SOURCE, and OBJECT SEND packets are transmitted from each of the nodes using the packet whose reception node IDs are designated in each of the destination ID fields 1501 shown in FIG. 15A.

In FIG. 32, after the transmission of the OBJECT SEND response packet, the source node 302 begins transferring the object data 308 in the same manner as the second embodiment. As in the first embodiment, the source node 302 transfer sequentially the broadcast packet containing the multicast ID, the connection identifier data, and 1 segmental data. Each of the destination nodes 304 identifies the connection identifier data of the received packet, and writes sequentially on the inner reception buffer the segmental data contained in the packet if such data are in agreement with the connection identifier data of its own.

As in the second embodiment, the source node 302 counts the total size of the transmitted segmental data, and transfers the segmental data sequentially up to the buffer size of the destination which has been notified from the controller 300.

In this case, the control_flags field of each packet, the normal data are set. The source node 302 sets the buffer end in the control_flags field and transmits the data if the total size of the transmitted data is arrived at an appropriate amount which does not exceed the buffer size of the destination.

For the example shown in FIG. 31, the buffer_end is set in the control_flags when the segment (the segment number 127) is transmitted. At this juncture, the total size becomes the same as the buffer size (which is notified by the SET SOURCE command packet). After that, the source node 302 waits for the receive response packet transmitted from each of the destination nodes 304.

Each of the destination nodes 304 examines the control_flags in the packet when each of the broadcast packets is received. If the examined value indicates the normal data, each of them waits until the next packet is transmitted. If the value of the control_flats indicates the buffer end, each of them copies the data written on the reception buffer to some other buffer (such as a hard disc), and cleans the buffer, and transmits the receive response packet in the format shown in FIG. 25 using the multicast ID. At this juncture, the "Receive success" is set in the control_flags field, and in the sequence number field, the sequence number of the broadcast packet that indicates the buffer end is set. For the example shown in FIG. 31, the 127 is set.

The source node 302 transmits the segmental data having the buffer end set in the control flags field, and receives the receive response packet from each of the destination nodes 304, and then, initiates the transfer of the nest segmental data and on as in the first embodiment. When the last segmental data of the object data 308 is transmitted, it sets the object end in the control_flags field as in the first embodiment, and transfers it, thus waiting for the receive response from the destination node 304.

Each of the destination nodes 304, having received the broadcast packet of the segmental data having the object end set therein, transmits the receive response in the same manner as to the other broadcast packets. After that, each of the destinations transmits the SET DESTINATION response packet to the controller 300 as in the second embodiment.

Also, having received the receive response packet of the object end from each of the destinations 304, the source node 302 transmits to the OBJECT END response packet to the controller 300 as in the second embodiment. With the execution of the procedure described above, the Asynchronous broadcast transaction of the object data 308 is completed between the source node 302 and the plural destination nodes 304.

After having received the response packet that indicates the OBJECT SEND, and SET DESTINATION from the source node 302 and each of the destination nodes 304, respectively, the controller 300 transmits the CLEAR CONNECTION command packet to each of the destination nodes 304 and the source node 302 in order to release the connection. In this respect, this CLEAR CONNECTION command packet is in the same format as shown in the second embodiment.

Each of the destination nodes 304 and the source node 302 which have received the CLEAR CONNECTION command packet release the connection in the same procedure as shown in the second embodiment, and then, transmit the CLEAR CONNECTION response packet to the controller 300, respectively.

With the reception of the Accepted CLEAR CONNECTION response packet from each of the destination nodes 304 and the source node 302, the controller 300 releases the connection, and at the same time, it clears the bits used by the connection_id flag registers as shown in FIG. 22. With the execution of the procedure described above, the logical connection relationship set between the source node 302 and the plural destination nodes 304 is released to terminate all the transactions that use this connection.

Also, in accordance with the fourth embodiment, it is possible to perform the transaction of the object data 308 by use of the packet format shown in FIG. 15B in the same manner as the second embodiment.

Also, in accordance with the fourth embodiment, each of the destination nodes 304 executes the same process as the third embodiment even if any bus reset takes place while the object data 308 is being transferred, hence making it possible to resume the transfer of the object data 308. In this case, the source node 302 receives the receive response packet from each of the destination nodes 304, and resumes the transfer beginning with the segmental data having the smallest sequence number plus 1 as its number.

As described above, in accordance with the fourth embodiment, it is possible for the controller 300 to set the logical connection relationship (that is, the interconnection) between the source node and the plural destination nodes. Also, the data transfer process can be executed simply and efficiently between the source node and a plurality of destination nodes only by means of the broadcast transaction without the intervention of the controller 300.

Also, even when the reception capability of each of the destination nodes is different, it is possible to perform the data transfer without any complicated process with the data transfer which is made executable in consideration of the lowest reception capability of the plural destination nodes to which the data should be transferred.

Fifth Embodiment

Now, a fifth embodiment will be described in accordance with the present invention. For the fifth embodiment, the description will be made of the communication protocol whereby the controller 300 sets the logical connection (that is, the interconnection) between the source node 302 and the destination node 304 as in the first to fourth embodiments, and the transfer of the object data 308 is implemented by means of the Asynchronous transaction between the source node 302 and the destination node 304.

In accordance with the fifth embodiment, the description will be made of the communication protocol which is capable of setting the size of the reception buffer provided for the destination node 304 appropriately between the source node 302 and the destination node 304.

Hereinafter, in conjunction with the accompanying drawings, the communication protocol will be described in accordance with the fifth embodiment of the present invention. In this respect, the fundamental structure of the communication protocol of the fifth embodiment is assumed to be the same as the first embodiment, and the description thereof will be omitted.

Figure 33:
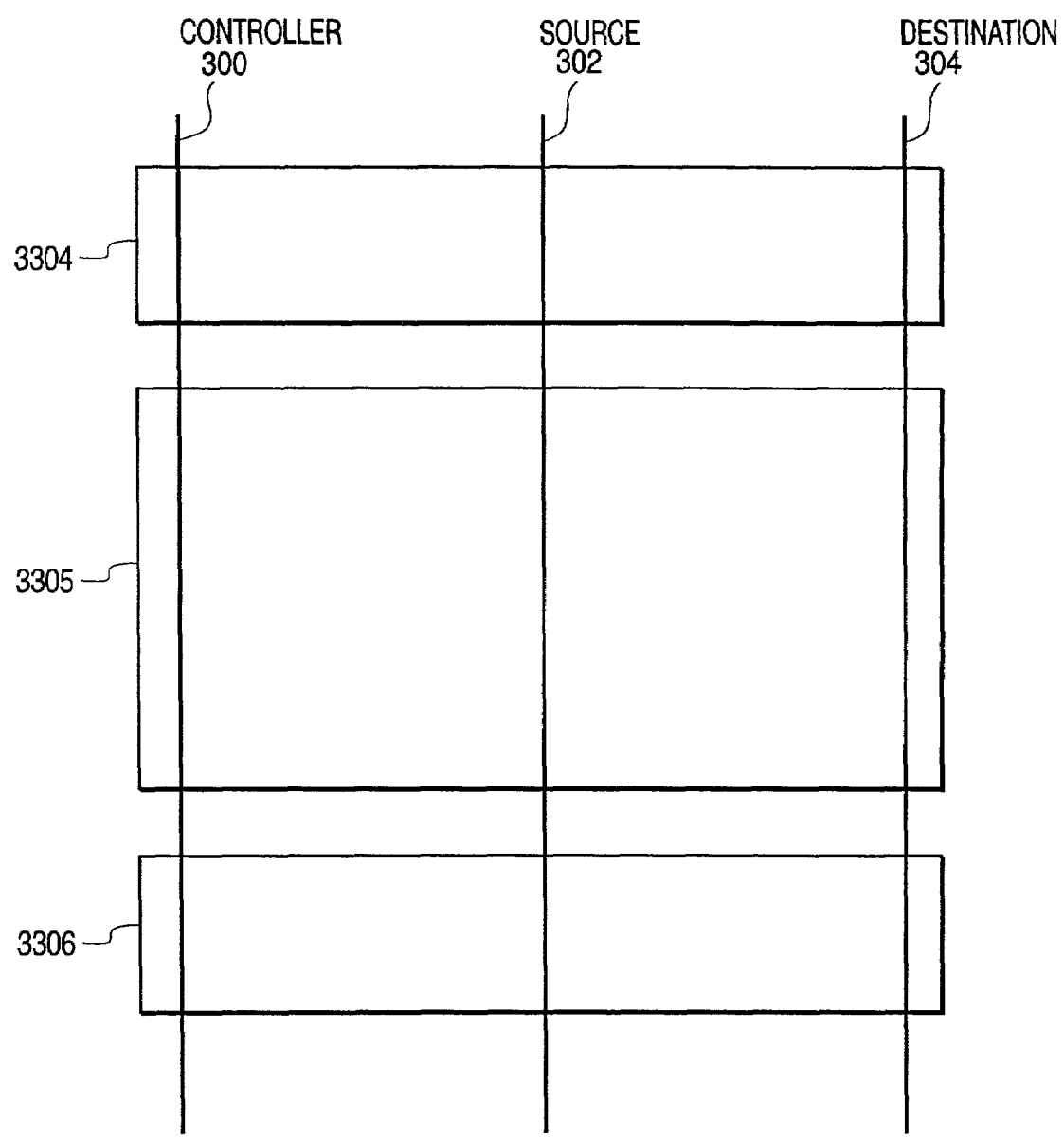
FIG. 33 is a sequence chart which illustrates the fundamental procedure of the communication protocol in accordance with a fifth embodiment of the present invention.

FIG. 33 is a sequence chart which illustrates the fundamental procedure of the communication protocol in accordance with the fifth embodiment of the present invention.

In FIG. 33, it is assumed that the node that transfers the object data 308 asynchronously, namely the source node 302, is the DVCR 28.

Also, it is assumed that the node that receives the object data 308 transferred asynchronously from the source node 302, namely the destination node 304, is the printer 60. Further, the node that manages the communication between the source node 302 and the destination node 304, namely the controller 300, is assumed to be the computer 10.

In accordance with the fifth embodiment, the communication protocol is formed by three phases. The first phase 3304 is the connection phase, and the controller 300 queries the destination node 304 about the size of the reception buffer, as well as whether or not the reception is possible, and sets the destination node 304 to be on standby for reception.

Also, the controller 300 notifies the source node 302 of the size of the reception buffer of which it has queried the destination node 304, and at the same time, selects the object data 308 transferred from the source node 302 asynchronously, hence setting the transfer from the reception buffer. In this way, the connection is set between the source node 302 and the destination 304.

The second phase 3305 is the transfer phase where the controller 300 controls the source node 302 and the destination node 304 in order to transfer the object data 308 asynchronously.

The third phase 3306 is the connection release phase where the controller 300 releases the reception buffer of the destination node 304 from under the management of its own, and also, releases the transmission buffer of the source node 302 from under the management of its own.

Figure 34:
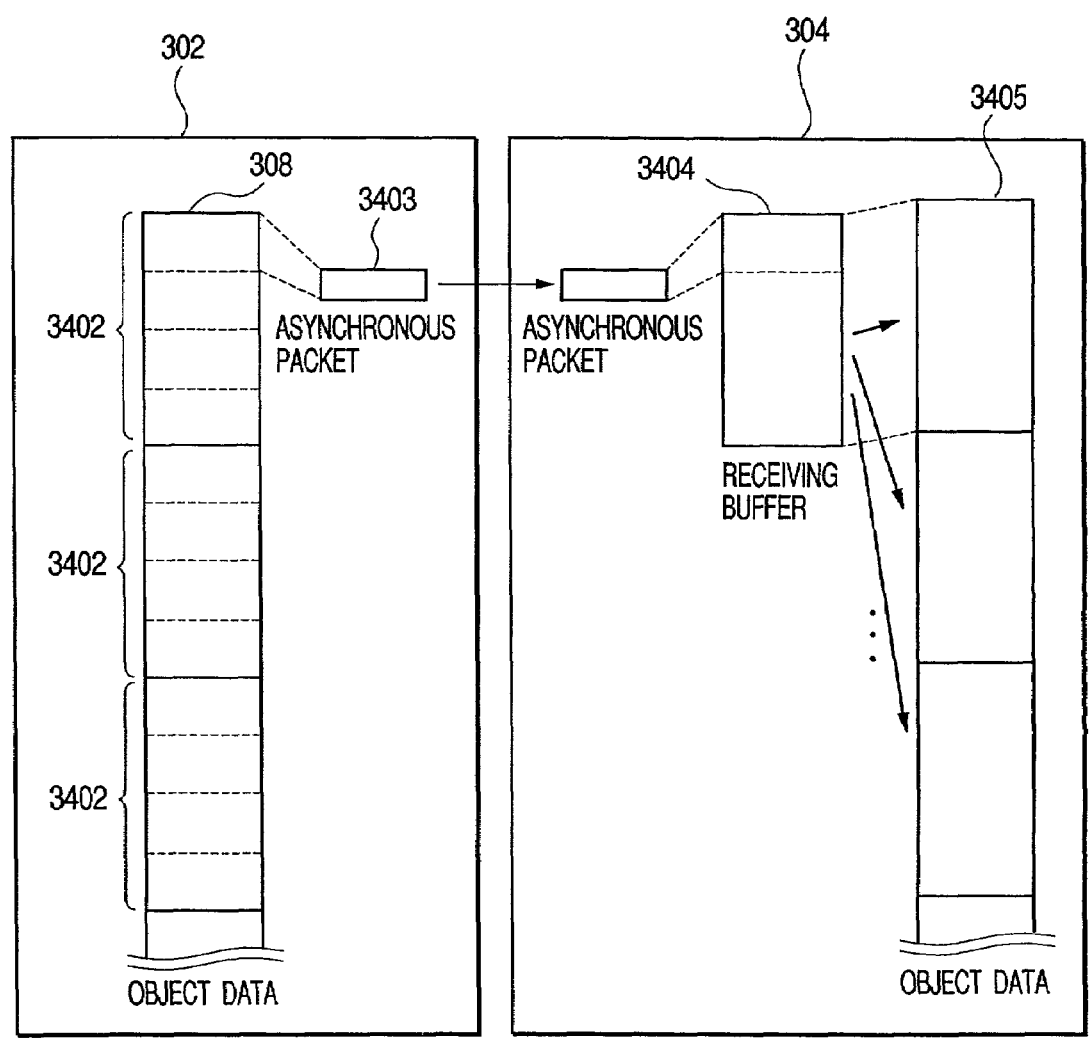
FIG. 34 is a view which illustrate one example of the transfer model of the object data in accordance with the fifth embodiment.

FIG. 34 is a view which illustrates the relationship between the object data 308 transferred from the source node 302 asynchronously and the reception buffer of the destination node 304. One object data 308 transferred from the source node 302 asynchronously is segmented into one or more segments 3402 which are equal to the size of the reception buffer of the destination node 304, which has been notified from the controller 300. Here, the size of each of the segments 3402 is fixed. One segment is formed by one or more data of the fixed length.

Each of the segmental data is packetized into the packet 3403 (hereinafter referred to as an Asynchronous packet 3403) for use of the Asynchronous transfer mode, and transferred sequentially from the source node 302 to the destination node 304.

The destination node 304 receives each of the Asynchronous packets 3403 from the source node 302 sequentially, and writes on the reception buffer 3404 provisionally. After the completion of the transfer of one segment 3402, the destination node 304 writes the data stored on the reception buffer onto the inner memory 3405 sequentially.

Now, the detailed description will be made of the transfer phase 3305 of the fifth embodiment in conjunction with FIG. 35 and FIG. 36.

Figure 35:
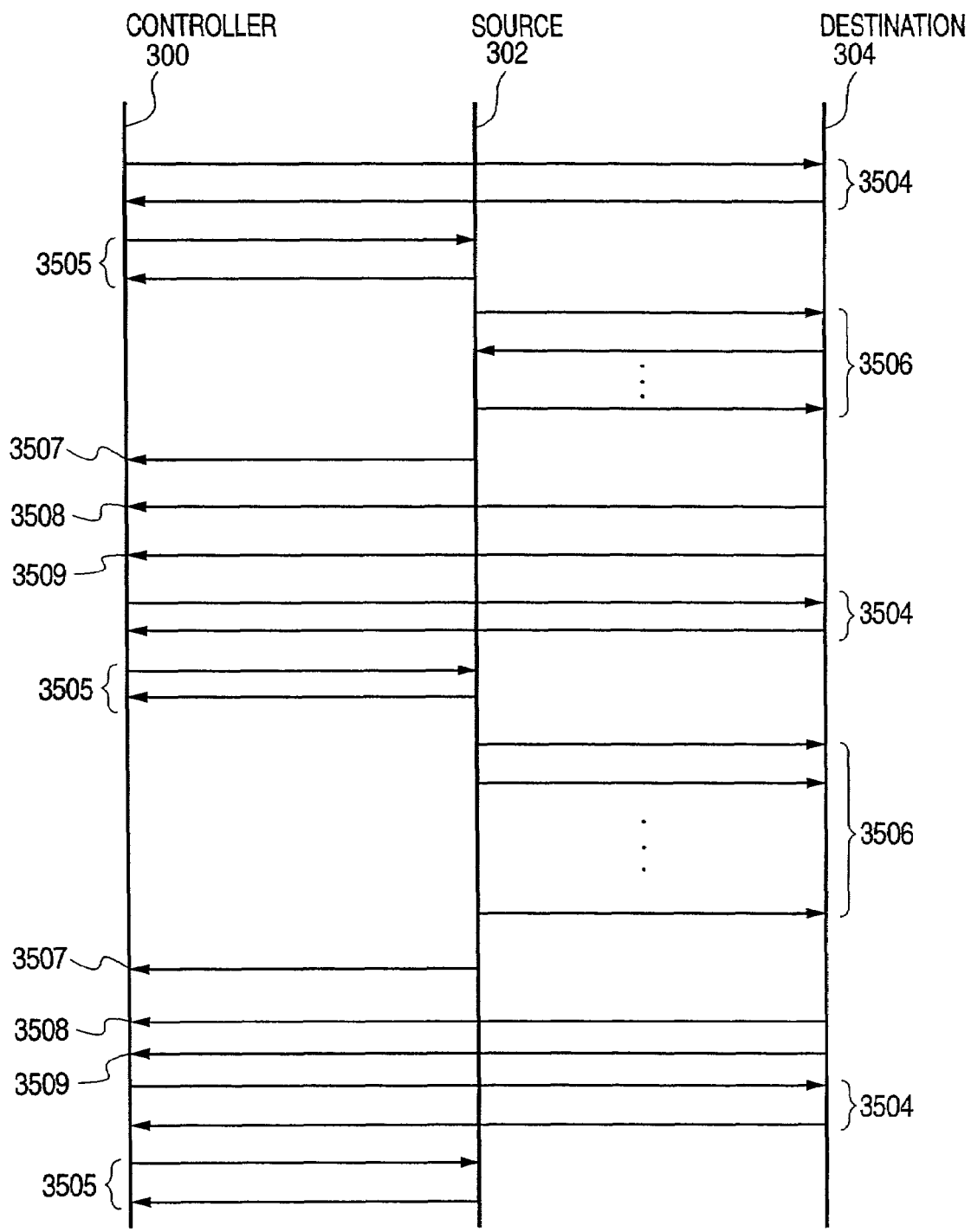
FIG. 35 is a sequence chart which illustrates the details of the communication protocol in accordance with the fifth embodiment.
Figure 36:
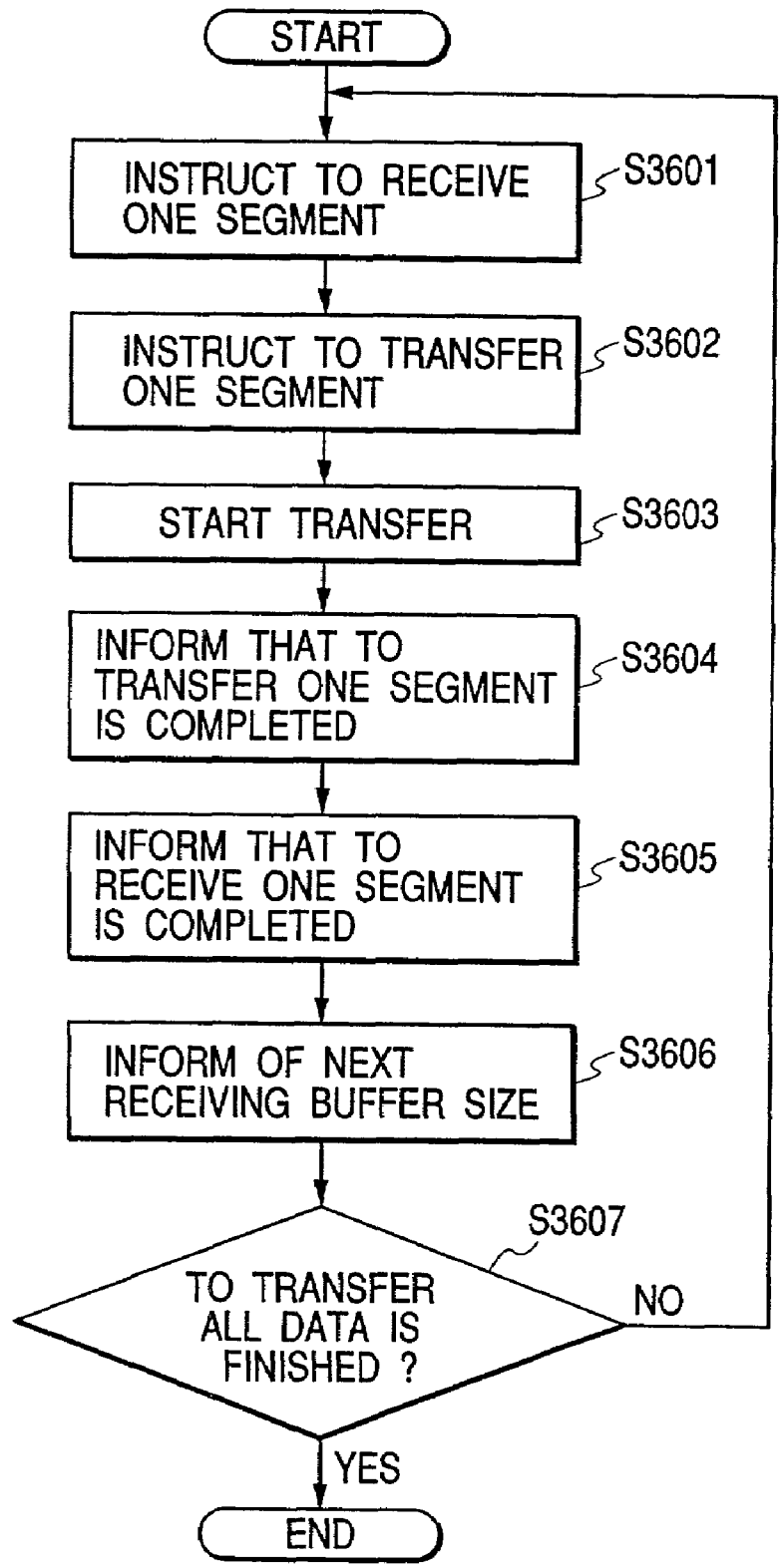
FIG. 36 is a flowchart which illustrates the communication procedure in accordance with the fifth embodiment.

FIG. 35 is a sequence chart which illustrates the transfer phase 3305 in detail in accordance with the fifth embodiment of the present invention. Also, FIG. 36 is a flowchart which illustrates the procedure of the transfer phase 3305 in detail in accordance with the first embodiment.

In step S3601, the controller 300 instructs the destination node 304 to receive the object data 308 of a specific size which is asynchronously transferred in several communication packets (at 3504 in FIG. 35). Here, the destination node 304 returns the response to this instruction from the controller 300.

In step S3602, the controller 300 instructs the source node 302 to segment the object data 308 into each of the segments of a specific size and transfer the segments asynchronously in several communication packets (at 3505 in FIG. 35). Here, the source node 302 returns the response to this instruction from the controller 300.

In step S3603, subsequent to the instruction from the controller 300, the source node 302 packetizes one segment into one or more Asynchronous packets, and transfers them to the destination node 304 sequentially (at 3506 in FIG. 35).

Here, in each of the Asynchronous packets, there is stored the offset address that designates the specific region of the reception buffer provided for the destination node 304. For example, in the first Asynchronous packet of each segment, the header address of the reception buffer notified by the controller 300 is stored. Also, in the Asynchronous packets to follow, the offset addresses that sequentially designate the specific regions of the reception buffers are stored.

In step S3604, after the completion of the Asynchronous transfer of one segmental portion, the source node 302 notifies the controller 300 of the completion of the transfer of the one segmental portion (at 3507 in FIG. 35). Here, the source node 302 waits for the next segmental transfer until it receives the instruction from the controller 300.

In step S3605, the destination node 304 also notifies the controller 300 of the completion of the one segmental reception (at 3508 in FIG. 35).

In step S3606, the destination node 304 further notifies the controller 300 of the size of the reception buffer that can be secured anew in order to receive the next segment (at 3509 in FIG. 35). Here, the controller 300 manages the new buffer size notified from the destination node 304 after storing it on the specific region in the CSR space shown in FIG. 6.

With the execution of the procedure described above, the transfer of one segment is completed.

When the transfer of the next segment and on is initiated, the controller 300, the source node 302, and the destination node 304 should only repeat the procedural steps 3504 to 3509 in FIG. 35 (step 3607). At this juncture, the controller 300 notifies the source node 302 of the new buffer size known from the destination node 304 per completion of one segmental transfer.

As described above, in accordance with the fifth embodiment, it is controlled that with each completion of one segmental transfer, the destination node 304 notifies the controller 300 of the new buffer size, hence appropriately setting the amount of data for each segment corresponding to the reception capability of the destination node 304.

Sixth Embodiment

For the fifth embodiment described above, the description has been made of the communication protocol which controls to enable the destination node 304 to notify the controller 300 of the size of reception buffer newly secured by the destination node 304 for the next reception of the segment per reception of one segmental portion of the object data 308.

For a sixth embodiment of the present invention, the description will be made of the communication protocol which controls to enable the destination node 304 to notify the source node 302 directly of the size of reception buffer newly secured for the next reception of the segment.

As in the fifth embodiment, the communication protocol of the sixth embodiment is formed by three phases, that is, the connection phase, the transfer phase, and the connection release phase. Here, the connection phase and the connection release phase of the sixth embodiment are executable as the first phase 3304 and the third phase 3306 which are described in conjunction with the fifth embodiment. Therefore, for the sixth embodiment, the transfer phase 3305 will be described in detail.

Now, hereunder, the detailed description will be made of the sixth embodiment in conjunction with FIG. 37 and FIG. 38.

Figure 37:
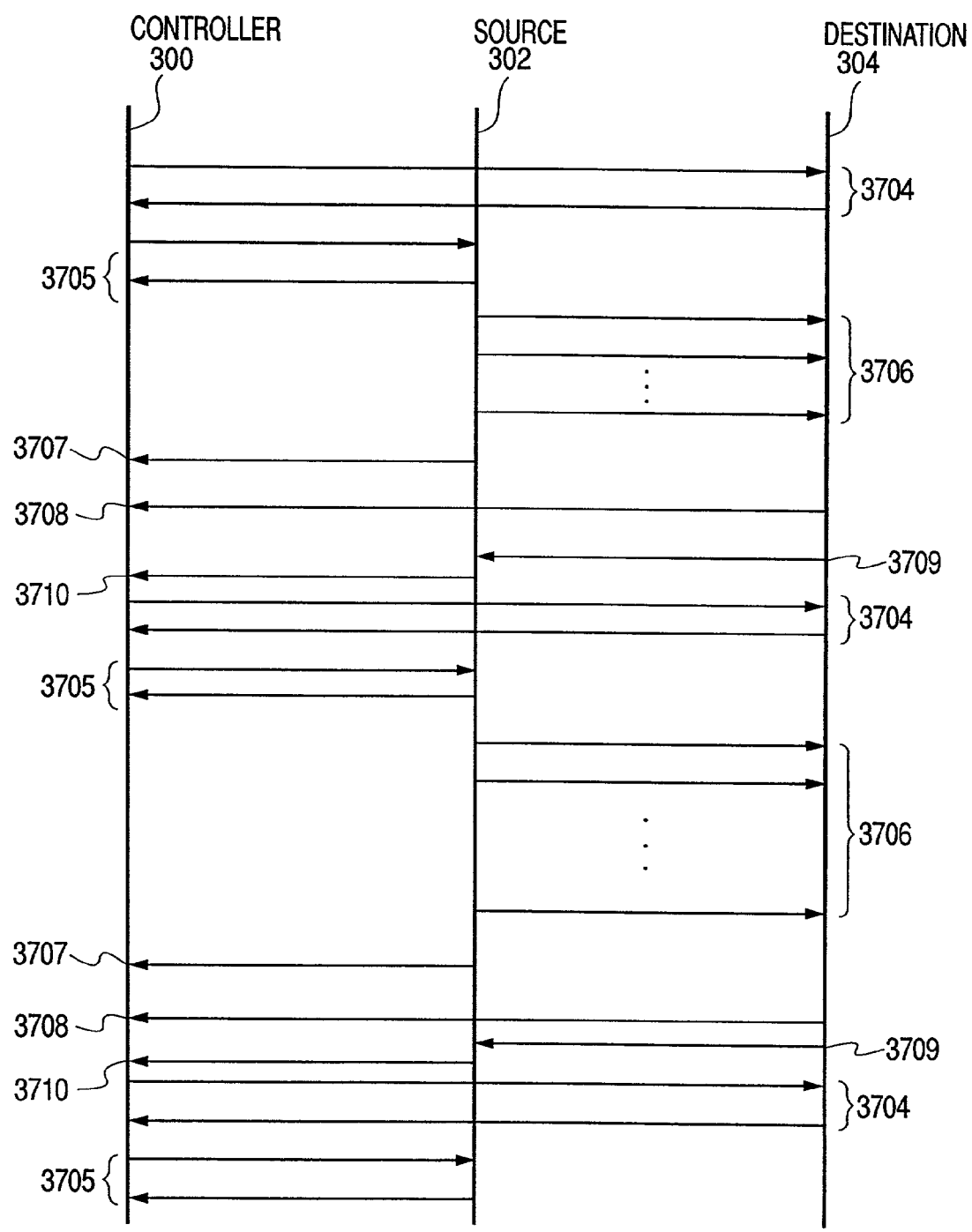
FIG. 37 is a sequence chart which illustrates the details of the communication protocol in accordance with a sixth embodiment of the present invention.
Figure 38:
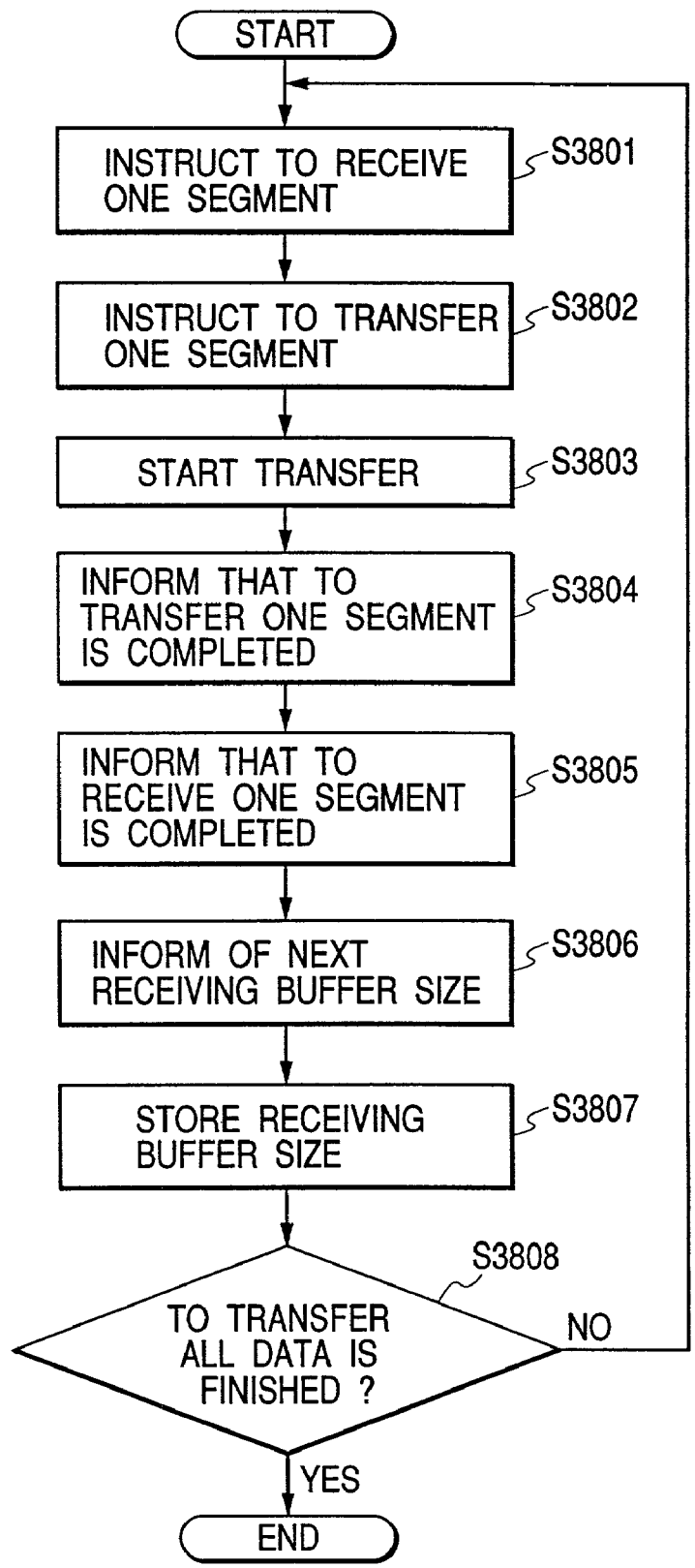
FIG. 38 is a flowchart which illustrates the communication procedure in accordance with the sixth embodiment.

FIG. 37 is a sequence chart which illustrates the transfer phase in detail in accordance with the sixth embodiment of the present invention. FIG. 38 is a flowchart which illustrates the procedure of the transfer phase in detail in accordance with the sixth embodiment.

In step S3801, the controller 300 instructs the destination node 304 to receive the object data 308 of a specific size which is asynchronously transferred in several communication packets (at 3704 in FIG. 37). Here, the destination node 304 returns the response to this instruction from the controller 300.

In step S3802, the controller 300 instructs the source node 302 to segment the object data 308 into each of the segments of a specific size and transfer the segments asynchronously in several communication packets (at 3705 in FIG. 37). Here, the source node 302 returns the response to this instruction from the controller 300.

In step S3803, subsequent to the instruction from the controller 300, the source node 302 packetizes one segment into one or more Asynchronous packets, and transfers them to the destination node 304 sequentially (at 3706 in FIG. 37). Here, in each of the Asynchronous packets, there is stored the offset address that designates the specific region of the reception buffer provided for the destination node 304. For example, in the first Asynchronous packet of each segment, the header address of the reception buffer notified by the controller 300 is stored. Also, in the Asynchronous packets to follow, the offset addresses that sequentially designate the specific regions of the reception buffers are stored.

In step S3804, after the completion of the Asynchronous transfer of one segmental portion, the source node 302 notifies the controller 300 of the completion of the transfer of the one segmental portion (at 3707 in FIG. 37). Here, the source node 302 waits for the next segmental transfer until it receives the instruction from the controller 300.

In step S3805, the destination node 304 also notifies the controller 300 of the completion of the one segmental reception (at 3708 in FIG. 37).

In step S3806, the destination node 304 further notifies the source node 302 of the size of the reception buffer that can be secured anew in order to receive the next segment (at 3709 in FIG. 37).

In step 3807, the source node 302 stores the size of the reception buffer on the a specific region of the CSR space shown in FIG. 6, and at the same time, notifies the controller 300 that t has received the size of this reception buffer (at 3710 in FIG. 37). With this notification, it becomes possible for the controller 300 to instruct the initiation of the transfer of the next segment.

With the execution of the procedure described above, the transfer of one segment is completed. When the transfer of the next segment and on is initiated, the controller 300, the source node 302, and the destination node 304 should only repeat the procedural steps 3704 to 3710 in FIG. 37 (step S3808)

At this juncture, the source node 302 receives the size of the new reception buffer notified from the destination node 304 per completion of one segmental transfer, and determines the size of the segment which should be transferred next in accordance with the size thus received. As described above, in accordance with the sixth embodiment, it is controlled that with each completion of one segmental transfer of the object data 308, the destination node 304 notifies the source node 302 of the new buffer size directly, hence appropriately setting the amount of data for each segment corresponding to the reception capability of the destination node 304.

Also, in accordance with the sixth embodiment, there is no need for the controller 300 to manage the size of the reception buffer of the destination node 304 which has been changed during the communication of the object data 308. Thus, this size can be managed between the source node 302 and the destination node 304. In this way, as compared with the fifth embodiment, the load to the controller 300 can be made smaller.

Seventh Embodiment

For the sixth embodiment, the description has been made of the communication protocol that controls to set the connection between the controller 300, the source node 302, and the destination node 304, and at the same time, to enable the controller 300 to instruct initiating the transfer of each of the segments.

For a seventh embodiment of the present invention, the description will be made of the communication protocol that controls the transfer of each segment between the source node 302 and the destination node 304 without the intervention of the controller 300 subsequent to the connection having been set by the controller 300 between the source node 302 and the destination node 304.

Hereunder, the description will be made of the case where the communication protocol of the seventh embodiment is applied to the communication system shown in FIG. 2. Here, for the seventh embodiment, it is assumed that the controller 300 is the computer 10; the source node 302 is the DVCR 28; and the destination node 304 is the printer 60.

In accordance with the seventh embodiment, the source node 302 segments one object data shown in FIG. 34 (such as image data, audio data, graphics data, and text data) into each segment of a specific size, and then, transfer such segment asynchronously as one or more data having fixed length.

Also, the destination node 304 receives one or more Asynchronous packets transferred from the source node 302 asynchronously, and stores the data of the fixed length contained in each of the Asynchronous packets on the reception buffer sequentially. Here, the reception buffer of the destination node 304 is secured in the space (shown in FIG. 6) of the CSR (Control and Status Register) provided for the designation node 304.

Each of the segments is written on the specific region in the CSR space designated by the offset address contained in each of the Asynchronous packets. The destination node 304 stores one segmental portion on the inner memory at each time it has been written on the specific region in the CSR space.

Further, the controller 300 manages the connection between the source node 302 and the destination node 304 with the instructions to the source node 302, and the destination node 304 to release the buffer regions or to instruct the source node 302 to initiate the transfer of the object data 308, among some others.

Now, hereunder, the communication protocol will be described in accordance with the seventh embodiment of the present invention.

Figure 39:
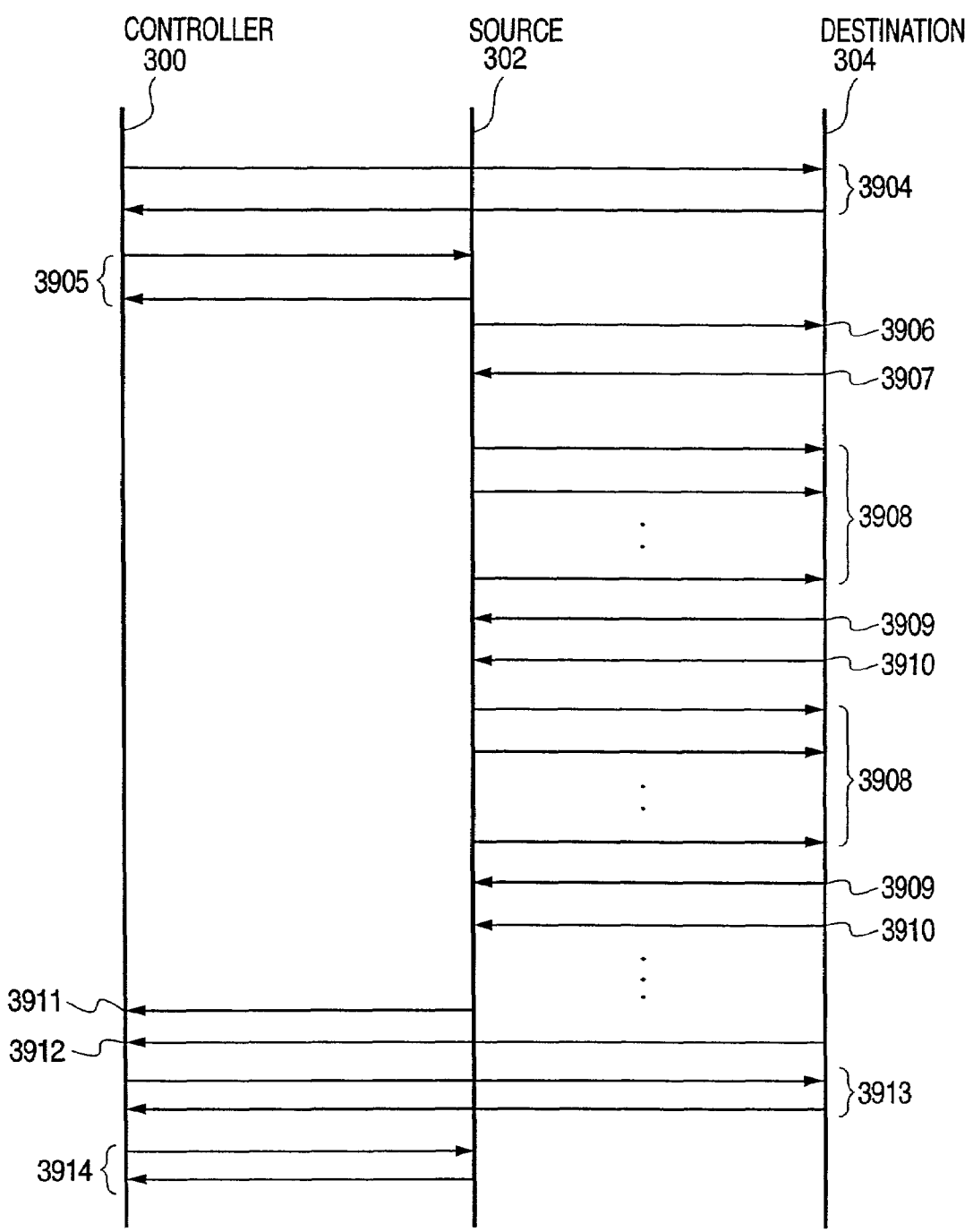
FIG. 39 is a sequence chart which illustrate the details of the communication protocol in accordance with a seventh embodiment of the present invention.
Figure 40:
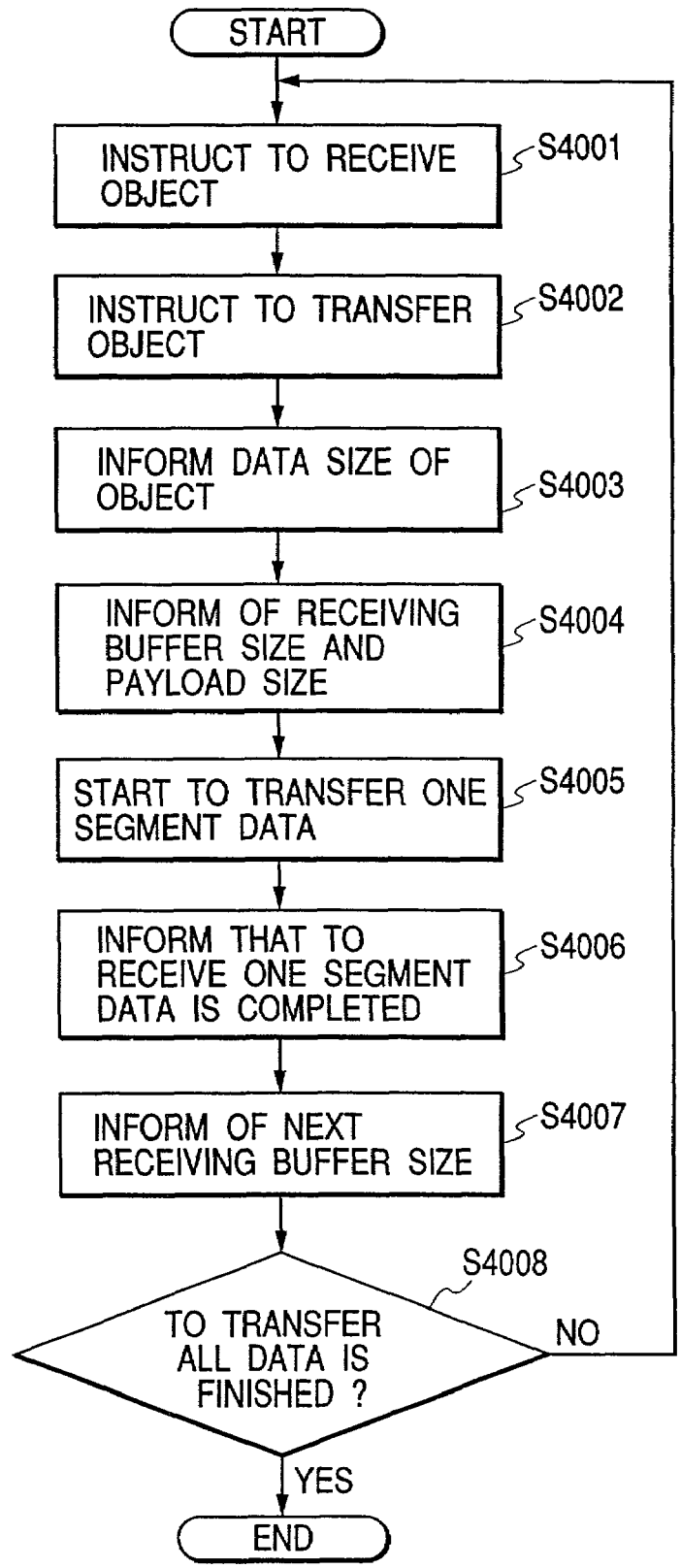
FIG. 40 is a flowchart which illustrates the communication procedure in accordance with the seventh embodiment.

FIG. 39 is a sequence chart which illustrates the communication protocol in detail in accordance with the seventh embodiment of the present invention. FIG. 40 is a flowchart which illustrates the procedure of the communication protocol in detail in accordance with the seventh embodiment.

As in the communication protocol of the fifth embodiment, the communication protocol of the seventh embodiment is formed by the three phases, that is, the connection phase 3304, the transfer phase 3305, and the connection release phase 3306.

At first, the connection phase 3304 will be described.

In step S4001, the controller 300 sets the connection between the source node 302 and the destination node 304, and instructs the destination node 304 to release the reception buffer and initiate the reception of the object data 308 (at 3904 in FIG. 39). Here, the destination node 304 returns the response to this instruction from the controller 300.

In step S4002, the controller 300 instructs the source node 302 to release the transmission buffer and initiate the transmission of the object data 308 (at 3905 in FIG. 39). Here, the source node 302 returns the response to this instruction from the controller 300.

Now, the transfer phase 3305 will be described.

In step S4003, the source node 302 notifies the destination node 304 of the data size of the object data 308 (at 3906 in FIG. 39). The destination node 304 stores this data size on a specific region in the CSR space shown in FIG. 6.

In step S4004, the destination node 304 communicate on the size of the reception buffer and the receivable data size with 1 Asynchronous packet (that is, the pay load size) (at 3907 in FIG. 39). The source node 302 stores this reception buffer size and the pay load size on a specific region in the CSR space sown in FIG. 6.

In step S4005, the source node 302 segments the object data 308 into each segment of a specific size in accordance with the reception buffer size and the pay load size, and packetizes the segment into one or more Asynchronous packets, hence transferring them to the destination node 304 sequentially (at 3908 in FIG. 39). After the completion of the transfer of one segment, the source node 302 waits for the transfer of the next segment until it is notified by the destination node 304 of the completion of the transfer of 1 segment.

Here, in each of the Asynchronous packets, there is stored the offset address that designates the specific region of the reception buffer provided for the destination node 304. For example, in the first Asynchronous packet of each segment, the header address of the reception buffer notified by the source node 302 is stored. Also, in the Asynchronous packets to follow, the offset addresses that sequentially designate the specific regions of the reception buffers are stored.

In step S4006, after the completion of the Asynchronous transfer of one segmental portion, the destination node 304 notifies the source node 302 of the completion of the transfer of the one segmental portion (at 3909 in FIG. 39).

In step S4007, the destination node 304 further notifies the source node 302 of the size of the reception buffer that can be secured anew in order to receive the next segment (at 3910 in FIG. 39). The source node 302 stores this reception buffer size on a specific region in the CSR space, and at the same time, sets the size of the segment which is transferred next in accordance with this reception buffer size and the pay load size.

With the execution of the procedure described above, the transfer of one segment of the object data 308 is completed.

When the transfer of the next segment and on is initiated, the controller 300, the source node 302, and the destination node 304 should only repeat the procedural steps 3904 to 3910 in FIG. 39 (step S4008) At this juncture, the source node 302 receives the size of the new reception buffer notified from the destination node 304 per completion of one segmental transfer, and determines the size of the segment which should be transferred next in accordance with the size thus received. Subsequent to the completion of the transfer of 1 object data 308, the source node 302 notifies the controller 300 of the completion of the transfer (at 3911 in FIG. 39).

Also, the destination node 304 notifies the controller 300 of the completion of the reception of 1 object data 308 (at 3912 in FIG. 39).

With the procedure described above, the transfer phase 3305 is completed.

In the connection release phase 3306, the controller 300 releases the reception buffer of the destination node 304 which has been under its own management when it is notified by the source node 302 and the destination node 304 of the completion of communication (at 3913 in FIG. 39), and also, releases the transmission buffer of the source node 302 which has been under its own management (at 3914 in FIG. 39).

As described above, in accordance with the seventh embodiment, it is controlled that with each completion of one segmental transfer of the object data 308, the destination node 304 notifies the source node 302 of the new buffer size, hence making it possible to appropriately set the amount of data for each segment.

Also, in accordance with the seventh embodiment, there is no need for the controller 300 to manage the size of the reception buffer of the destination node 304 which has been changed during the communication of the object data 308. Thus, this size can be managed between the source node 302 and the destination node 304. In this way, as compared with the fifth embodiment, the load to the controller 300 can be made smaller.

Further, in accordance with the seventh embodiment, after the connection has been set between the source node 302 and the destination node 304, the setting of size for each segment and the transfer of each segment can be controlled between the source node 302 and the destination node 304 for the execution thereof. Therefore, as compared with the fifth and sixth embodiments, it becomes possible to reduce the load given to the controller 300 and make the communication procedure simpler still.

Eighth Embodiment

As in the seventh embodiment described above, the communication protocol will be described in accordance with an eighth embodiment of the present invention, in which the controller 300 sets the connection between the source node 302 and the destination node 304, and after that, it controls the transfer of each segment between the source node 302 and the destination node 304 without the intervention of the controller 300.

Hereunder, the description will be made of the case where the communication protocol of the eighth embodiment is applied to the communication system shown in FIG. 2. Here, for the eighth embodiment, it is assumed that the controller 300 is the computer 10; the source node 302 is the DVCR 28; and the destination node 304 is the printer 60.

In accordance with the eighth embodiment, the source node 302 segments one object data 308 shown in FIG. 34 (such as image data, audio data, graphics data, and text data) into each segment of a specific size, and then, transfers such segment asynchronously as one or more data having fixed length.

Also, the destination node 304 receives one or more Asynchronous packets transferred from the source node 302 asynchronously, and stores the data of the fixed length contained in each of the Asynchronous packets on the reception buffer sequentially. Here, the reception buffer of the destination node 304 is secured in the space (shown in FIG. 6) of the CSR (Control and Status Register) provided for the designation node 304.

Each of the segments is written on the specific region in the CSR space designated by the offset address contained in each of the Asynchronous packets. The destination node 304 stores one segmental portion on the inner memory at each time it has been written on the specific region in the CSR space.

Now, hereunder in conjunction with FIG. 42 and FIG. 43, the detailed description will be made of the structure of the buffers provided for the source node 302 and the destination node 304.

Figure 42:
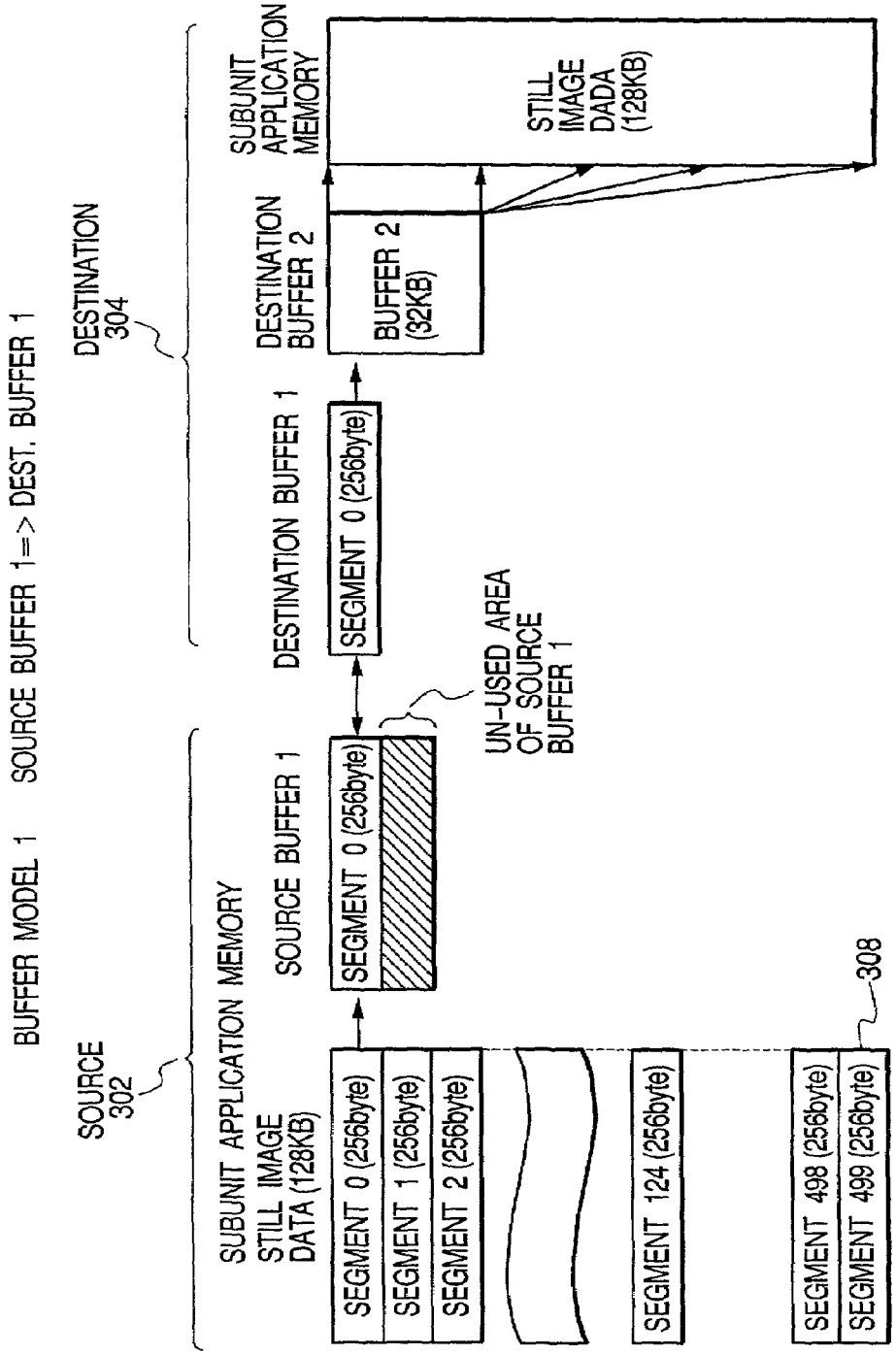
FIG. 42 is a view which illustrates one example of the transfer model of the object data in accordance with the eighth embodiment.

In FIG. 42 and FIG. 43, the source node 302 is provided with one reception buffer, that is, "source buffer 1". Here, the source buffer 1 is secured on the specific region in the CSR space provided for the source node 302.

Also, in FIG. 42 and FIG. 43, the destination node 304 is provided with two reception buffers, that is, "destination buffer 1" and "destination buffer 2". Here, the destination buffer 1 and the destination buffer 2 are secured on the specific region in the CSR space provided for the destination 304.

The sizes of the source buffer 1, the destination buffer 1, and the destination buffer 2 are defined as follows:

At first, in accordance with the eighth embodiment, the sizes of the destination buffer 1 and destination buffer 2 are defined as follows:

$$\text{Destination Buffer 2} = (\text{max\_rec}) \times N (N=1, 2, 3 \ldots) \quad \text{(Formula 1)}$$

Here, the destination buffer 2 corresponds to the size of one segment. Also, the N is an integer, and it corresponds to the number of segmental data that forms one segment.

$$\text{Destination buffer 1} = \text{max\_rec} \quad \text{(Formula 2)}$$

Here, "max_rec" means the maximum value of the pay load size of the destination node 304 which can receive the Asynchronous packet receivable in accordance with the Asynchronous write transaction based on the IEEE 1394-1995 standards. In this respect, the size of the "max_rec" is different depending on the maximum data transfer speed of the corresponding destination node 304. The "max_rec" is defined as follows:

$$\text{Max\_rec} = 4 \text{ Bytes} \times 2^L (L=0, 1, 2, \ldots) \quad \text{(Formula 3)}$$

Here, the L is an integer.

From the (Formula 1) and the (Formula 2), the relationship between the destination buffer 1 and the destination buffer 2 becomes as follows:

$$\text{Destination buffer 2} = (\text{Destination buffer 1}) \times N (N=1, 2, 3 \ldots) \quad \text{(Formula 4)}$$

Also, in accordance with the eighth embodiment, the source buffer 1 is defined as follows:

$$\text{Source buffer 1} = 4 \text{ Bytes} \times 2^M (M=0, 1, 2 \ldots) \quad \text{(Formula 5)}$$

In the formula 5, the source buffer 1 means the maximum value of the pay load size of the Asynchronous packet of the source node 302 that can be transmitted. In this respect, the size of the source buffer 1 is different depending on the maximum data transfer speed of the corresponding source node 302. Here, the M is an integer.

From the (Formula 3) and the (Formula 5), the relationship between the max_rec and the source buffer 1 becomes the following formula (6):

$$\text{Source buffer 1} : \text{max\_rec} = 2^M : 2^L \quad \text{(Formula 6)}$$

Then, the max_rec is:

$$\text{Max\_rec} = (2^L/2^M) \times (\text{source buffer 1}) = \{2^{(L-M)}\} \times (\text{source buffer 1}) \quad \text{(Formula 7)}$$

From the (Formula 7) and the (formula 1), the destination buffer 2 is:

$$\text{Destination buffer 2} = (\text{source buffer 1}) \times \{2^{(L-M)}\} \times N \quad \text{(Formula 8)}$$

From the (Formula 8), the destination buffer 2 is filled up when the source node 302 transmits the Asynchronous packet whose pay load size is that of the source buffer 1 $[\{2^{(L-M)}\} \times N]$ times.

With the definition thus made, the size of the destination buffer 2 can be determined by the size of the source buffer 1 and the size of the destination buffer 1.

For example, in FIG. 42, in the case of the source buffer 1 =destination buffer 1 (=max_rec), the M=L. In this case, the size of the destination buffer 2 becomes N times the size of the source buffer 1. As a result, with the setting of the N value, it becomes possible to control the size of each segment variably.

Also, in FIG. 42, in the case of the source buffer 1>destination buffer 1 (=max_rec), M>L. In this case, the source node 302 sets the size of the source buffer 1 to be equal to the size of the destination buffer 1. In this way, the size of the destination buffer 2 becomes N times the source buffer 1. As a result, by setting the N value, it is possible to control the size of each segment variably.

Further, in FIG. 43, in the case of the source buffer 1<destination buffer 1 (=max_rec), the M<L. In this case, the destination node 304 sets the size of the destination buffer 1 to be equal to the size of the source buffer 1. In this way, the size of the destination buffer 2 becomes $[\{2^{(L-M)}\} \times N]$ times the size of the source buffer 1. Therefore, with the setting of the values of M, N and L, it becomes possible to control the size of each segment variably.

Further, in accordance with the eighth embodiment, the controller 300 manages the connection between the source node 302 and the destination node 304 with the instructions to the source node 302, and the destination node 304 to release the buffer regions or to instruct the source node 302 to initiate the transfer of the object data 308, among some others.

Now, hereunder, the communication protocol will be described in accordance with the eighth embodiment of the present invention.

Figure 41:
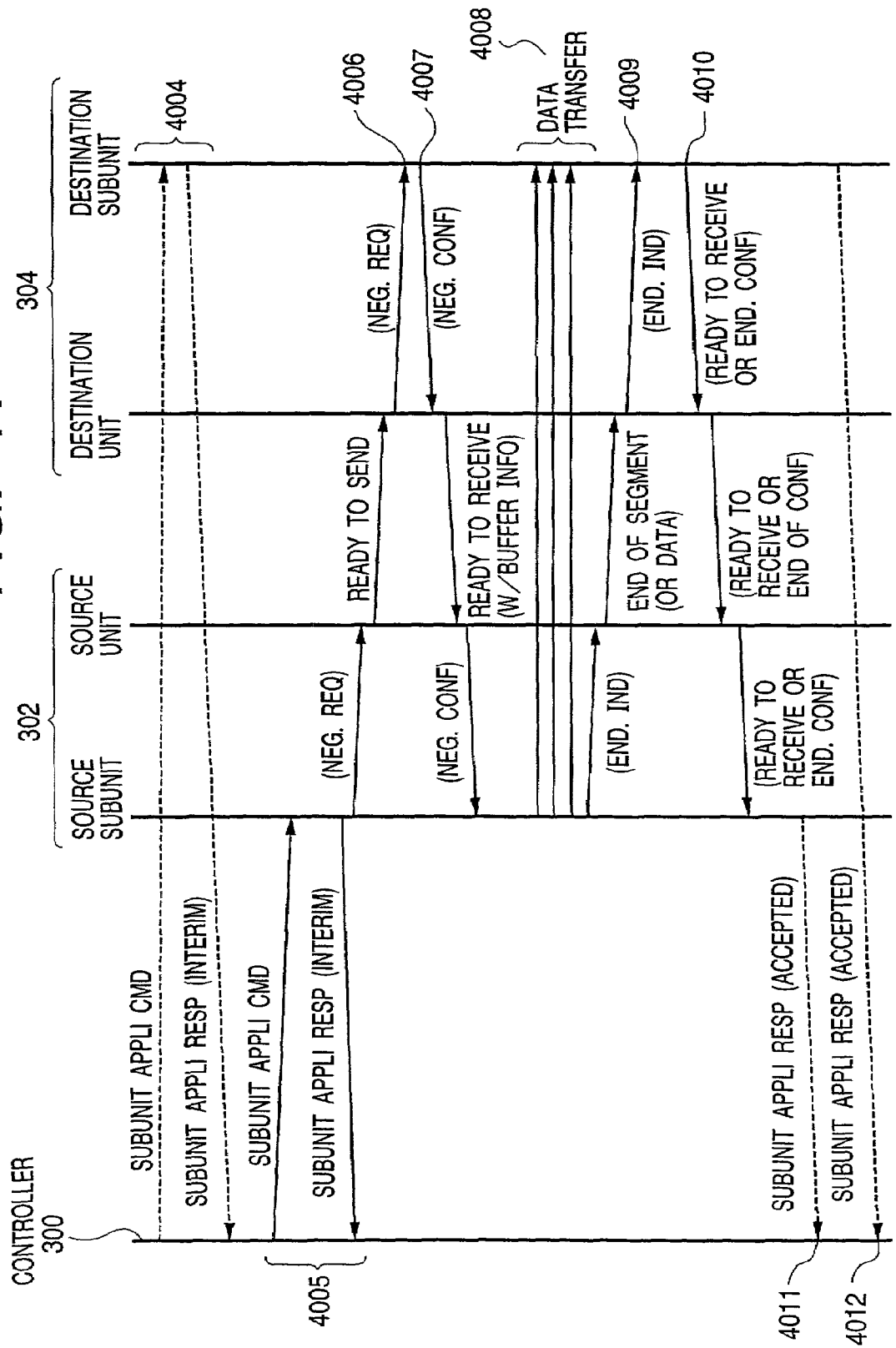
FIG. 41 is a sequence chart which illustrates the details of the communication protocol in accordance with a eighth embodiment of the present invention.

FIG. 41 is a sequence chart which illustrates the communication protocol in detail in accordance with the eighth embodiment.

As in the communication protocol of the fifth embodiment, the communication protocol of the eighth embodiment is formed by the three phases, that is, the connection phase, the transfer phase, and the connection release phase.

At first, the connection phase 3304 will be described.

(1) The Description of the Procedure 4104 Shown in FIG. 41

The controller 300 issues the application CTS (command control set) command (the "SubUnit Appli Cmd" shown in FIG. 41) to the destination node 304 and controls the subunit provided for the destination node 304 so that the reception is prepared. For the eighth embodiment, the destination node 304 is the printer 60. Therefore, the controller 300 issues the print command in the form of the CTS command to the printer unit provided for the printer 60.

The destination node 304 is provided with the two reception buffers, that is, the destination buffer 1 and the destination buffer 2 as shown in FIG. 42 and FIG. 43. The destination node 304, which has received the application CTS command, initializes the destination buffer 1 and the destination buffer 2, and also, initializes the application memory provided for the subunit, among some others. If the subunit is ready to receive transmission, the interim response (the "SubUnit Appli Resp" shown in FIG. 41) is returned to the controller 300 in the form of the CTS command.

(2) The Description of the Procedure 4105 Shown in FIG. 41

Then, the controller 300 issues the application CTS command (the "SubUnit Appli Cmd" shown in FIG. 41) to the source node 302 and controls the subunit provided for the source node 302 so that the transmission is prepared. For the eighth embodiment, the source node 302 is the DVCR 28. Therefore, the controller 300 issues the reproduction command to the camcoder unit provided for the DVCR 28 in the form of the CTS command.

The source node 302 is provided with the source buffer 1 as shown in FIG. 42 and FIG. 43. The source node 302, which has received the application CTS command, initializes the source buffer 1. If the subunit is ready to make transmission, the interim response (the "SubUnit Appli Resp" shown in FIG. 41) is returned to the controller 300 in the form of the CTS command.

Now, the transfer phase 3305 will be described.

(3) The Description of the Procedure 4106 Shown in FIG. 41

The source node 302, which has transmitted the interim response, prepares the transmission of 1 object data 308 stored in the application memory of the subunit, and notifies the destination node 304 of the completion of such preparation.

If the completion of the transmission preparation is notified using the Asynchronous write transaction based on the IEEE 1394-1995 standards, the source node 302 writes the "ready to send" information that indicates the completion of the transmission preparation on the specific register provided for the destination node 304. In this respect, the aforesaid M value is contained in the "ready to send" information.

Here, the specific register is set at the specific address in the CSR space provided for the destination node 304. Therefore, the source node 302 writes the "ready to send" information using the Asynchronous write transaction that designates such specific address.

Also, in accordance with the eighth embodiment, the description has been made of the process whereby to write the "ready to send" information on the specific register, but it may be possible to rewrite the flag by setting such flag to indicate the "ready to send" in the specific field of such register.

(4) The Description of the Procedure 4107 Shown in FIG. 41

The destination node 304, which has transmitted the interim response and received the "ready to send" information from the source node 302 writes the "ready to send" information and the information regarding the destination buffers 1 and 2 ("buffer info" shown in FIG. 41) on the register provided for the source node 302.

Here, the information regarding the destination buffer 1 is the maximum value of the pay load size of the destination which can receive the transmission and set by the aforesaid L value and M value, and also, it is the information which shows the size of the segmental data. Also, the information regarding the destination buffer 2 is the one that indicates the size of the segment set by the aforesaid N value. Here, the size of the segment is set to be N times the size of the segmental data. Also, the destination node 304 can set the N value variably in accordance with each of the segments.

Here, the specific register is set at the specific address in the CSR space provided for the source node 302. Therefore, the destination node 304 writes these pieces of information using the Asynchronous write transaction that designates such specific address.

(5) The Description of the Data Transfer 4108 Shown in FIG. 41

After having received the "ready to send" information from the destination node 304, the source node 302 segments 1 object data 308 into segments formed by N numbers of segmental data using the destination buffers 1 and 2.

After having stored each segment on the source buffer 1, the source node 302 transfers it sequentially using the Asynchronous write transaction.

Here, each of the segments is continuously written on the destination buffer 1 which is secured in the CSR space. The segmental data written on the destination buffer 1 is stored on the destination buffer 2 before the next segmental data is received. The transmission of each segmental data is executed until the destination buffer 2, which is secured by the destination node 304, is filled up.

(6) The Description of the Procedure 4109 Shown in FIG. 41

After having transmitted the N number of segmental data, the source node 302 transmits the "end of segment" information shown in FIG. 41 to the destination node 304. The "end of segment" information is written using the Asynchronous write transaction on the register where the "ready to send" information is written.

In this respect, when all the segments that form the 1 object data 308 are completely transmitted, the source node 302 transmits the "end of data" information shown in FIG. 41 to the destination node 304 even if the destination buffer 2 is not fully occupied. The "end of data" information is written using the Asynchronous write transaction on the register where the "ready to send" information is written.

(7) The Description of the Procedure 4110 Shown in FIG. 41

Having received the "end of segment" information, the destination node 304 and the subunit thereof recognize the completion of the transmission of 1 segment (formed by the N number of fixed length data).

The destination node 304 stores the N number of segmental data, which have been stored on the destination buffer 2, on the application memory region in the interior of the subunit. After that, the destination node 304 writes the "ready to receive" information using the Asynchronous write transaction on the specific register provided for the source node 302.

With the reception of the "ready to receive" information, the source node 302 executes the procedural steps 4106 to 4110 shown in FIG. 41 again after the completion of the transmission preparation of the next segment, and transmits the data that corresponds to the destination buffer 2 portion.

Also, if the "end of data" information is received, the destination node 304 recognizes the completion of the transmission of all the segments that form the 1 object data 308. After that, the destination node 304 sends the "end of conf" information shown in FIG. 41 to the source node 302. The "end of data" information is written by using the Asynchronous write transaction on the register where the "ready to send" information is written.

With the procedure described above, the transfer phase is completed.

Now, the connection release phase 3306 will be described.

(8) The Description of the Procedure 4111 Shown in FIG. 41

Having received the "end of conf" information, the source node 302 notifies the controller 300 of the completion of the transmission of all the segments that form the 1 object data 308. This notification is made using the "accepted response" in the form of the CTS command.

(9) The Description of the Procedure 4112 Shown in FIG. 41

Having transmitted the "end of conf" information, the destination node 304 notifies the controller 300 of the completion of the reception of all the segments that form the 1 object data 308. This notification is made using the "accepted response" in the form of the CTS command.

As described above, in accordance with the eighth embodiment, the relationship between the source buffer 1, the destination buffer 1, and the destination buffer 2 is defined. Then, it becomes possible for the destination node 304 to set the size of each segment variably in accordance with the M value notified by the source node 302, and the N and L values as well. Also, it becomes easier to make calculations for the determination of the size of each segment.

Also, in accordance with the eighth embodiment, the control is made to enable the destination node 304 to notify the source node 302 of the new buffer size at each time the transfer of 1 segmental data 308 is completed. Thus, it becomes possible to set the data amount of each segment appropriately.

Also, in accordance with the eight embodiment, there is no need for the controller 300, as in the seventh embodiment, to manage the reception buffer size of the destination node 304, which has been changed during the communication of the object data 308. As a result, such management is possible between the source node 302 and the destination node 304, and as compared with the fifth embodiment, the load to the controller is made smaller still.

Further, in accordance with the eighth embodiment, the size setting of each segment and the transfer thereof can be controlled and executed between the source node 302 and the destination node 304 after the connection has been set between the source node 302 and the destination node 304. Thus, as compared with the fifth and sixth embodiments, the load to the controller is reduced to make the communication procedure simpler.

Also, in accordance with the eighth embodiment, the size of each segment is set to be integral times the pay load size of the destination node 304 in which it can receive transmission. Then, with the management of the number of packets sent out from the source node 302, it becomes possible to manage the transmission of each segment and facilitate controlling the transmission of the source node 302.

Further, in accordance with the eighth embodiment, the size of the reception buffer of the destination node 304 is set to be integral times the pay load size of the destination node 304 in which it can receive transmission. Then, it becomes possible to utilize the reception buffer secured by the destination node 304 efficiently, and at the same time, facilitate controlling the address to be written on each of the segments.

Other Embodiments

For the various processing operations needed for the communication protocol described in accordance with each of the above embodiments and the implementation thereof, it may be possible to implement them by means of software.

For example, the structure is arranged so that a storage medium that stores thereon the programming codes for the implementation of the functions of each of the above embodiments is provided for the control unit (the MPU 12, the system controller 50, and the printer controller 68 in FIG. 2) of the equipment that forms the communication system of each embodiment. Then, it is arranged to enable the control unit to read out the programming codes thus stored on the storage medium and control the operation of the communication system or the equipment itself in order to implement the function of each embodiment in accordance with the programming codes. With such arrangements, each of the above embodiments can be implemented.

Also, the storage medium having the programming codes stored thereon to implement the function of each embodiment is provided for the 1394 interfaces 14, 44, and 62 arranged for each equipment, and then, the structure may be arranged so that the control unit (such as the serial bus management 806 in FIG. 8) that controls the operation of the 1394 interfaces 14, 44, and 62 may control the processing operation to implement the functions of each embodiment in accordance with the programming codes stored on the storage medium.

In this case, the programming codes read out from the storage medium themselves implement the functions of each embodiment. Therefore, the programming codes themselves and means for supplying the programming codes to the control unit (the storage medium itself, for example) constitute the present invention.

As the storage medium that stores such programming codes, there are, for example, a floppy disc, a hard disc, an optical disc, an opto-magnetic disc, a CD-ROM, a magnetic tape, a non-volatile memory card, and a ROM, among some others.

Also, it is of course included in the present invention when the programming codes read out from the above storage medium implement the functions of each embodiment in cooperation with the operating system (OS) or the various application softwares or the like that operate on the aforesaid control unit.

Further, in the case where the programming codes read out from the above storage medium are stored on the memory provided for the unit of expanded functions which is connected with the aforesaid control unit, and the control unit provided for such unit of the expanded functions execute partly or totally the actual processes in accordance with the programming codes thus stored on the aforesaid memory, it is of course included in the present invention when the functions of each embodiment are implemented by the execution of such process.

As described above, in accordance with each of the embodiments, it is possible to structure the logical connection relationship, which is not dependent on a physical connection mode, on the bus type network such as formed by the IEEE 1394-1995 standards.

Also, in accordance with each of the above embodiments, it is possible to provide a completely new communication protocol wherein the object data (such as the still image data, the graphics data, the text data, the file data, and the program data, among some others), which are the comparatively large amount of data requiring reliability but not real-time capability, can be segmented into one or more segmental data and continuously transferred under the communication system based on the IEEE 1394-1995 regulations.

Also, in accordance with each of the embodiments, it is possible to provide a completely new communication protocol wherein the data communication is implemented between a plurality of equipment using the communication method that broadcasts the data asynchronously under the communication system based on the IEEE 1394-1995 standards.

Also, in accordance with each of the embodiments, it is possible to reliably transfer the plural data having a continuity without using the Isochronous transfer method of the IEEE 1394-1995 standards. Also, it is possible to reliably transfer one object data by segmenting it into plural data.

Also, in accordance with each of the embodiments, it is possible to know the segmental data that are lost when the data transfer is suspended due to the bus reset or transmission errors, and to resume the transfer without taking an extremely complicated communication procedures.

Also, for the data communication using the logical connection relationship, it is possible to implement the communication system and the communication protocol whereby to set optimally the size of the packet which the source node transfers sequentially and the size of the reception buffer of each of the destination nodes.

In this respect, the invention may be embodied in other specific forms without departing from the spirit or essential characteristics thereof.

For example, the description has been made of the communication protocol which is applicable to the network based on the IEEE 1394-1995 standards, but the present invention is not necessarily limited thereto. The communication protocol embodying the invention may be applicable to the network that can form the bus type network based on the IEEE 1394-1995 standards, and to the network that can virtually form the bus type network as well.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A data communication apparatus which transfers object data to a destination nodes, said data communication apparatus comprising:
    a control unit adapted (a) to determine a segment size and a segment data size in accordance with a size of a receiving buffer of the destination node, the size of the receiving buffer being determined by the destination node in accordance with a maximum payload size that can be received by the destination node, (b) to divide the object data into segments in accordance with the segment size, and (c) to divide each segment into a plurality of segment data in accordance with the segment data size; and
    a data communication unit adapted (a) to generate packets from the plurality of segment data, and (b) to transfer the packets from said data communication apparatus to the destination node via a logical connection set between said data communication apparatus and the destination node, the logical connection being set by a controller.

2. A data communication apparatus according to claim 1, wherein said data communication apparatus is adapted to obtain connection information indicating the logical connection from the controller, and
    wherein the packets generated by said data communication unit include the connection information.

3. A data communication apparatus according to claim 1, wherein the segment size of each segment is variable.

4. A data communication apparatus according to claim 1, wherein said data communication unit is adapted to transfer the packets via a serial bus conformed to IEEE 1394-1995 standard.

5. A data communication apparatus according to claim 1, wherein the object data includes image data.

* * * * *